(12) United States Patent
Shirai et al.

(10) Patent No.: US 6,425,643 B2
(45) Date of Patent: Jul. 30, 2002

(54) ELECTRICALLY OPERATED BRAKING SYSTEM HAVING A DEVICE FOR OPERATING ELECTRIC MOTOR OF BRAKE TO OBTAIN RELATIONSHIP BETWEEN MOTOR POWER AND BRAKING TORQUE

(75) Inventors: Kenji Shirai, Mishima; Yasunori Yoshino, Toyota, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/886,008

(22) Filed: Jun. 22, 2001

Related U.S. Application Data

(62) Division of application No. 09/097,269, filed on Jun. 15, 1998, now Pat. No. 6,270,172.

(30) Foreign Application Priority Data

Jul. 29, 1997 (JP) .............................. 9-203454
Dec. 11, 1997 (JP) .............................. 9-341290

(51) Int. Cl.[7] .............................................. B60L 11/18
(52) U.S. Cl. ..................... 303/112; 303/20; 303/152; 188/111 E
(58) Field of Search .......................... 303/20, 152, 112; 188/1.11 E

(56) References Cited

U.S. PATENT DOCUMENTS

| | | |
|---|---|---|
| 3,744,849 A | 7/1973 | Jonason et al. |
| 3,920,285 A | 11/1975 | Maskery |
| 4,327,414 A | 4/1982 | Klein |
| 4,658,939 A | 4/1987 | Kircher et al. |
| 4,716,994 A * | 1/1988 | Iwamoto ................ 188/1.11 E |
| 4,717,207 A * | 1/1988 | Kubota et al. .......... 188/1.11 E |
| 4,805,105 A | 2/1989 | Weiss et al. |
| 5,333,706 A | 8/1994 | Mori |
| 5,366,280 A | 11/1994 | Littlejohn |
| 5,534,641 A | 7/1996 | Littlejohn |
| 5,879,062 A * | 3/1999 | Koga et al. .................. 303/152 |
| 5,952,799 A | 9/1999 | Maisch |
| 6,030,054 A * | 2/2000 | Doericht ........................ 303/20 |
| 6,257,374 B1 * | 7/2001 | Strzelczyk et al. ..... 188/1.11 E |

FOREIGN PATENT DOCUMENTS

WO          WO 97/03869          2/1997

OTHER PUBLICATIONS

SAE Paper 980600, "Modeling and Control of an Electro mechanical Disk Brake".

(List continued on next page.)

*Primary Examiner*—Matthew C. Graham
(74) *Attorney, Agent, or Firm*—Kenyon & Kenyon

(57) ABSTRACT

An electrically operated braking system of a motor vehicle, including a brake having a friction member movable to be forced onto a rotor rotating with a vehicle wheel and thereby braking the wheel. The friction member is forced onto the rotor by an electric motor operated by an electric power supplied from an electric power source. A controller determines an amount of the electric power to be supplied to the motor, depending upon an operating amount of the brake operating member, and a relationship estimated by a relationship estimating and utilizing device. The relationship estimating and utilizing device obtains an actual value of the electric power supplied to the motor during operation of the brake while the vehicle is running, and an actual value of a braking torque applied from the brake to the wheel during the brake operation, and estimate a relationship between the electric power to be supplied to the wheel on the basis of the actual values obtained. The estimated relationship is then utilized to control the braking torque to be generated in response to operation of the brake operating member.

9 Claims, 41 Drawing Sheets

OTHER PUBLICATIONS

ATZ Autobiltechnische Zeitschrift 98(1996)6 "Advanced Brake System with Highest Flexibility".

Automotive Industries, May 1995, pp. 62–64, "Stable as She Goes".

SAE Paper 93ME115, "Electric Brake System for Passenger Vehicles Ready for Production".

Institution of Mechanical Engineer 950762, "Intelligent Braking for Current and Future Vehicles".

* cited by examiner

ROTATING DIRECTION OF DRUM 204

F-T RELATIONSHIP PATTERN

I-T RELATIONSHIP PATTERN

ELECTRICALLY OPERATED BRAKING SYSTEM HAVING A DEVICE FOR OPERATING ELECTRIC MOTOR OF BRAKE TO OBTAIN RELATIONSHIP BETWEEN MOTOR POWER AND BRAKING TORQUE

CROSS REFERENCE TO RELATED PATENT APPLICATION

This patent application is a divisional application of Ser. No. 09/097,269, filed Jun. 15, 1998, now U.S. Pat. 6,270,172 all of which is incorporated herein by reference.

This application is based on Japanese Patent Applications Nos. 9-203454 and 9-341290 filed Jul. 29 and Dec. 11, 1997, respectively, the contents of which are incorporated hereinto by reference.

BACKGROUND OF THE INVENTION

1. Field of the Invention

The present invention relates to an electrically operated braking system of a motor vehicle, which includes a brake employing an electric motor as a drive source.

2. Discussion of the Related Art

An electrically operated braking system of a motor vehicle generally includes (a) a brake operating member such as a brake pedal, which is operated by an operator of a motor vehicle, (b) an electric power source such as a battery, (c) a brake including an electric motor which is operated by an electric power supplied from the electric power source, to generate a drive force for forcing a friction member onto a rotor rotating with a wheel of the vehicle, for thereby braking the wheel, and (d) a controller which determines an amount of the electric power to be supplied from the electric power source to the electric motor, depending upon an operating amount of the brake operating member, for thereby controlling an operation of the brake.

A friction coefficient of friction members such as brake pads or brake linings used in a brake generally varies due to gradual deterioration or wearing of the friction members, or due to temperature or humidity of the friction members. Further, the friction members have different friction coefficient values due to variations associated with the manufacture. In an electrically operated braking system as described above, a change in the friction coefficient of the friction members will cause a change in the relationship between the amount of electric power actually supplied from the electric power source to the electric motor of the brake and the braking torque actually applied from the brake to the corresponding wheel. In other words, the relationship between the amount of electric power supplied to the motor and the braking torque generated by the brake is not necessarily held constant.

However, the conventional electrically operated braking system does not obtain and utilize the actual relationship between the supplied amount of electric power and the braking torque generated by the brake. That is, the conventional system uses a predetermined nominal relationship between the electric power amount and the braking torque, to determine the amount of electric power to be supplied to the electric motor, depending upon the operating amount of the brake operating member, on the assumption that the relationship is held constant. Therefore, the conventional electrically operated braking system is not capable of accurately controlling the braking torque of the brake in relation to the operating amount of the brake operating member.

SUMMARY OF THE INVENTION

It is an object of this invention to provide an electrically operated braking system which obtains an actual relationship between the amount of electric power supplied to an electric motor and the braking torque generated by the brake, and utilizes the obtained relationship.

The above object may be achieved according to any one of the following modes or embodiments of the present invention, which are numbered to indicate possible combinations of various features of the invention:

(1) An electrically operated braking system of a motor vehicle having a wheel, comprising: (a) a rotor rotating with the wheel; (b) a brake operating member which is operated by an operator of the motor vehicle; (c) an electric power source; (d) a brake including a friction member movable to be forced onto the rotor, and an electric motor which is operated by an electric power supplied from the electric power source, to generate a drive force for forcing the friction member onto the rotor and thereby braking the wheel; and (e) a controller which determines an amount of the electric power to be supplied from the electric power source to the electric motor, depending upon an operating amount of the brake operating member, for thereby controlling an operation of the brake, the braking system being characterized by further comprising (e) a relationship estimating and utilizing device for obtaining an actual value of the electric power supplied from the electric power source to the electric motor during an operation of the brake while the motor vehicle is running, and an actual value of a braking torque applied from the brake to the wheel during the operation of the brake. The relationship estimating and utilizing device is adapted to estimate a relationship between the electric power to be supplied to the electric motor and the braking torque to be applied to the wheel, on the basis of the actual values obtained, and utilize the relationship. The relationship is formulated such that the braking torque to be applied to the wheel is changed with a change in the electric power to be supplied to the electric motor.

In the braking system constructed according to the above mode (1) of the present invention, the relationship estimating and utilizing device is capable of obtaining the relationship between the electric power to be supplied to the electric motor of the brake and the braking torque to be applied from the brake to the wheel. The relationship estimating and utilizing device is further adapted to utilize the obtained relationship for various purposes, for instance, for controlling the brake and providing the vehicle operator with information helpful to operate the vehicle.

The electric power to be applied to the electric motor may be expressed by a voltage or current. The electric motor of the brake may be a ultrasonic motor or DC motor. The operating amount of the brake operating member may be expressed as an operating force acting on the brake operating member, or an operating stroke or distance of the brake operating member. The operation of the brake while the vehicle is running may be a normal operation initiated by an operation of the brake operating member by the vehicle operator, or a special operation which is performed without an operation of the brake operating member, for the sole purpose of estimating the above-indicated relationship.

(2) An electrically operated braking system according to the above mode (1), wherein said relationship is a pattern of change of said braking torque with a change of said electric power, and said relationship estimating and utilizing device comprises relationship estimating means for selecting one of a plurality of candidate patterns which corresponds to a combination of the actual values obtained during the operation of the brake while the motor vehicle is running.

(3) An electrically operated braking system according to the above mode (2), wherein said relationship estimating means includes pattern memory means for storing the above-indicated plurality of candidate patterns, and pattern selecting means for selecting the above-indicated one of the plurality of candidate patterns stored in the pattern memory means.

(4) An electrically operated braking system according to any one of the above modes (1)–(3), wherein the relationship estimating and utilizing device obtains the above-indicated relationship from a plurality of different relationships between the electric power to be supplied to the electric motor and the braking torque to be applied to the wheel.

In the braking system according to the above mode (4), the control load of the relationship estimating and utilizing device is made smaller than in the braking system in which the relationship is estimated in a continuous fashion.

(5) An electrically operated braking system according to any one of the above modes (1)–(4), wherein the controller includes the relationship estimating and utilizing device, and the relationship estimating and utilizing device includes relationship utilizing means for determining a desired value of the braking torque on the basis of the operating amount of the brake operating member, and determining the value of the electric power to be supplied to the electric motor, on the basis of the determined desired value of the braking torque and according to the estimated relationship.

In this braking system, the electric power to be supplied to the electric motor during an operation of the brake is determined according to the actual relationship between the electric motor and the braking torque, as well as depending upon the operating amount of the brake operating member, so that the brake can be accurately controlled so as to provide the braking torque corresponding to the operating amount of the brake operating member, irrespective of a variation in the friction coefficient of the friction members used in the brake.

(6) An electrically operated braking system according to any one of claims 1–5, wherein the relationship estimating and utilizing device includes means for supplying a predetermined amount of the electric power from the electric power source to the electric motor for a predetermined length of time to thereby activate the brake while the motor vehicle is running without an operation of the brake operating member, and obtaining the actual values of the electric power and the braking torque during activation of the brake.

In the braking system according to the above mode (6), the brake is activated for the sole purpose of estimating the relationship, while the brake operating member is not in operation, that is, while the vehicle is running under a condition that does not require a normal operation of the brake. Since the relationship is estimated in this condition without an operation of the brake operating member, the accuracy of estimation of the relationship is made relatively high.

In a usual run of the motor vehicle, the relationship estimating and utilizing device is operated to activate the brake for estimating the relationship, prior to a normal operation of the brake by an operation of the brake operating member by the vehicle operator. Accordingly, the estimated actual relationship between the electric power to be supplied to the electric motor of the brake and the braking torque to be generated by the brake can be utilized to control the brake upon initial activation of the brake during the vehicle run.

While the actual value of the braking torque generated by the brake with the predetermined amount of the electric power supplied to the electric motor is obtained while the brake operating member is not in operation, the estimation of the relationship on the basis of the above-indicated predetermined amount of the electric power and the obtained braking torque may be effected either immediately after the actual braking torque value is obtained during running of the vehicle without an operation of the brake operating member, or during the next normal operation of the brake initiated by an operation of the brake operating member.

(7) An electrically operated braking system according to the above mode (6), wherein the means for supplying the predetermined amount of the electric power to the electric motor for the predetermined length of time while the vehicle is running without an operation of the brake operating member comprises a brake operation detecting sensor for detecting an operation of the brake operating member, and a vehicle run detecting sensor for detecting a running of the vehicle, and activates the brake by supplying the predetermined amount of the electric power to the electric motor when the above sensors detect that the vehicle is running without an operation of the brake operating member.

(8) An electrically operated braking system according to the above mode (6) or (7), wherein the motor vehicle has a front left wheel and a front right wheel, and the braking system comprises the brake for each of the front left and right wheels, and wherein the means for supplying the predetermined amount of the electric power to the electric motor while the vehicle is running without an operation of the brake operating member is adapted to concurrently activate the brakes for the two front wheels.

In this braking system wherein the brakes for the front left and right wheels are concurrently activated while the vehicle is running without an operation of the brake operating member, the same amounts of the electric power are preferably applied to the electric motors for the two front brakes to generate the same braking torque, so as to avoid generation of a yaw moment acting on the vehicle body during activation of the front brakes by the relationship estimating and utilizing device. This arrangement is effective to prevent yawing of the vehicle during activation of the front brakes by the relationship estimating and utilizing device, which may be felt unusual or abnormal by the vehicle operator.

(9) An electrically operated braking system according to any one of the above modes (6)–(8), wherein the motor vehicle has a front wheel and a rear wheel, and the braking system comprises the brake for each of the front and rear wheels, and wherein the means for supplying the predetermined amount of the electric power to the electric motor while the motor vehicle is running without an operation of the brake operating member is adapted to activate the brakes for the front and rear wheels at different times.

In the braking system according to the above mode (9) wherein the deceleration value of the vehicle body during activation of the brake for each of the front and rear wheels is made lower than in the braking system wherein the brakes for the front and rear wheels are activated concurrently. This arrangement makes it possible to estimate the relationship without the vehicle operator feeling unusual or uncomfortable with excessive deceleration of the vehicle while the vehicle is running without an operation of the brake operating member. Further, the predetermined amount of the electric power to be supplied to the electric motor of the brake for each of the front and rear wheels can be increased to improve the accuracy of estimation of the relationship, because the two brakes for the front and rear wheels are activated at different times, with the relatively low deceleration value of the vehicle body during activation of each brake.

(10) An electrically operated braking system according to any one of the above modes (6)–(9), wherein said means for supplying the predetermined amount of the electric power to the electric motor while the vehicle is running without an operation of the brake operating member is operated to activate the brake only once during a run of the motor vehicle, to obtain the actual value of the braking torque to be applied to the wheel.

(11) An electrically operated braking system according to the above mode (10), further comprising a vehicle start member which is operated by the vehicle operator when the run of the vehicle is initiated, and wherein the means for supplying the predetermined amount of the electric power to the electric motor determines, upon operation of the vehicle start member, that the run of the vehicle has been initiated.

(12) An electrically operated braking system according to any one of the above modes (1)–(11), wherein the relationship estimating and utilizing device comprises standard relationship utilizing means for provisionally utilizing a predetermined standard relationship stored in a memory, before said relationship is estimated for the first time during a run of the motor vehicle on the basis of the actual values of the electric power and braking torque which are obtained during activation of the brake without an operation of the brake operating member.

(13) An electrically operated braking system according to any one of the above modes (1)–(11), wherein the relationship estimating and utilizing device stores in a memory the relationship which is estimated during each run of the motor vehicle, and before the relationship is estimated during a present run of the vehicle, provisionally utilizes the relationship which was obtained during the preceding run of the motor vehicle and which is stored in the memory.

In the braking system according to the above mode (13), the stored relationship obtained during the preceding run of the vehicle is provisionally utilized until the relationship is obtained during the present run of the vehicle. The relationship which was actually obtained during the preceding run of the vehicle is more reliable than the standard relationship which is not actually obtained.

(14) An electrically operated braking system according to any one of the above modes (1)–(5), wherein the relationship estimating and utilizing device comprises means for obtaining the actual values of the electric power supplied to the electric motor and the braking torque generated by the brake activated while the vehicle is running with an operation of the brake operating member, and estimates the relationship on the basis of the above-indicated actual values.

The braking system according to the above mode (14) may include the feature according to any one of the above modes (11), (12) and (13).

(15) An electrically operated braking system according to any one of the above modes (1)–(14), further comprising a driver connected between the electric power source and the electric motor so that the electric power is supplied from the electric power source to the electric motor through the driver according to an external control command applied to the driver, and the relationship estimating and utilizing device comprising electric power estimating means for estimating the actual value of the electric power supplied from the electric power source to the electric motor, on the basis of the external control command, and for estimating the relationship on the basis of the estimated actual value of the electric power.

The braking system according to the above mode (15) does not require an electric power sensor for detecting the electric power actually supplied to the electric motor, since the actual value of the electric power supplied to the electric motor is estimated from the control command applied to the driver. Where the relationship estimating and utilizing device comprises the means for suppling the predetermined amount of the electric power to the electric motor while the vehicle is running without an operation of the brake operating member, as described above with respect to the mode (5) of this invention, this means applies the control command to the driver. Where the relationship estimating and utilizing device comprises means for obtaining the actual values of the electric power supplied to the electric motor and the braking torque generated by the brake activated while the vehicle is running with an operation of the brake operating member, as described above with respect to the mode (14) of this invention, the controller for the brake applies the control command to the driver.

(16) An electrically operated braking system according to any one of the above modes (1)–(14), wherein the relationship estimating and utilizing device comprises an electric power sensor for detecting the electric power actually supplied to the electric motor, and estimates the relationship on the basis of the actual value of the supplied electrical power detected by the electric power sensor.

The value of the electric power represented by the control command applied to the driver is not necessarily equal to the value of the electric power actually supplied to the electric motor. Further, the value of the electric power actually supplied to the electric motor may vary with a change in the load of the electric motor, even when the same control command is applied to the driver. Therefore, the actual value of the electric power supplied to the electric motor may not be estimated with high accuracy in the braking system according to the above mode (15). In this respect, the braking system according to the above mode (16) in which the actually supplied electric power is detected by the sensor permits improved accuracy of estimation of the actual relationship between the electric power to be supplied to the electric motor and the braking torque to be generated by the brake.

(17) An electrically operated braking system according to any one of the above modes (1)–(16), wherein the relationship estimating and utilizing device comprises a braking torque sensor for detecting the actual value of the braking torque applied from the brake to the wheel, and estimates the relationship on the basis of the actual value of the braking torque detected by the braking torque sensor.

(18) An electrically operated braking system according to any one of the above modes (1)–(16), wherein the relationship estimating and utilizing device includes vehicle deceleration detecting means for detecting a deceleration value of the motor vehicle, and obtains the actual value of the braking torque on the basis of the deceleration value detected by the vehicle deceleration detecting means.

In the braking system according to the above mode (18), the actual value of the braking torque is obtained on the basis of the detected deceleration value of the vehicle, based on a fact that the vehicle deceleration value increases with an increase in the actual braking torque. In this respect, it is also noted that the vehicle deceleration value can be detected more easily than the actual braking torque. That is, the actual value of the braking torque can be obtained relatively easily on the basis of the detected vehicle deceleration value.

The vehicle deceleration detecting means may be adapted to directly detect the deceleration value of the vehicle body, or may be a combination of a vehicle speed sensor for detecting the running speed of the vehicle, and means for calculating the deceleration value of the vehicle based on the detected vehicle running speed. Alternatively, the vehicle deceleration detecting means may comprise wheel speed sensors for detecting rotating speeds of a plurality of wheels of the motor vehicle, vehicle speed estimating means for determining as an estimated vehicle running speed a highest one of the wheel speeds detected by the respective wheel speed sensors (on the basis of a fact that the highest wheel speed is closest to the actual running speed of the vehicle), and vehicle deceleration calculating means for calculating the deceleration value of the vehicle on the basis of the estimated vehicle running speed.

(19) An electrically operated braking system according to any one of the above modes (1)–(16), wherein the relationship estimating and utilizing device comprises vehicle deceleration detecting means for detecting a deceleration value of the motor vehicle while a gradient of a road surface on which the motor vehicle is running is substantially zero, and obtains the actual value of the braking torque on the basis of the deceleration value detected by the vehicle deceleration detecting means.

While the vehicle deceleration value increases with an increase in the actual braking torque, as described above, the vehicle deceleration value may vary with the gradient of the road surface, even when the actual braking torque is kept constant. Based on this fact, the vehicle deceleration detecting means used in the braking system according to the above mode (19) is adapted to detect the vehicle deceleration value while the road surface gradient is substantially zero, and the relationship estimating and utilizing means is adapted to obtain the actual braking torque based on the vehicle deceleration value detected while the road surface gradient is substantially zero. Thus, the actual braking torque can be obtained with high accuracy based on the detected vehicle deceleration value.

(20) An electrically operated braking system according to any one of the above modes (1)–(16), wherein the relationship estimating and utilizing device includes a wheel speed sensor for detecting a rotating speed of the wheel, obtains a deceleration value of the wheel on the basis of a rate of change of the rotating speed of the wheel detected by the wheel speed sensor, and obtains the actual value of the braking torque on the basis of the deceleration value of the wheel obtained.

In the braking system according to the above mode (20), the actual value of the braking torque is obtained on the basis of the detected deceleration value of the vehicle wheel, based on a fact that the wheel deceleration value increases with an increase in the actual braking torque. In this respect, it is also noted that the wheel deceleration value can be detected more easily than the actual braking torque. That is, the actual value of the braking torque can be obtained relatively easily on the basis of the detected wheel deceleration value.

Where the braking system comprises a plurality of brakes for respective wheels, the deceleration value of the vehicle is influenced by the braking effects provided by all or some of the brakes which are activated. Therefore, it is difficult to accurately obtain the actual braking effect of the brake for each wheel based on the deceleration value of the vehicle. In the braking system according to the above mode (20), however, the actual braking torque generated by the brake for each wheel can be accurately obtained on the basis of the rate of change of the rotating speed of the wheel. According to this arrangement, the relationship between the electric power to be supplied to the electric motor and the braking torque to be generated by the brake can be estimated for each of the plurality of wheels, so that the estimated relationship can be utilized for controlling the brake for each wheel, depending upon the specific condition of each brake.

(21) An electrically operated braking system according to the above mode (6) or (7), wherein the brake is provided for each of a plurality of wheels provided for the motor vehicle, and the means for supplying the predetermined amount of the electric power to the electric motor while the motor vehicle is running without an operation of the brake operating member is adapted to activate the brakes for the respective wheels at different times, detect the deceleration values of the motor vehicle during the activation of the respective brakes, and obtain the actual value of the braking torque of each brake on the basis of the vehicle deceleration value detected during the activation of that brake.

In the braking system according to the above mode (21) wherein the brakes for the respective wheels are activated at different times during running of the motor vehicle without an operation of the brake operating member, the vehicle deceleration values are detected during the activation of the respective brakes. In this arrangement, the vehicle deceleration value detected during activation of a given one of the brakes reflects only the actual braking torque generated by that brake. Thus, the actual braking torque of each brake can be accurately obtained based on the vehicle deceleration value detected during operation of that brake, and the relationship can be obtained for each of the brakes.

(22) An electrically operated braking system according to the above mode (6) or (7), wherein the brake is provided for each of a front wheel and a rear wheel provided for the motor vehicle, and the means for supplying the predetermined amount of the electric power to the electric motor while the motor vehicle is running without an operation of the brake operating member is adapted to concurrently activate the brakes for the respective wheels, detect the deceleration value of the motor vehicle during the concurrent activation of the brakes, obtain the actual values of the braking torque values of. the brakes for the front and rear wheels on the basis of the detected vehicle deceleration value, and estimate the relationship on the basis of the obtained actual braking torque value of each brake.

In the braking system according to the above mode (22) wherein the brakes for the front and rear wheels are concurrently activated, the required time of activation of the brakes can be reduced as compared with the required time where the brakes are activated at different times.

Since the brakes for the front and rear wheels are concurrently activated, the vehicle deceleration value detected is influenced by both of the actual braking torque values of the front and rear brakes. However, the actual braking torque values of the front and rear brakes can be estimated by calculation based on the detected vehicle deceleration value, and the relationship for each of the front and rear wheels is estimated on the basis of the actual braking torque value obtained for each wheel, although the vehicle deceleration value detected during the concurrent activation of the front and rear brakes is influenced by the actual braking torque values of the respective brakes.

(23) An electrically operated braking system according to the above mode (6) or (7), further comprising first inhibiting means for inhibiting the relationship estimating and utilizing device from operating the brake to obtain the relationship while the motor vehicle is running under a condition in which the operation of the brake is likely to be felt unusual or uncomfortable by the operator of the motor vehicle.

In the braking system according to the above mode (23) of this invention, the actual braking torque of the brake during activation of the brake without an operation of the brake operating member can be obtained without the vehicle operator feeling unusual with the activation of the brake.

(24) An electrically operated braking system according to the above mode (23), wherein the first inhibiting means includes means for inhibiting the relationship estimating and utilizing device from operating the brake when the motor vehicle is running at a speed lower than a predetermined threshold.

In the braking system according to the above mode (24), the operation of the relationship estimating and utilizing device without an operation of the brake operating member is inhibited when the vehicle running speed is lower than the predetermined lower limit. This arrangement is based on a finding that the vehicle operator is more likely to feel unusual or uncomfortable with the activation of the brake during running of the vehicle at a relatively low speed, than at a relatively high speed.

(25) An electrically operated braking system according to the above mode (24), wherein said means for inhibiting the relationship estimating and utilizing device from operating the brake when the vehicle is running at a speed lower than a predetermined threshold includes vehicle speed detecting means for detecting the running speed of the vehicle, and inhibits the operation of the relationship estimating and utilizing means from operating to activate the brake when the detected vehicle running speed is lower than the predetermined threshold.

In the braking system according to the above mode (25), the vehicle speed detecting means may be adapted to directly detect the running speed of the vehicle. Alternatively, the vehicle speed detecting means comprises wheel speed sensors for detecting rotating speeds of respective wheels of the vehicle, and vehicle speed estimating means for determining as an estimated vehicle running speed a highest one of the wheel speeds detected by the respective wheel speed sensors on the basis of a fact that the highest wheel speed is closest to the actual running speed of the vehicle.

(26) An electrically operated braking system according to any one of the above modes (23)–(25), wherein said first inhibiting means comprises means for inhibiting the relationship estimating and utilizing means from operating the brake when the vehicle is turning.

In the braking system according to the above mode (26), the operation of the relationship estimating and utilizing means is inhibited during turning of the vehicle, based on a finding that the operation of the brake during turning of the vehicle is likely to cause the vehicle to have a behavior which is felt unusual or comfortable by the vehicle operator.

(27) An electrically operated braking system according to the above mode (26), wherein the means for inhibiting the relationship estimating and utilizing means from operating the brake when the vehicle is turning includes a vehicle turning sensor for detecting turning of the vehicle, and inhibits the operation of the relationship estimating and utilizing device to activate the brake when the turning of the vehicle is detected by the vehicle turning sensor.

(28) An electrically operated braking system according to any one of the above modes (1)–(27), further comprising second inhibiting means for inhibiting the relationship estimating and utilizing device from at least utilizing the relationship while the motor vehicle is running under a condition in which the relationship estimating and utilizing device is not likely to accurately estimate the relationship.

In the braking system according to the above mode (28), the relationship estimating and utilizing device is inhibited from at least utilizing the relationship while the motor vehicle is running under a condition in which the relationship estimating and utilizing device is not likely to accurately estimate the relationship. This arrangement is based on a finding that the relationship cannot always be estimated with high accuracy. Thus, the present arrangement assures increased reliability of the relationship estimating and utilizing device. Where the estimated relationship is utilized to control the brake, the relationship estimated in the above-indicated running condition of the vehicle is not utilized for controlling the vehicle, whereby the accuracy of control of the brake is improved.

(29) An electrically operated braking system according to the above mode (28) wherein the second inhibiting means includes means for inhibiting the relationship estimating and utilizing device from at least utilizing the relationship while a drive force for driving the motor vehicle is being changed.

In the braking system according to the above mode (28), the relationship estimating and utilizing device is inhibited from at least utilizing the relationship while the motor vehicle is running with a drive force being changed. This arrangement is based on a finding that the relationship is not likely to be estimated accurately while the drive force for driving the vehicle is being changed. The vehicle drive force may be changed due to a change in the output of a drive power source of the vehicle, or in the speed ratio of a power transmission of the vehicle as described below.

(30) An electrically operated braking system according to the above mode (29), wherein the motor vehicle includes a drive power source for driving the motor vehicle, and an accelerator operating member which is operated by the operator of the motor vehicle to increase an output of the drive power source for accelerating the motor vehicle, and wherein said means for inhibiting the relationship estimating and utilizing device from at least utilizing the relationship comprises means for inhibiting the relationship estimating and utilizing device from at least utilizing the relationship while said accelerator operating member is in operation.

In the braking system according to the above mode (30), the relationship estimating and utilizing device is inhibited from at least utilizing the relationship during operation of the accelerator operating member. This arrangement is based on a finding that the relationship is not likely to be estimated accurately while the accelerator operating member is in operation. The drive power source may be an engine such as an internal combustion engine, or an electric motor, or a combination of an engine and an electric motor.

The accelerator operating member may be considered to be "in operation", when the accelerator operating member is placed in one of the following states: a first transient state in which the accelerator operating member is operated to increase the output of the drive power source to accelerate the motor vehicle; a steady state in which the accelerator operating member is held at the same position to maintain the output of the drive power source at the same value; and a second transient state in which the accelerator operating member is operated to reduce the output of the drive power source to decelerate the motor vehicle. However, the accelerator operating member may be considered to be "in operation" only when the accelerator operating member is placed in the first transient state, or in the first or second transient state. In other words, the relationship estimating and utilizing device may be inhibited from at least utilizing the relationship when the accelerator operating member is in one of the first and second transient states and the steady state, or in one of the first and second transient states, or in the first transient state.

The operating state of the accelerator operating member may be detected by either a switch for detecting whether the accelerator operating member is placed in a non-operated position or an operated position, or a position sensor capable of continuously detecting an amount of operation of the accelerator operating member from the non-operated position. The switch is usually used for detecting a moment at which the accelerator operating member is operated from the non-operated position to an operated position, or returned from the operated position to the non-operated position. However, this switch cannot detect a change in the operating position of the accelerator operating member, or the operating amount of the accelerator operating member. That is, while the switch is capable of detecting whether the accelerator operating member is in operation or not, but is not capable of detecting whether the accelerator operating member is placed in the first transient state (vehicle accelerating state) or the second transient (vehicle decelerating state), or held in the steady state (same operating position). On the other hand, the position sensor is capable of detecting whether the accelerator operating member is placed in the first transient or accelerating state or in the second transient or decelerating state. The above-indicated switch may be a switch for detecting an operation of an accelerator pedal as the accelerator operating member. The above-indicated sensor may be a sensor for detecting an amount of operation of the accelerator pedal, or a sensor for detecting an angle of opening of a throttle valve provided in an intake valve of an engine (internal combustion engine) which is provided as the drive power source. The throttle valve may be operated according to only an operation of the accelerator operating member, or according to selectively an operation of the accelerator operating member or a control command applied to an electrically operated throttle actuator provided for automatically operating the throttle valve. To accurately detect a change in the output of the engine, the throttle valve sensor for detecting the opening angle of the throttle valve is preferably used.

(31) An electrically operated braking system according to the above mode (29), wherein the motor vehicle includes an engine for driving the vehicle, and a fuel supply device for supplying a fuel to a combustion chamber of the engine, and wherein the means for inhibiting the relationship estimating and utilizing device from at least utilizing the relationship while the drive force for driving the engine is being changed comprises means for inhibiting the relationship estimating and utilizing device from at least utilizing the relationship when the fuel supply device is switched between an operated state thereof in which the fuel is supplied to the combustion chamber and a non-operated state thereof in which the fuel is not supplied to the combustion chamber.

In the braking system according to the above mode (31), the relationship estimating and utilizing device is inhibited from at least utilizing the relationship when the fuel supply device is switched between the operated and non-operated state. This arrangement is based on a finding that the relationship is not likely to be estimated accurately when the fuel supply device is switched between the operated and non-operated states.

In a certain type of motor vehicles, the fuel supply device may be switched between the operated and non-operated states, even while the accelerator operating member is not in operation. In this type of motor vehicle wherein the relationship is not likely to be estimated accurately due to a change in the output of the engine even while the accelerator operating member is not in operation, the arrangement according to the above mode (31) is effective to prevent utilization of the relationship estimated while the engine output is changing.

(32) An electrically operated braking system according to any one of the above modes (29)–(31), wherein the motor vehicle includes a drive power source, and a power transmission for transmitting the drive force of the drive power source to the wheel at a selected one of a plurality of speed ratios, and wherein the means for inhibiting the relationship estimating and utilizing device from at least utilizing the relationship comprises means for inhibiting the relationship estimating and utilizing device from at least utilizing the relationship while the power transmission is in the process of a shifting action to change the speed ratio.

In the braking system according to the above mode (32), the relationship estimating and utilizing device is inhibited from at least utilizing the relationship while the power transmission is in the process of a shifting action. This arrangement is based on a finding that the relationship is not likely to be estimated accurately in the process of a shifting action of the power transmission.

(33) An electrically operated braking system according to the above mode (32), wherein the means for inhibiting the relationship estimating and utilizing device from at least utilizing the relationship while the power transmission is in the process of a shifting action comprises a shift sensor for detecting the shifting action of the power transmission.

(34) An electrically operated braking system according to any one of the above modes (28)–(33), wherein the second inhibiting means includes means for inhibiting the relationship estimating and utilizing device from at least utilizing the relationship while the motor vehicle is turning.

In the braking system according to the above mode (34), the relationship estimating and utilizing device is inhibited from at least utilizing the relationship during turning of the vehicle. This arrangement is based on a finding that the relationship is not likely to be estimated accurately while the vehicle is turning.

(35) An electrically operated braking system according to the above mode (34), wherein the means for inhibiting the relationship estimating and utilizing device from at least utilizing the relationship while the motor vehicle is turning includes a vehicle turning sensor for detecting a turning of the motor vehicle.

(36) An electrically operated braking system according to any one of the above modes (28)–(35), wherein the second inhibiting means comprises means for inhibiting the relationship estimating and utilizing device from at least utilizing the relationship while the motor vehicle is running on a bad road surface.

In the braking system according to the above mode (36), the relationship estimating and utilizing device is inhibited from at least utilizing the relationship during running of the vehicle on a bad road surface This arrangement is based on a finding that the relationship is not likely to be estimated accurately while the vehicle is running of a bad road surface.

The bad road surface may be a graveled road surface, a Belgian brick- or stone-paved road surface, a non-paved road surface, or any other bumpy road surface.

(37) An electrically operated braking system according to the above mode (36), wherein the means for inhibiting the relationship estimating and utilizing device from at least utilizing the relationship while the motor vehicle is running on a bad road surface includes means for detecting the bad road surface.

(38) An electrically operated braking system according to any one of the above modes (28)–(37), wherein the second inhibiting means comprises means for inhibiting the relationship estimating and utilizing device from at least utilizing the relationship while a slip ratio of the wheel is higher than a predetermined threshold.

(39) An electrically operated braking system according to the above mode (38), wherein the means for inhibiting the relationship estimating and utilizing device from at least utilizing the relationship while the slip ratio of the wheel is higher than a predetermined threshold includes means for detecting that the slip ratio is higher than the predetermined threshold.

(40) An electrically operated braking system according to any one of the above modes (1)–(39), wherein said relationship estimating and utilizing device comprises braking torque obtaining means for obtaining the actual value of the braking torque for obtaining the actual value of the braking torque on the basis of a rate of change of the deceleration value of the motor vehicle or a rate of change of the deceleration value of the wheel.

Where the actual value of the braking torque of the brake is obtained on the basis of the deceleration value of the motor vehicle or the drive wheel, the obtained actual value of the braking torque is likely to be influenced by the overall drive force of the vehicle or the drive force of the drive wheel. Where the actual value of the braking torque is obtained on the basis of the rate of change of the vehicle or wheel deceleration value, the obtained actual value of the braking torque is relatively less likely to be influenced by the drive force. In the braking system according to the above mode (40), therefore, the actual value of the braking torque can be obtained with a reduced influence by the drive force of the vehicle or drive wheel.

(41) An electrically operated braking system according to any one of the above modes (1)–(40), wherein the brake includes a self-servo mechanism operated such that a friction force between the friction member and the rotor is increased by the friction force.

Referring to the graph of FIG. 8, there are indicated a plurality of I-T relationships between an electric current I (electric power) to be supplied to the electric motor and the braking torque T in the brake including a self-servo mechanism, which relationship correspond to respective different values $\mu$ of a friction coefficient of the friction member. It will be understood from the graph that the rate of increase of the braking torque T with an increase in the electric current I is higher when the friction coefficient $\mu$ of the friction member is relatively high than when it is relatively low. Where the brake includes the self-servo mechanism, therefore, the need of estimating the actual relationship between the electric power and the braking torque and utilizing the estimated relationship for controlling the brake is relatively high. This need is satisfied in the braking system according to the above mode (41), wherein the braking torque generated by the brake can be accurately controlled in relation to the operating amount of the brake operating member, even where the brake is provided with the self-servo mechanism.

(42) An electrically operated braking system according to the above mode (41), wherein the brake including the self-servo mechanism includes a drum brake which has brake linings as the friction member and a drum as the rotor.

(43) An electrically operated braking system according to the above mode (41) or (42), wherein the brake including the self-servo mechanism includes a disc brake which has brake pads as the friction member and a disc as the rotor.

(44) An electrically operated braking system according to any one of the above modes (1)–(39), wherein the relationship. estimating and utilizing device obtains the actual value of the braking torque on the basis of a change in a running condition of the motor vehicle due to the operation of the brake.

The "change in a running condition of the motor vehicle" indicated above may include a change in the deceleration value of the motor vehicle.

(45) An electrically operated braking system according to any one of the above modes (1)–(39), wherein the relationship estimating and utilizing device comprises means for obtaining the actual value of the braking torque on the basis of a change in a rotating state of the wheel due to the operation of the brake.

The "change in a rotating state of the wheel" indicated above may include a change of the deceleration value of the wheel, and a rate of change of the deceleration value of the wheel.

(46) An electrically operated braking system according to any one of the above modes (1)–(45), wherein the brake includes a support member for supporting the friction member in frictional contact with the rotor so as to prevent the friction member from being rotated with the rotor, and the relationship estimating and utilizing device includes a force switch which is interposed between the friction member and the support member, so as to receive a force from the friction member in frictional contact with the rotor, the force switch being selectively placed in one of two states, depending upon whether the force received from the friction member is larger than a predetermined threshold which is not zero, the relationship estimating and utilizing device utilizing an output of the force switch to obtain the actual value of the braking torque.

(47) An electrically operated braking system according to the above mode (46), wherein the rotor is a disc having a friction surface, and the friction member is a brake pad which is movable into frictional contact with the friction surface, the force switch being disposed in a position at which a spacing between the brake pad and the support member decreases with an increase in an amount of rotation of the brake pad with the disc.

(48) An electrically operated braking system according to the above mode (46) or (47), wherein the relationship estimating and utilizing device further includes a pressing-force-related quantity sensor whose output varies continuously with a quantity relating to a pressing force generated by the electric motor to force the friction member onto the rotor, the relationship estimating and utilizing device using the output of the pressing-force-related quantity sensor as a quantity relating to the actual value of the electric power supplied to the electric motor.

(49) An electrically operated braking system according to the above mode (48), wherein the relationship estimating and utilizing device further includes a braking force estimating device for estimating the braking torque to be applied to the wheel, on the basis of the output of the pressing-force-related quantity sensor and according to a predetermined relationship between the output and the braking torque, the braking force estimating device compensating the predetermined relationship on the basis of the output when the force switch is switched from one of the two states to the other states.

(50) An electrically operated braking system according to the above mode (49), wherein the braking force estimating device includes relationship compensating means for compensating the predetermined relationship, on the basis of a difference between an actual value of the output and a nominal value of the output when the force sensor is switched from one of the two states to the other.

(51) An electrically operated braking system of a motor vehicle having a wheel, comprising: (a) a rotor rotating with the wheel; (b) a brake operating member which is operated by an operator of the motor vehicle; (c) an electric power source; (d) a brake including a friction member movable to be forced onto the rotor, and an electric motor which is operated by an electric power supplied from the electric power source, to generate a drive force for forcing the friction member onto the rotor and thereby braking the wheel; and (e) a controller which determines an amount of the electric power to be supplied from the electric power source to the electric motor, depending upon an operating amount of the brake operating member, for thereby controlling an operation of the brake, the braking system characterized by further comprising (f) a relationship estimating and utilizing device for obtaining an actual value of a physical quantity relating to the electric power supplied from the electric power source to the electric motor during an operation of the brake while the motor vehicle is running, and an actual value of a physical quantity relating to a braking torque applied from the brake to the wheel during the operation of the brake, for estimating a relationship between the electric power to be supplied to the electric motor and the braking torque to be applied to the wheel, on the basis of the actual values obtained, and for utilizing the relationship, the relationship being formulated such that the braking torque to be applied to the wheel being changed with a change in the electric power to be supplied to the electric motor.

According to the present invention, there is also provided:

(52) An electrically operated brake for a motor vehicle having a wheel, comprising a rotor rotating with the wheel, a friction member movable to be forced onto the rotor, an electric motor operated to generate a drive force for forcing the friction member onto the rotor, and a self-servo mechanism which is operated such that a friction force between the friction member and the rotor is increased by the friction force, the electrically operated brake being characterized by further comprising a biasing mechanism interposed between the friction member and a stationary member which supports the friction member, the biasing mechanism biasing the friction member in a direction for moving the friction member away from the rotor.

In an electrically operated brake provided with a self-servo mechanism, there is a general tendency that the friction member cannot be moved away from the rotor with a high response to a command generated to return the electric motor to its initial position, once the self-servo mechanism is activated to provide a self-servo effect. Therefore, the braking torque cannot be rapidly reduced to zero. In the brake according to the above mode (52) in which the biasing mechanism is provided, the biasing mechanism is effective to rapidly move the friction member away from the rotor, thereby permitting rapid reduction of the braking torque.

The biasing mechanism may be adapted to hold the friction member in the biased state, or bias the friction member only when it is required to rapidly reduce the braking torque.

(53) A braking system for a motor vehicle having a wheel, comprising: (a) a rotor rotating with the wheel; (b) a friction member movable to be forced onto the rotor, for braking the wheel; (c) a support member for supporting the friction member in frictional contact with the rotor so as to prevent the friction member from being rotated with the rotor; (d) a pressing device for forcing the friction member into frictional contact with the rotor; and (e) a force switch which is interposed between the friction member and the support member, so as to receive a force from the friction member in frictional contact with the rotor, the force switch being selectively placed in one of two states, depending upon whether the force received from the friction member is larger than a predetermined threshold which is not zero.

The braking system constructed according to the above mode (53) of this invention provides an improvement over a conventional braking system which uses a braking-force-related quantity sensor for continuously detecting a physical quantity relating to braking force generated by a brake. This sensor may be a strain gage using an electrically resistive wire, or a piezoelectric sensor. The quantity which is detected by the sensor and which relates to the braking force changes over a relatively wide range. Accordingly, it is generally difficult for the sensor to detect the quantity with high accuracy over the entire range. Further, the operating environment of the sensor is considerably severe. Namely, the sensor may be subject to a considerable amount of change in the operating temperature and a considerably intense vibration, and is likely to be exposed to foreign matters such as mud, water and dust or grit. Thus, the braking-force-related quantity sensor used in the conventional braking system is not capable of detecting a quantity relating to the braking force, with a high degree of reliability, and does not have a satisfactory degree of durability.

The force switch used according to the above mode of the present invention is different from a sensor in that like a commonly used switch, the force switch is not capable of continuously detecting a physical quantity. However, the force switch is less likely to be influenced by the operating environment, as compared with a sensor, since the force switch is simpler in construction and operating principle. For instance, a relationship between the actual value of the physical quantity and the output of the force sensor is less likely to be influenced by the operating environment, that a relationship between the actual value of the quantity and the output of a sensor. Accordingly, the force switch is capable of detecting, with high reliability and durability, whether the force which the support member receives from the friction member as a physical quantity relating to the braking force has exceeded the predetermined value or has been reduced to the predetermined value.

(54) A braking system according to the above mode (53), wherein the rotor is a disc having a friction surface, and the friction member is a brake pad which is movable into frictional contact with the friction surface, the force switch being disposed in a position at which a spacing between the brake pad and the support member decreases with an increase in an amount of rotation of the brake pad with the disc.

(55) A braking system according to the above mode (1) or (2), wherein the force switch is provided at each of a plurality of positions between the friction member and the support member, and the force switches at the different positions have respective different predetermined threshold values of the force received from the friction member.

In the braking system according to the above mode (55), the quantity relating to the braking force can be detected in two or more steps by the respective force sensors.

(56) A braking system according to any one of the above modes (53)–(55), wherein the force switch includes a pair of contacts which are movable relative to each other between two positions corresponding to the above-indicated two states, and one of the contacts is fixed to the friction member while the other contact is fixed to the support member.

The force switch in the braking system according to the above mode (56) is relatively simple in construction and operating principle, and accordingly assures increased operating reliability and durability.

(57) A braking system according to the above mode (56), wherein the contact fixed to the friction member is a movable contact, while the contact fixed to the support member is a stationary contact.

(58) A braking system according to any one of the above modes (53)–(57), wherein the pressing device includes an electric motor as a drive source, and does not use a pressurized hydraulic fluid.

(59) A braking system according to any one of the above modes (53)–(57), wherein the pressing device uses a pressurized hydraulic fluid.

(60) A braking system according to any one of the above modes (53)–(59), wherein the friction member, support member, pressing device and force switch cooperate to constitute a major portion of a brake, the braking system further comprising a brake information obtaining device for obtaining brake information relating to an operation of the brake.

In the braking system according to the above mode (60), the brake information may include a friction coefficient of the friction member, information as to whether the friction coefficient of the friction member is unacceptably low or not, information as to whether the brake is abnormal, and a friction coefficient between the Wheel and the road surface.

(61) A braking system according to any one of the above modes (53)–(59), further comprising: a pressing-force-related quantity sensor whose output varies continuously with a quantity relating to a pressing force by which the friction member is forced onto the rotor by the pressing device; and a friction coefficient estimating device for estimating a friction coefficient of the friction member, on the basis of a relationship between the output of the pressing-force-related quantity sensor and the predetermined threshold.

In the braking system according to the above mode (61), the friction coefficient of the friction member can be estimated by the friction coefficient estimating device, so that the braking system can be controlled with high accuracy, by utilizing the estimated friction coefficient.

(62) A braking system according to the above mode (61), wherein the pressing device includes a presser member which is disposed on one of opposite sides of the friction member remote from the rotor, so as to force the friction member onto the rotor, and the pressing-force-related quantity sensor includes a pressing-force sensor provided on the presser member to continuously detect a force which acts on the presser member in a direction of movement of the presser member toward the friction member.

(63) A braking system according to the above mode (61), wherein the pressing device includes an electric motor for forcing the friction member onto the rotor, and the pressing-force-related quantity sensor includes an electric power sensor for continuously detecting an amount of electric power supplied to the electric motor.

(64) A braking system according to the above mode (63), wherein the electric power sensor is a motor current sensor for continuously detecting an amount of electric current supplied to the electric motor.

(65) A braking system according to any one of the above modes (61)-(64), wherein the above-indicated two states of the force sensor consists of an on state and an off state, the state of the force switch being changed from one of the on and off states to the other when the force received from the friction member has increased and exceeded the above-indicated predetermined threshold, and is changed from the above-indicated other state to the above-indicated one state, and wherein the friction coefficient estimating device estimates the friction coefficient of the friction member when at least one of a change from the above-indicated one state to the other state and a change from the above-indicated other state to the above-indicated one state takes place.

(66) A braking system according to the above mode (65), wherein the friction coefficient estimating device estimates the friction coefficient of the friction member when each of the changes between the on and off states takes place.

In the braking system according to the above mode (66), the friction coefficient is estimated at the two opportunities, namely, when the force switch is turned on and when the force switch is turned off. Accordingly, the accuracy of estimation of the friction coefficient can be improved, as compared with the accuracy of estimation where the friction coefficient is estimated only once, that is, when the force switch is turned on or turned off.

(67) A braking system according to any one of the above modes (61)–(66), wherein said friction coefficient estimating device estimates the friction coefficient of the friction member, by dividing the above-indicated predetermined threshold by the quantity as detected by the pressing-force-related quantity sensor when the state of the force switch is changed from one of the above-indicated two states to the other.

(68) A braking system according to any one of the above modes (61)–(67), further comprising a brake pad fade detecting device for detecting that the friction coefficient estimated by the friction coefficient estimating device is lower than a predetermined lower limit.

(69) A braking system according to any one of the above modes (53)–(59), wherein the friction member, support member, pressing device and force switch cooperate to constitute a major portion of a brake, the braking system further comprising: a physical quantity sensor for detecting a physical quantity which relates to an operation of the brake and which excludes a force acting on the force switch, the physical quantity changing in relation to the force acting on the force switch, depending upon whether the brake is abnormal or not; and a brake failure detecting device for detecting whether the brake is abnormal or not, on the basis of a relationship between an output of the physical quantity sensor and an output of the force switch.

(70) A braking system according to any one of the above modes (53)–(59), wherein the friction member, support member, pressing device and force switch cooperate to constitute a major portion of a brake, the braking system further comprising a road surface friction coefficient estimating device for estimating a friction coefficient between the wheel and a road surface on which the motor vehicle is running, on the basis of an output of the force switch.

(71) A braking system according to any one of the above modes (53)–(70), wherein said pressing device includes an electric motor for forcing the friction member onto the rotor, and cooperates with the rotor, friction member, support member and force sensor to constitute an electrically operated brake, the braking system further comprising a mechanically operated brake which is operated mechanically to brake the wheel by a force generated by a manually operated brake operating member, and a manual brake control device disposed between the mechanically operated brake and the brake operating member, for permitting an operation of the mechanically operated brake when the electrically operated brake is abnormal, and inhibiting the operation of the mechanically operated brake when the electrically operated brake is normal.

In the braking system according to the above mode (71), the electrically operated brake is used as a normal brake, and the mechanically operated brake is used as an emergency brake which is activated by the force generated by the brake operating member. Thus, the present braking system is provided with an electrically operated sub-system including the brake operating member and the electrically operated brake, and a mechanically operated sub-system including the brake operating member, the manual brake control device and the mechanically operated brake. Therefore, the present braking system is capable of braking the wheel with the braking force corresponding to the operating force acting on the brake operating member, even when the electrically operated brake is abnormal or defective. Accordingly, the present braking system has increased operating reliability and improved safety of the vehicle.

In the present braking system, the mechanically operated brake and the manual brake control device may or may not use a pressurized hydraulic fluid.

The electrically operated brake may be adapted to be operated according to an intention of the vehicle operator, which is represented by an operation of the brake operating member. For instance, the electrically operated brake may be operated according to the operating force acting on the brake operating member, or the operating amount or stroke of the brake operating member.

In the present braking system, the friction member and the rotor may be commonly used for the electrically and mechanically operated brakes. Alternatively, the electrically and mechanically operated brakes may use respective sets of the friction member and rotor.

(72) A braking system according to the above mode (71), further comprising a brake information obtaining device for obtaining information relating to the electrically operated brake, on the basis of an output of the force switch, and wherein the brake information obtaining device is inhibited from operating when the manual brake control device is operated.

In the braking system according to the above mode (72), the information relating to the electrically operated brake includes information which has been described above with respect to the above mode (60).

(73) A braking system according to any one of the above modes (53)–(59), wherein the friction member, support member, pressing device and force switch constitute a major portion of a brake, the braking system further comprising: a force-related quantity sensor whose output varies continuously with a quantity relating to one of a braking force generated by the brake and applied to the wheel and a pressing force generated by the pressing device to force the friction member onto the rotor; a wheel braking force estimating device for estimating the braking torque to be applied to the wheel, on the basis of the output of the force-related quantity sensor and according to a predetermined relationship between the output and the braking torque, the wheel braking force estimating device compensating the predetermined relationship on the basis of the output when the force switch is switched from one of the two states to the other state.

It will be understood from the foregoing description that the force switch is advantageous for its comparatively high operating reliability but is disadvantageous for its incapability of continuous detection of the force, while on the other hand the force-related quantity sensor is advantageous for its capability of continuous detection of the force-related quantity but is disadvantageous for its comparatively low operating reliability. Thus, the force switch and the force-related quantity sensor mutually supplement their disadvantages, cooperating with each other to permit continuous detection of the force-related quantity with high reliability. The braking system according to the above mode (73) is based on this finding.

Where the force-related quantity sensor in the braking system according to the above mode (73) is a pressing-force-related quantity sensor adapted to continuously detect a quantity relating to the pressing force generated by the pressing device, the quantity detected by this pressing-force-related quantity sensor is not influenced by a variation in the friction coefficient of the friction member, but the output of the force switch is influenced by the variation. In this case, the wheel braking force estimating compensates the above-indicated relationship by taking account of both the variation in the operating characteristic of the pressing-force-related sensor and the variation in the friction coefficient of the friction member. Where the force-related quantity sensor is a braking-force-related quantity sensor adapted to continuously detect a quantity relating to the braking force applied to the wheel, the force detected by the force switch and the quantity detected by the braking-force-related quantity sensor are substantially the same physical quantities which are not influenced by the variation in the friction coefficient of the friction member. In this case, the wheel braking force estimating device compensates the above-indicated relationship by adjusting the calibration of the braking-force-related quantity sensor.

The above-indicated relationship may be either directly compensated, or indirectly or eventually compensated. In the latter case, the output of the force-related quantity sensor may be compensated, or alternatively the wheel braking force provisionally estimated may be compensated on the basis of the output of the sensor and the predetermined relationship.

(74) A braking system according to the above mode (73), wherein the force-related quantity sensor includes a pressing force sensor whose output continuously varies with the pressing force acting thereon.

The operating environment of the pressing force sensor is not so severe as compared with that of the a braking force sensor which will be described. In the braking system according to the above mode (74), therefore, the operating reliability and durability of the pressing force sensor can be relatively easily improved.

(75) A braking system according to the above mode (73), wherein the force-related quantity sensor includes a braking force sensor whose output continuously varies with the force which the support member receives from the friction member as the braking force applied to the wheel.

(76) A braking system according to any one of the above modes (73)–(75), wherein the wheel braking force estimating device includes relationship compensating means for compensating the predetermined relationship, on the basis of a difference between an actual value of the output and a nominal value of the output when the force sensor is switched from one of the two states to the other.

(77) A braking system according to the above mode (76), wherein the relationship compensating means compensates the predetermined relationship such that the pressing force obtained on the basis of the actual value of the output of the braking force sensor coincides with the actual value of the pressing force, even in the presence of the above-indicated difference.

(78) A braking system according to any one of the above modes (73)–(77), further comprising a brake information estimating device for obtaining brake information relating to an operation of the brake, on the basis of the output of the force switch.

The brake information estimating device and "brake information relating to an operation of the brake" in the above mode (78) are similar to those which have been discussed above with respect to the above mode (60) of this invention.

(79) A braking system according to the above mode (78), wherein the brake information estimating device includes a friction coefficient estimating device for estimating a friction coefficient of the friction member, on the basis of a relationship between the output of the brake-related quantity sensor and the above-indicated predetermined threshold of the force switch when the force switch is switched from one of the two states to the other.

The friction coefficient estimating device according to the above mode (79) is similar to that which has been discussed above with respect to the above mode (61).

BRIEF DESCRIPTION OF THE DRAWINGS

The above and optional objects, features, advantages and technical and industrial significance of this invention will become more apparent by reading the following detailed description of presently preferred embodiments or modes of the invention, when considered in connection with the accompanying drawings, in which.

DETAILED DESCRIPTION OF THE PREFERRED EMBODIMENTS

Figure 1:
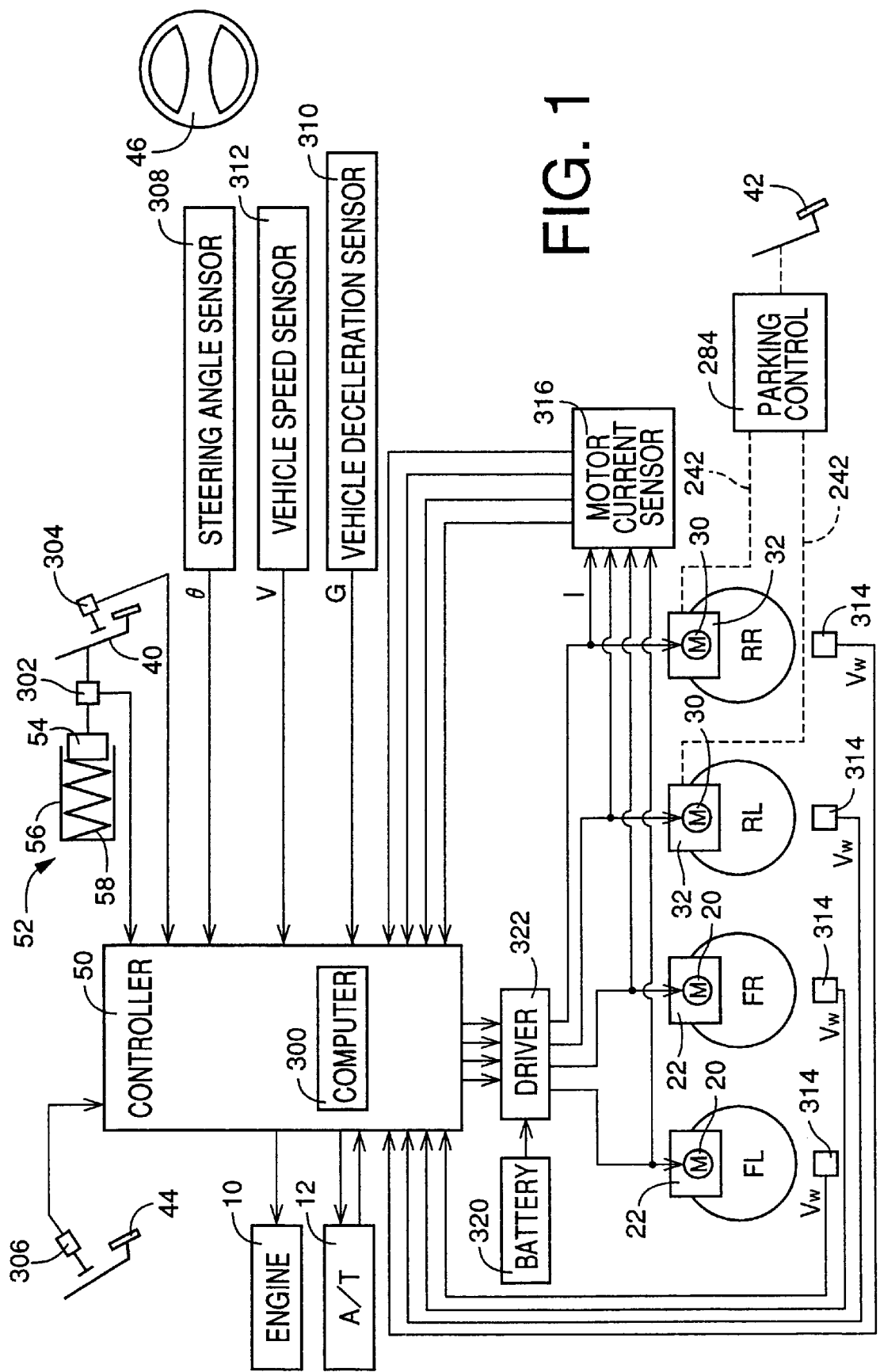
FIG. 1 is a schematic view showing an arrangement of an electrically operated braking system constructed according to one embodiment of this invention.

Referring first to FIG. 1, there is shown an arrangement of an electrically operated braking system constructed according to a first embodiment of this invention. This electrically operated braking system is adapted for use on a four-wheel motor vehicle having a front left wheel FL, a front right wheel FR, a rear left wheel RL and a rear right wheel RR. The motor vehicle has a drive power source in the form of an internal combustion engine 10, and a power transmission in the form of an automatic transmission 12. The motor vehicle is run with a drive force generated by the engine 10 and transmitted through the automatic transmission 12 to the front wheels FL, FR and/or the rear wheels RL, RR.

The front left and right wheels FL, FR have respective electrically operated disc brakes 22, 22 each including an electric motor 20 as a drive source, while the rear left and right wheels RL, RR have respective electrically operated drum brakes 32, 32 each including an electric motor 30 as a drive source. In the present first embodiment of the invention, each of these electric motors 20, 30 is a DC motor.

However, all of the motors 20, 30 may be ultrasonic motors. Alternatively, the motors 20 for the front wheels FL, FR and the motors 30 for the rear wheels RL, RR may be ultrasonic motors and DC motors, respectively, or vice versa.

The motor vehicle is provided with various operator-controlled members including: a brake pedal 40 as a primary brake operating member (one of brake operating members); a parking brake pedal 42 as a parking brake operating member; an accelerator pedal 44 as an accelerator operating member; and a steering wheel 46. When the brake pedal 40 is operated, the electrically operated disc and drum brakes 22, 32 for the four wheels FL, FR, RL, RR are activated to apply a brake to the vehicle. When the parking brake pedal 42 is operated, the electrically operated drum brakes 32 for the rear left and right wheels RL, RR are activated to apply a parking brake to the vehicle. When the accelerator pedal 44 is operated, the drive force or power generated by the engine 10 is increased to accelerate the vehicle. When the steering wheel 46 is rotated, a steering device as well known in the art is activated to change the steering angles of the front wheels FL, FR (or front and rear wheels).

In the present electrically operated braking system, an operation of the brake pedal 40 as the primary brake operating member causes a controller 50 to energize the electric motors 20, 30 for activating the disc and drum brakes 22, 32 to generate braking forces for braking the four wheels. Thus, the force produced by the brake pedal 40 upon operation thereof by the vehicle operator is not used to brake the vehicle. However, the operating amount of the brake pedal 40 should change depending upon the operating force acting on the brake pedal 40, so that the vehicle operator is given an operating feel of the brake pedal 40 similar to that in the conventional hydraulically operated braking system. To this end, the brake pedal 40 is connected to a stroke simulator 52, so that the operating amount of the brake pedal 40 will change depending upon the operating force applied to the brake pedal 40. The stroke simulator 52 includes (a) a linking member 54 linked with the brake pedal 40, (b) a guide member 56 for guiding the linking member 54, and (c) an elastic member in the form of a spring 58 whose elastic force changes due to contraction and expansion thereof as the linking member 54 is moved by the brake pedal 40. The operating amount (stroke) of the brake pedal 40 changes with a change in the elastic force of the spring 58 depending upon the operating force of the brake pedal 40.

Figure 2:
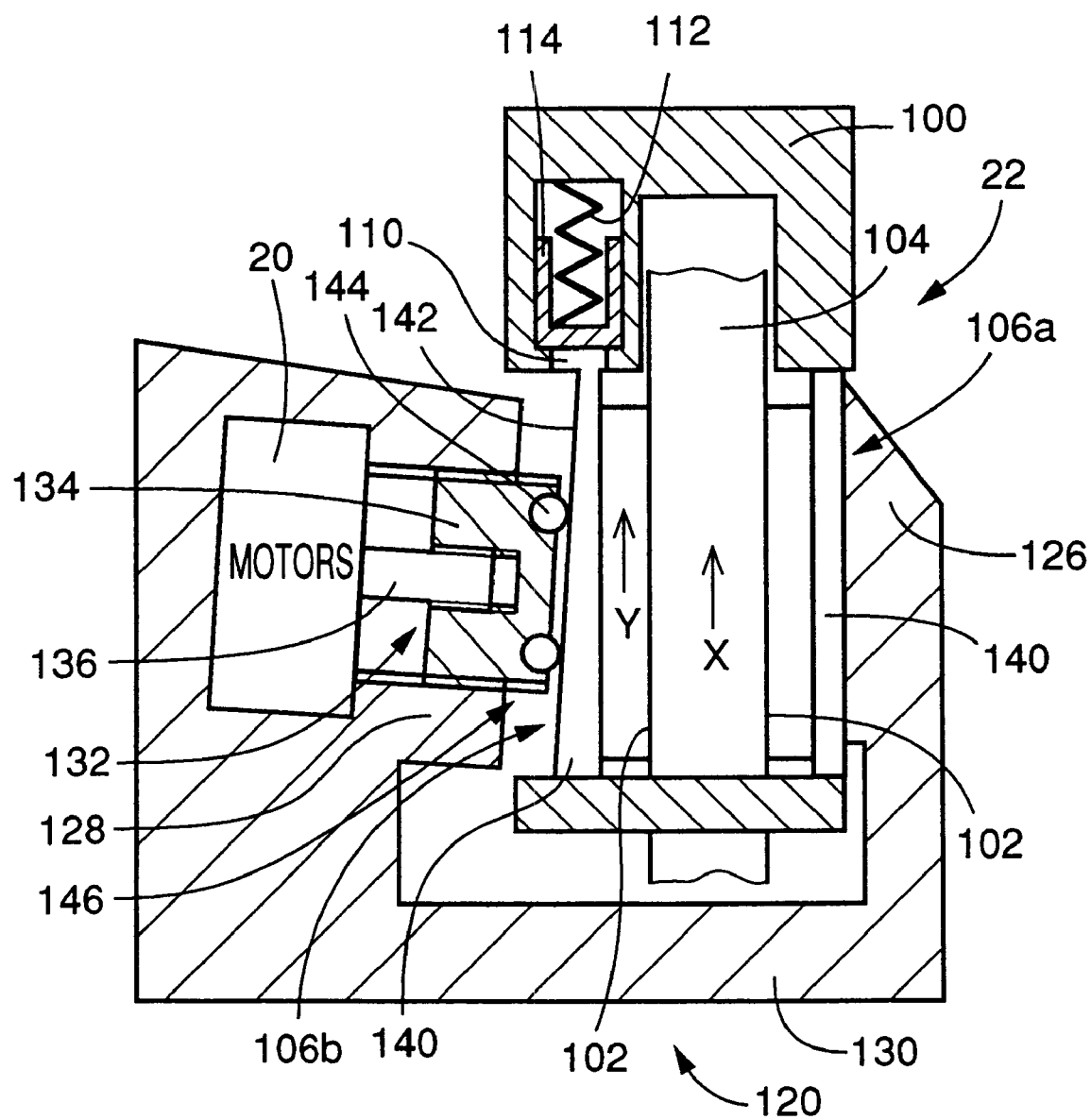
FIG. 2 is an enlarged plan view partly in cross section of an electrically operated disc brake used in the braking system of FIG. 1.

Referring to FIG. 2, the construction of the electrically operated disc brake 22 for the front right wheel FR is shown in detail, by way of example. The disc brake 22 for the front left wheel FL has the same construction.

The electrically operated disc brake 22 includes a mounting bracket 100 which is a stationary member fixed to the body of the motor vehicle, and a disc rotor 104 which has opposite friction surfaces 102 and which is rotated with the front right wheel FR. The mounting bracket 100 includes (a) a support portion for supporting a pair of friction members in the form of brake pads 106a, 106b on the opposite sides of the disc rotor 104 such that the brake pads 106a, 106b are movable in the axial direction of the disc rotor 104, and (b) a torque receiving portion for receiving friction forces generated between the friction surfaces 102 of the disc rotor 104 and the brake pads 106a, 106b during frictional contact therebetween. Character "X" in FIG. 2 represents a rotating direction of the disc rotor 104 for forward running of the motor vehicle.

The outer brake pad 106a located on the outer side (right side as seen in FIG. 2) of the disc rotor 104 is supported by the mounting bracket 100 such that the outer brake pad 106a is substantially prevented from rotating with the disc rotor 104 during its friction contact with the outer friction surface 102, namely, substantially prevented from being "dragged" by the disc rotor 104. On the other hand, the inner brake pad 106b on the inner side (left side as seen in FIG. 2) of the disc rotor 104 is supported by the mounting bracket 100 such that the inner brake pad 106b is allowed to be "dragged" by the disc rotor 104 due to friction contact of the pad 106b with the inner friction surface 102. Character "Y" in FIG. 2 represents a direction of "dragging" movement of the inner brake pad 106b due to its frictional contact with the disc rotor 104.

The dragging movement of the inner brake pad 106b is prevented when the friction force generated between the disc rotor 104 and the brake pad 106b is smaller than a predetermined threshold value, and is allowed after the friction force has exceeded the threshold value. To this end, the inner brake pad 106b has a rear portion 110 which engages the mounting bracket 100 through an elastic member in the form of a spring 112. When the friction force between the inner brake pad 106b and the disc rotor 104 is smaller than the threshold, the spring 112 does not undergo elastic deformation and prevents the dragging movement of the inner brake pad 106b with the disc rotor 104. When the friction force of the inner brake pad 106b has exceeded the threshold, the spring 112 starts elastic deformation and allows the inner brake pad 106b to be dragged with the disc rotor 104. In the present embodiment, the rear portion 110 of the inner brake pad 106b is associated with a stop 114 which is adapted to abut on the mounting bracket 100, for thereby limiting the distance of the dragging movement of the brake pad 106b after the friction force of the inner brake pad 106b has exceeded the threshold. Thus, the stop 114 prevents an excessive degree of a self-servo effect which will be described.

The disc brake 22 further includes a caliper 120 which is movable in the axial direction of the disc rotor 104 but is not rotatable about the axis of rotation of the disc rotor 104. The caliper 120 is slidably supported by a plurality of pins (not shown) which are fixed to the vehicle body so as to extend in the axial direction of the rotor 104. The caliper 120 includes (a) a reaction portion 126 located on the outer side of the disc rotor 104, for abutting contact with the outer surface of the outer brake pad 106a, (b) a presser portion 128 located on the inner side of the disc rotor 104, for abutting contact with the inner surface of the inner brake pad 106b, and (c) a connecting portion 130 connecting the reaction and presser portions 126, 128 together.

The presser portion 128 accommodates the electric motor 20, and carries a presser member 134 which is linked with the motor 20 through a motion converting mechanism in the form of a ballscrew mechanism 132 such that the presser member 134 and the motor 20 are coaxial with each other. The presser member 134 is supported by the presser portion 128 such that the presser member 134 is not rotatable about the axis of rotation of the motor 20, but is movable in the axial direction of the motor 20. A rotary motion of the motor 20 is converted by the ballscrew mechanism 132 into a linear motion of the presser member 134 in the axial direction of the motor 20, so that a drive force generated by the motor 20 is applied to the inner brake pad 106b, and also to the outer brake pad 106a through the caliper 120, whereby the outer and inner brake pads 106a, 106b are forced onto the opposite friction surfaces 102 of the disc rotor 104.

The outer brake pad 106a has a backing plate 140 whose thickness is constant in the rotating direction X. On the other hand, the inner brake pad 106b has a backing plate 140 whose thickness continuously decreases in the direction Y of the dragging movement, that is, in the forward running direction of the vehicle. Described in detail, the backing plate 140 of the inner brake pad 106b has a slant back surface 142 which is remote from the inner friction surface 102 of the disc rotor 104 and which is inclined with respect to the inner friction surface 102. Thus, the presser member 134 is adapted to contact at its front end with the slant back surface 142 of the inner brake pad 106b. Further, the presser member 134 is provided at its front end face with means for facilitating movement of the inner brake pad 106b relative to the presser member 134 while the front end face of the presser member 134 is in contact with the slant back surface 142 of the backing plate 140. This arrangement makes it possible to provide a wedge effect between the inner brake pad 106b and the presser member 134 during the dragging movement of the inner brake pad 106b, so that the dragging movement of the inner brake pad 106b provides a self-servo effect in the disc brake 22. In this embodiment, the axis of the motor 20 (presser member 134) is perpendicular to the slant back surface 142 of the inner brake pad 106b.

The above-indicated means for facilitating the relative movement between the inner brake pad 106b and the presser member 134 includes a plurality of balls 144 which are arranged on the front end face of the presser member 134 along a circle coaxial with the motor 20, at a substantially equal angular interval. The balls 144 are held on the front end face such that the balls 144 may roll in contact with the slant back surface 142. Thus, the balls 144 serve as a thrust bearing 146 through which the presser member 134 comes into contact with the inner brake pad 106b, so that the thrust bearing 146 reduces the friction between the front end face of the presser member 134 and the slant back surface 142 of the inner brake pad 106b. The balls 144 may be replaced by rollers.

There will be described an operation of the electrically operated disc brake 22 of FIG. 2.

When the brake pedal 40 is depressed by the vehicle operator, the motor 20 is operated to advance the presser member 134 from its non-operated position, for forcing the outer and inner brake pads 106a, 106b against the respective friction surfaces 102 of the disc rotor 104, so that the front wheel FR is braked with the friction forces generated between the disc rotor 104 and the brake pads 106a, 106b.

When the friction force between the inner brake pad 106b and the disc rotor 104 is smaller than a predetermined elastic or biasing force of the spring 112, the dragging movement of the inner brake pad 106b is prevented by the spring 112, so as to prevent the self-servo effect. In an initial period of operation of the disc brake 22 with a relatively small operating force acting on the brake pedal 40, the friction force between the inner brake pad 106b and the disc rotor 104 is smaller than the elastic force of the spring 112, the front right wheel is braked by only the drive force generated by the motor 20.

When the friction force of the inner brake pad 106b becomes larger than the elastic force of the spring 112, the spring 112 allows the inner brake pad 106b to be dragged with the disc rotor 104. With the movement of the slant back surface 142 relative to the presser member 134, the distances between the slant back surface 142 and the friction surface 102 at the points of contacts between the balls 144 and the slant back surface 142 increase, with a result of an increase in the force by which the brake pads 106a, 106b are forced onto the disc rotor 104. Therefore, when the brake pedal 40 is depressed with a relatively large force (e.g., a force enough to achieve vehicle deceleration of about 0.3–0.6 G), there arises a wedge effect between the inner brake pad 106*b* and the presser member 134 which contact each other at the slant back surface 142, so that the front right wheel FR is braked by both the drive force of the motor 20 and the self-servo effect owing to the dragging movement of the inner brake pad 106*b*.

When the stop 114 has come into abutting contact with the mounting bracket 100 with a further increase in the friction force between the inner brake pad 106*b* and the disc rotor 104, a further dragging movement of the brake pad 106*b* is prevented or inhibited by the stop 114, whereby an excessive degree of the self-servo effect is prevented.

Figure 3:
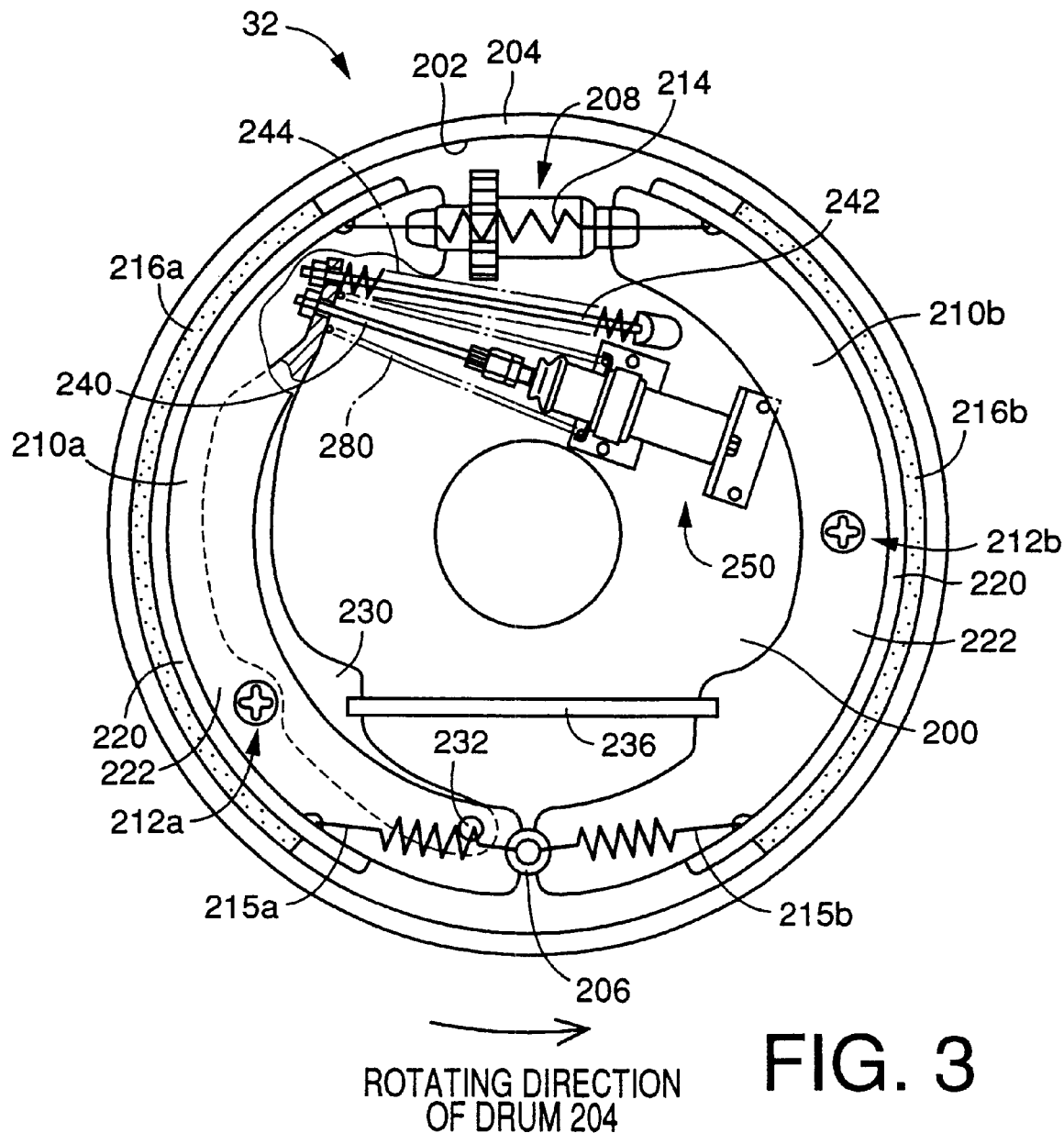
FIG. 3 is an enlarged front elevational view partly in cross section of an electrically operated drum brake used in the braking system of FIG. 1.

Referring next to FIG. 3, the construction of the electrically operated drum brake 32 for the rear left wheel RL is shown in detail, by way of example. The drum brake 32 for the rear right wheel RR has the same construction.

The electrically operated drum brake 32 includes a stationary member in the form of a substantially circular backing plate 200 fixed to the vehicle body, and a drum 204 which has an inner circumferential friction surface 202 and which rotates with the rear right wheel RR. The backing plate 200 has an anchor member in the form of an anchor pin 206 fixed to a relatively radially outer portion thereof at a given circumferential position thereof. At another circumferential position of the backing plate 200 which is diametrically opposite to the circumferential position at which the anchor pin 206 is fixed, there is disposed a connecting link in the form of an adjuster 208 of a floating type not directly fixed to the backing plate 200. A pair of friction members in the form of a pair of brake shoes 210*a*, 210*b* are disposed between and so as to connect the anchor pin 206 and the adjuster 208, such that the brake shoes 210*a*, 210*b* face the inner friction surface 202 of the drum 204. Each of the brake shoes 210*a*, 210*b* has an arcuate shape. The brake shoes 210*a*, 210*b* are fixed by respective hold-down devices 212*a*, 212*b* to the backing plate 200 such that the brake shoes 210*a*, 210*b* are movable in a plane parallel to the backing plate 200. The backing plate 200 has a central opening through which a rear axle shaft extends so as to be rotatable.

Each of the brake shoes 210*a*, 210*b* is operated connected at one end thereof to the corresponding end portion of the adjuster 208, and is held at the other end in abutting engagement with the anchor pin 206, so that the shoe 210*a*, 210*b* is pivotable about the anchor pin 206. An adjuster spring 214 is connected to the end portions of the brake shoes 210*a*, 210*b* operatively connected to the adjuster 208, so that the end portions are biased by the adjuster spring 214 toward each other. A return spring 215*a*, 215*b* is connected to the other end portions of the brake shoes 210*a*, 210*b*, so that these end portions are biased by the return spring 215*a*, 215*b* toward the anchor pin 206. The arcuate brake shoes 210*a*, 210*b* have respective arcuate brake linings 216*a*, 216*b* held at their outer surfaces such that the brake linings 216*a*, 216*b* face the circumferential friction surface 202 of the drum 204. With friction contact of these brake linings 216*a*, 216*b* with the friction surface 202, there arise friction forces between the brake linings 216*a*, 216*b* and the drum 204. The adjuster 208 is provided for the purpose of changing the radial distance between the friction surface 202 and the inner arcuate surfaces of the brake shoes 210*a*, 210*b*, so as to maintain a desired radial clearance between the friction surface 202 and the surfaces of the brake linings 216*a*, 216*b*, irrespective of gradual wearing of the brake linings.

Each brake shoe 210*a*, 210*b* consists of a rim 220 and a web 222. A lever 230 is pivotably connected at one end thereof to a lever support member in the form of a pin 232 fixed to the web 222 of the brake shoe 210*a*. The lever 230 and the web 222 of the other brake shoe 210*b* have respective cutouts which engages respective opposite ends of a strut 236 serving as a power transmitting member. The lever 230 and the strut 236 enable both of the brake shoes 210*a*, 210*b* of the present drum brake 32 to provide a self-servo effect during both forward and backward runs of the vehicle. Namely, the present drum brake 32 is a duo-servo type drum brake. In the present embodiment, the lever 230 is connected to the brake shoe 210*a* which functions as a secondary brake shoe during the forward running of the vehicle. However, the lever 230 may be connected to the brake shoe 210*b* which functions as a primary brake shoe during the forward running of the vehicle.

The present electrically operated drum brake 32 is activated by pivotal movement of the lever 230 about the pin 232 at its one end when the parking brake pedal 42 is operated, as well as when the brake pedal (primary brake pedal) 40 is operated. To this end, not only a primary brake cable 240 but also a parking brake cable 242 are connected to the other end of the lever 230. Each of these brake cables 240, 242 consists of a strand of a plurality of wires, and is accordingly flexible. A compression coil spring 244 is connected at its one end to the above-indicated other end of the lever 230 and at the other end to the backing plate 200, as in the conventional hydraulically operated braking system. The spring 244 extends coaxially with the parking brake cable 242.

Figure 4:
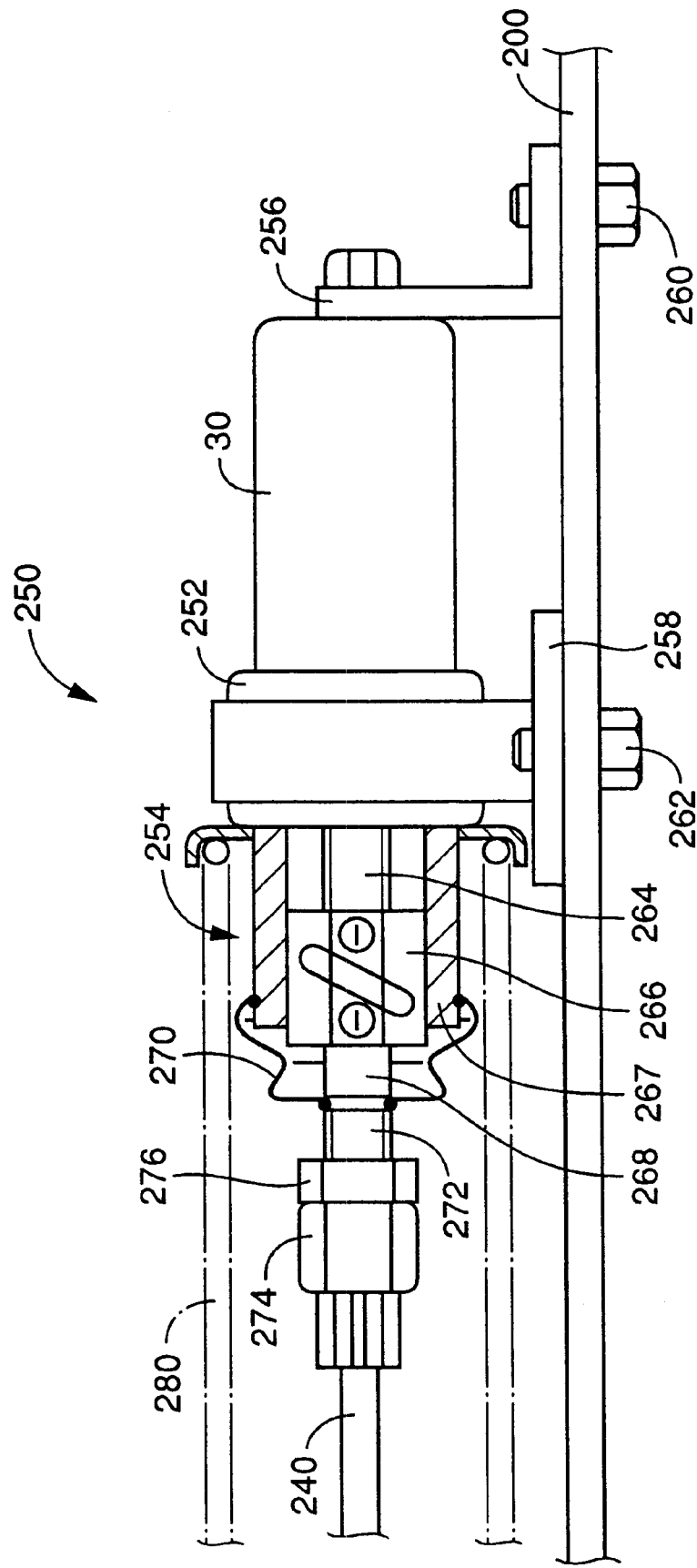
FIG. 4 is an enlarged, fragmentary side elevational view partly in cross section of a shoe expanding actuator used in the drum brake of FIG. 3.

The primary brake capable 240 is connected to a shoe expanding actuator 250 attached to the backing plate 200. As shown in enlargement in FIG. 4, the shoe expanding actuator 250 includes the electric motor 30 indicated above, a speed reducer 252 whose input shaft is connected to the output shaft of the motor 30, and a ballscrew mechanism 254 whose input member is connected to an output shaft of the speed reducer 252. The end of the primary brake cable 240 remote from the lever 230 is connected to an output member of the ballscrew mechanism 254. A rotary motion of the motor 30 is converted by the ballscrew mechanism 254 into a linear movement of the primary brake cable 240. In FIG. 4, reference numerals 256 and 258 denote brackets, while reference numerals 260 and 262 denote mounting screws for mounting the brackets 256, 258 to the backing plate 200.

The ballscrew mechanism 254 includes an externally threaded member 264 as the input member, a nut 266 as the output member, and a plurality of balls through which the externally threaded member 264 and the nut 266 engage each other. The nut 266 engages a stationary housing 267 such that the nut 266 is not rotatable and is axially movable relative to the housing 267. A rotary motion of the externally threaded member 264 is converted into a linear or axial motion of the nut 266. The nut 266 has an output shaft 268 fixed to its one end remote from the externally threaded member 264, such that the output shaft 268 is coaxial with the nut 266. The externally threaded member 264, nut 266 and output shaft 268 are protected against exposure of their engaging portions to dust or other foreign matters, by the housing 267 and an elastic dust boot 270.

The primary brake cable 240 is connected to the output shaft 268 through an externally threaded member 272 and a nut 274. The externally threaded member 272 is formed so as to extend from the end of the output shaft 268 remote from the ballscrew mechanism 254, while the nut 274 engages the externally threaded member 272 and is connected to the primary brake cable 240. A lock nut 276 is screwed on the externally threaded member 272 so as to lock the nut 274.

The shoe expanding actuator 250 constructed as described above is operated in one direction to pull the primary brake cable 240 upon operation of the brake pedal 40, so that the lever 230 is pivoted about the pin 232 such that the end portion of the lever 230 to which the primary brake cable 240 is connected is moved toward the brake shoe 210b. As a result, the two brake shoes 210a, 210b are moved away from each other.

After the shoe expanding actuator 250 is operated in the reverse direction and returned to its initial non-operated position, the brake shoes 210a, 210b are moved toward each other by a shoe contracting mechanism in the 73 form of a primary brake return spring 280, against a self-servo effect. The primary brake return spring 280 is a compression coil spring 280 which is connected at its one end to the lever 230 and at the other end to a stationary portion of the actuator 250. The compression coil spring 280 is disposed coaxially with the primary brake cable 240. Upon releasing of the brake pedal 40, the actuator 250 is returned to the initial position, and the lever 230 is pivoted to be returned to its initial non-operated position under the biasing force of the primary brake return spring 280. However, the spring 280 serving as the shoe contracting mechanism is not essential, and may be eliminated, particularly where the adjuster spring 214 and the shoe return springs 215a, 215b have relatively large elastic forces.

As shown in FIG. 1, the parking brake cable 242 is connected, at its end remote from the lever 230, to a parking control 284, which is mechanically operated by the parking brake pedal 42 so as to pull the parking brake cable 242 for pivoting the lever 230 in the shoe expanding direction for moving the two brake shoes 210a, 210b away from each other.

When the brake pedal 40 is operated, the shoe expanding actuator 250 is operated to pull the primary brake cable 240 for pivoting the lever 230 in the above-indicated shoe expanding direction. In this case, the parking brake cable 242 becomes slack. When the parking brake pedal 42 is operated, the parking control 284 is operated to pull the parking brake cable 242 for pivoting the lever 230 also in the shoe expanding direction. In this case, the primary brake cable 240 becomes slack. Since the two brake cables 240, 242 which are both connected to the lever 230 and pulled at different times are flexible, the operation of one these brake cables is not influenced or disturbed by the other brake cable.

While the structural arrangement of the present electrically operated braking system has been described, there will next be described a control arrangement of the braking system.

Referring back to FIG. 1, the braking system employs a controller 50 which is principally constituted by a computer 300 incorporating a central processing unit (CPU), a read-only memory (ROM) and a random-access memory (RAM). The controller 50 is adapted to receive various inputs, namely, output signals of various sensors and switches including an operating force sensor 302, a brake pedal operation detecting switch 304, an accelerator pedal operation detecting switch 306, a steering angle sensor 308, a vehicle deceleration sensor 310, a vehicle speed sensor 312, four wheel speed sensors 314 and a motor current sensor 316.

The operation force sensor 302 generates an output signal indicative of an operation force F which acts on the brake pedal 40. The brake pedal operation detecting switch 304 generates an output signal indicating whether the brake pedal 40 is in operation or not. The accelerator pedal operation detecting switch 306 generates an output signal indicating whether the accelerator pedal 44 is in operation or not. The steering angle sensor 308 generates an output signal indicative of a rotation angle e of the steering wheel 46. This sensor 308 serves as a sensor for detecting whether the vehicle is turning or not. The vehicle deceleration sensor 310 generates an output signal indicative of a deceleration value G of the motor vehicle in the running or forward direction. The vehicle speed sensor 312 generates an output signal indicative of a running speed V of the motor vehicle. The four wheel speed sensors 314 generate respective output signals indicative of rotating speed Vw of the respective wheels FL, FR, RL, RR. The motor current sensor 316 is connected to coils of the motors 20, 30 of the disc and drum rakes 22, 32, and generates output signals indicative of electric currents I which are actually applied to the respective coils of the motors 20, 30 from. a battery 320 through a driver 322. The output signals of the motor current sensor 316 are voltage signals representative of the electric current values I.

The controller 50 provides output signals including current control signals to be applied to the above-indicated driver 322. Upon operation of the brake pedal 40, the controller 50 applies the current control signals to the driver 322 so that the electric current values I to be applied from the battery 320 through the driver 322 to the respective motors 20, 30 of the brakes 22, 32 are controlled based on the current control signals. The output signals provided by the controller 50 also include signals to be applied to an engine output control device and a transmission control device. The engine output control device includes a throttle valve control device, a fuel supply control device and an ignition timing control device, while the transmission control device includes various solenoid-operated valves. The engine output control device and the transmission control device are controlled according to the signals from the controller 50, so as to control the wheel drive forces to be applied to the drive wheels, for preventing excessive amounts of spinning of the drive wheels during starting or acceleration of the vehicle, that is, for effecting a so-called "traction control" of the vehicle.

Figure 5:
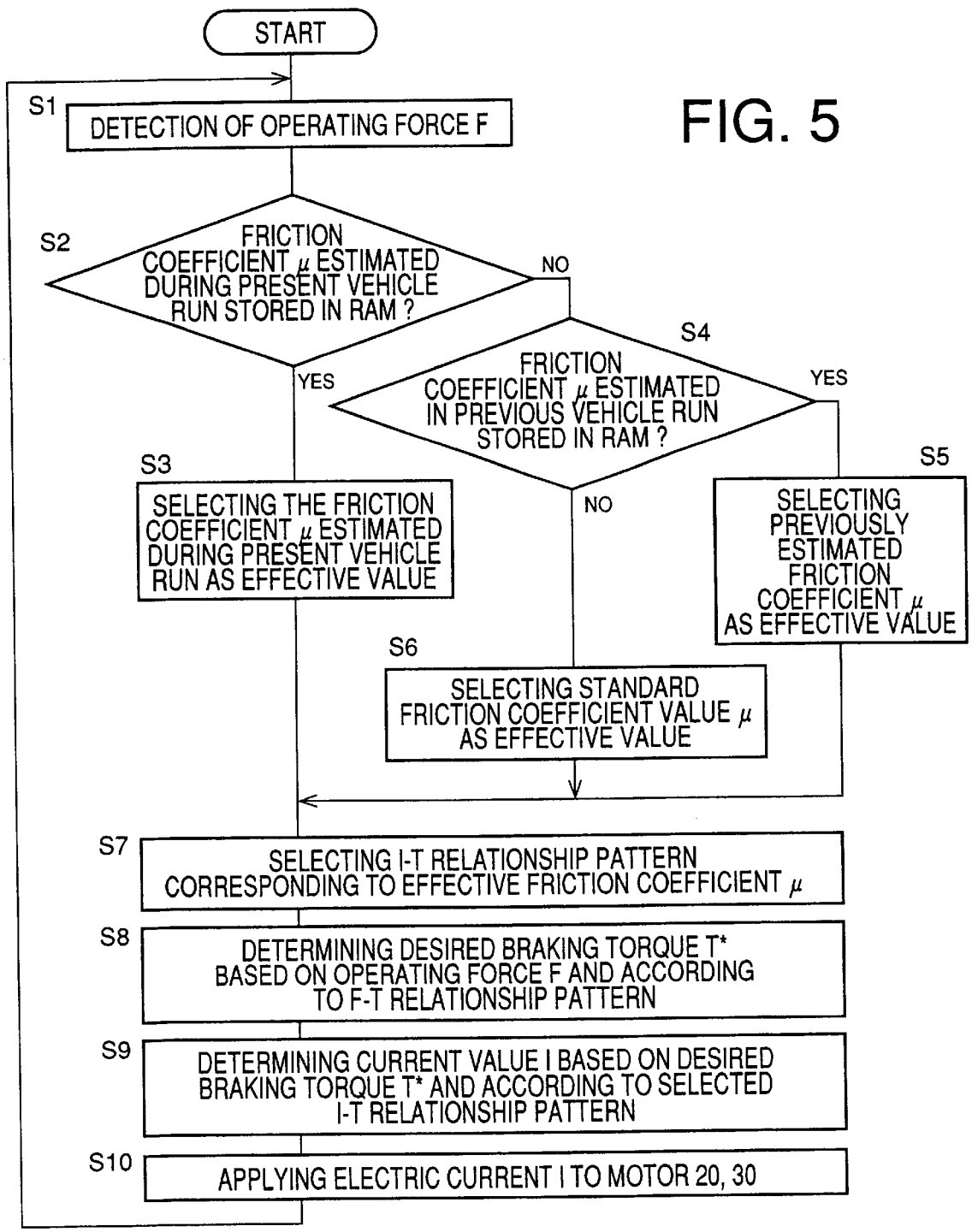
FIG. 5 is a flow chart illustrating a brake control routine executed according to a program stored in a ROM of a computer of the braking system of FIG. 1.
Figure 6:
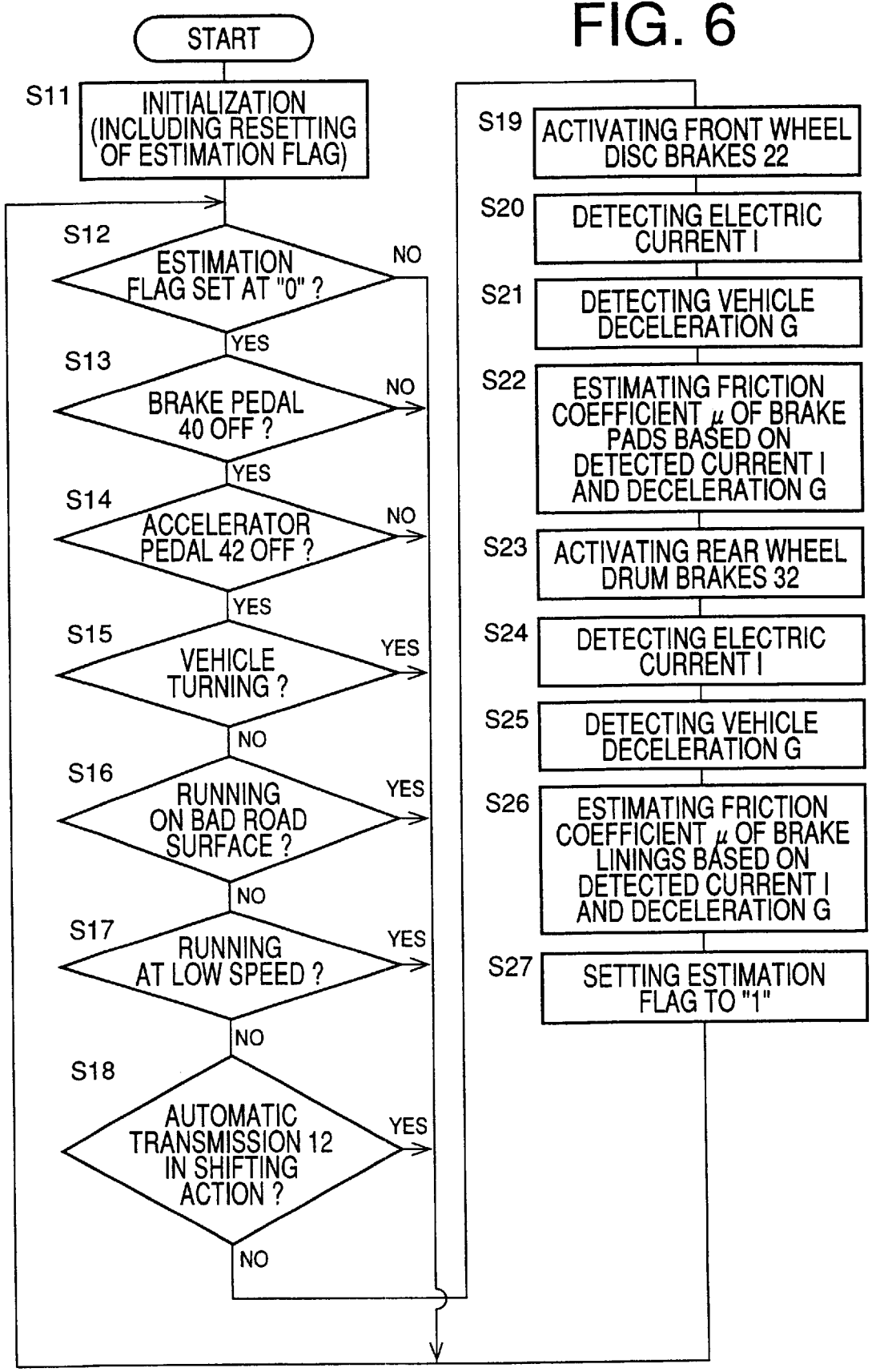
FIG. 6 is a flow chart illustrating a friction coefficient estimating routine executed according to a program stored in the ROM, to estimate the friction coefficient of friction members used in the braking system.

The ROM of the computer 300 stores various programs such as those for executing a brake control routine illustrated in the flow chart of FIG. 5 and a friction coefficient estimating routine illustrated in the flow chart of FIG. 6. The ROM is also used for storing data tables or functional equations which represent F-T relationship patterns and I-T relationship patterns.

Figure 7:
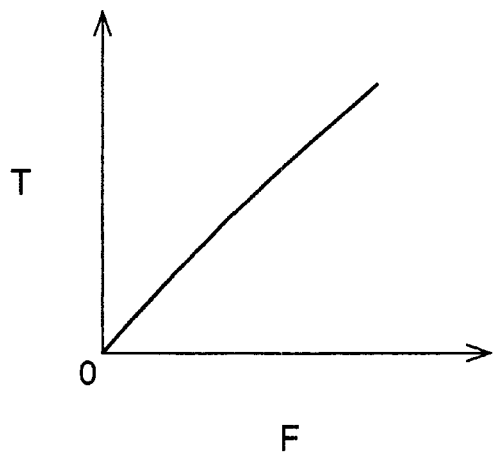
FIG. 7 is a graph indicating a pattern of relationship between an operating force F acting on a brake pedal and a braking torque T generated by the brake in the first embodiment.
Figure 8:
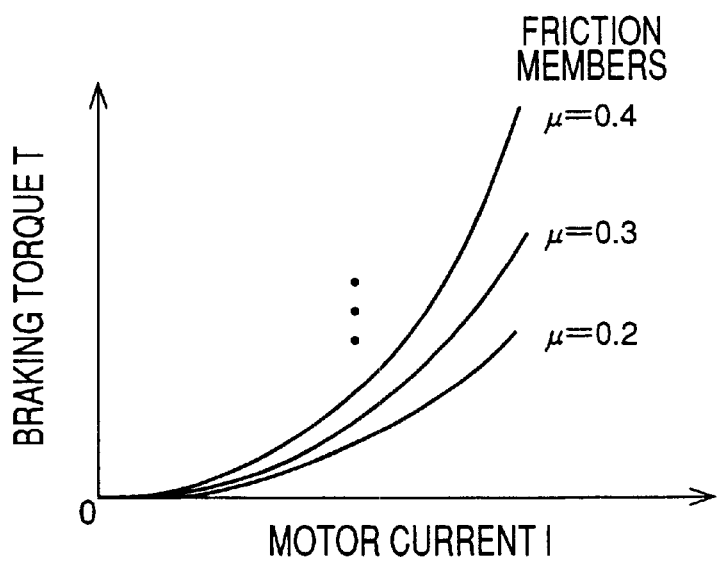
FIG. 8 is a graph indicating patterns of relationship between an current I applied to a motor of the brake and the braking torque T.

Each of the F-T relationships is a relationship between the operating force F acting on the brake pedal 40 and a braking torque T applied to each wheel by operation of the corresponding brake 22, 32. An example of the F-T relationship patterns is indicated in the graph of FIG. 7. Each of the I-T relationships is a relationship between the electric current I to be applied to each motor 20, 30 and the braking torque T applied to each wheel by operation of the corresponding brake 22, 32. The I-T relationships are obtained by experiments or by calculation. Examples of the I-T relationship patterns are indicated in the graph of FIG. 8. The F-T relationship patterns and I-T relationship patterns generally differ for the front wheels FL, FR and the rear wheels RL, RR, and are therefore stored in the ROM in relation to the front wheels and the rear wheels.

Each I-T relationship pattern indicates a change of the braking torque value T with a change in the electric current value I. This I-T relationship pattern is stored for each of the different friction coefficient values $\mu$ of the friction members used in the brakes 22, 32. That is, the ROM stores a plurality of I-T relationship patterns corresponding to the respective different friction coefficient values $\mu$. The friction members consist of the brake pads 106a, 106b of the disc brakes 22 for the front wheels FL, FR, and the brake linings 216a, 216b of the drum brakes 32 for the rear wheels RL, RR.

Before explaining in detail the brake control routine of FIG. 5 and the friction coefficient estimating routine of FIG. 6, the brake control and the friction coefficient estimation will first be briefly described.

Figure 9:
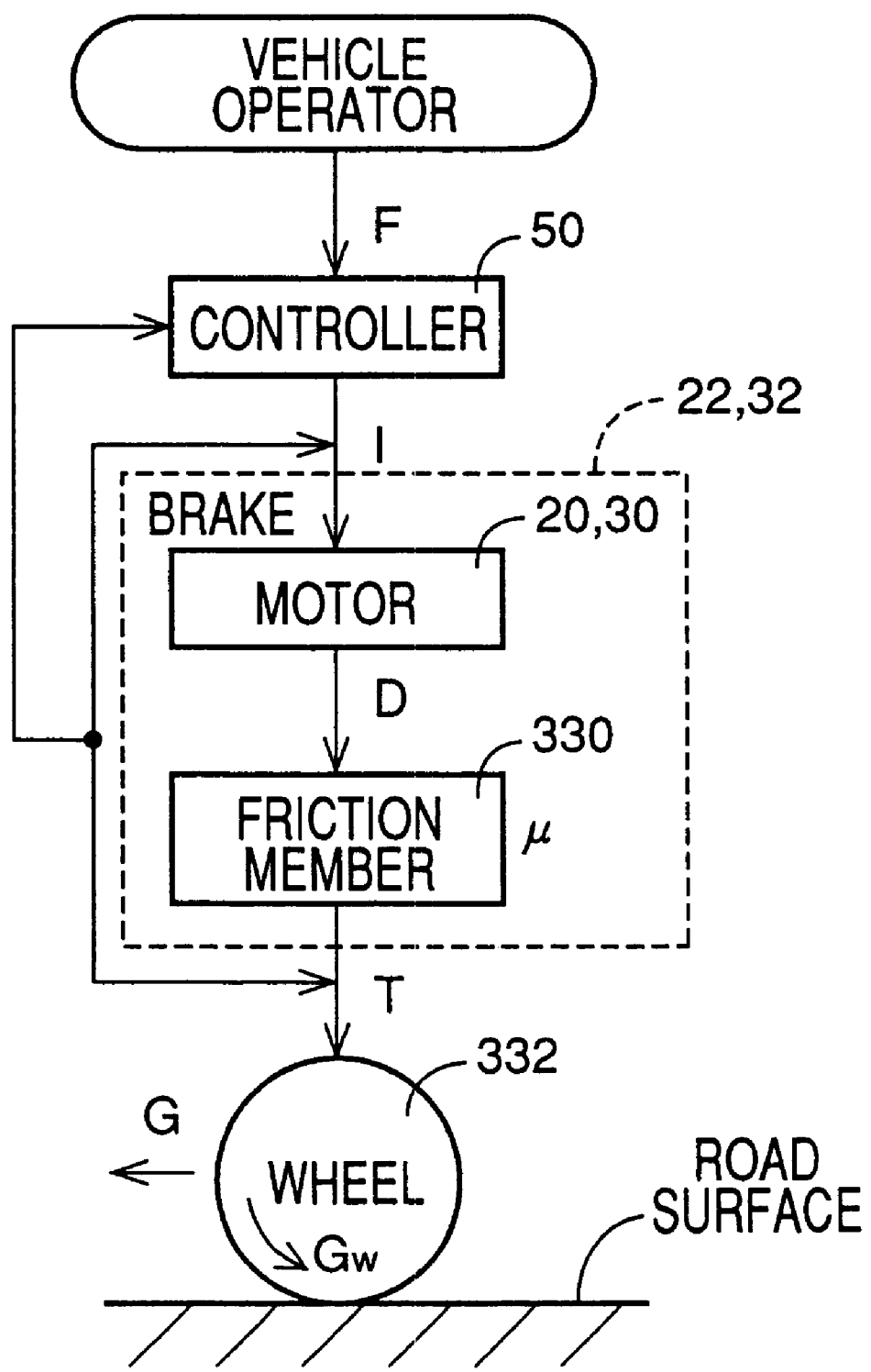
FIG. 9 is a diagram showing a concept of a braking operation of the braking system of the first embodiment.

Referring to FIG. 9, there is schematically illustrated a relationship between the controller 50, motor 20, 30, friction member 330 and wheel 332. The controller 50 receives the operating force F acting on the brake pedal 40 operated by the vehicle operator. Depending upon the operating force F, the controller 50 determines the electric current I to be applied to the motor 20, 30. In response to the electric current I supplied, the motor 20, 30 generates a drive force D for forcing the friction member 330 onto the disc rotor 104 or drum 204. The friction member 330 having a specific friction coefficient $\mu$ cooperates with the disc rotor 104 or drum 204 to apply a braking torque T to the wheel 332, based on the drive force D generated by the motor 20, 30. As a result, the vehicle is given a deceleration value G, while the wheel 332 is given a deceleration value Gw.

In the brake control, the electric current I to be applied to the motor 20, 30 is determined on the basis of the operating force F applied to the brake pedal 40. Described more specifically, a desired braking torque T* for each wheel 332 is determined on the basis of the operating force F and according to the appropriate F-T relationship pattern. On the basis of the thus determined desired braking torque T*, the electric current I to be applied to the wheel is determined according to the I-T relationship pattern.

The friction coefficient $\mu$ of the friction member 330 is estimated by activating the motor 20, 30 of the brake 22, 32 under predetermined conditions, namely: when the brake pedal 40 is not in operation; when the accelerator pedal 42 is not in operation; when the vehicle is running straight, that is, is not turning; when the vehicle is not running on a bad road surface; when the vehicle is not running at a speed lower than a predetermined threshold; and when the automatic transmission 12 is not in the process of a shifting action. When the vehicle running speed v is zero (when the vehicle is stopped), the controller 50 determines that the vehicle is running at a speed lower than the predetermined threshold, the brake 22 is not operated to estimate the friction coefficient $\mu$ of the friction member 330, even when the brake pedal 40 is not in operation. That is, the estimation of the friction coefficient $\mu$ is effected while the vehicle is coasting straight at a relatively high speed on a good road surface.

During operation of the brake 22, 32 to estimate the friction coefficient $\mu$, the electric current I supplied to the motor 20, 30 and the vehicle deceleration value G are obtained, and the actual braking torque value T of each wheel is obtained based on the obtained vehicle deceleration value G. Further, one of the I-T relationship patterns which has a point located on or closest to a point indicative of a combination of the obtained actual braking torque value T and the obtained electric current I is selected as the presently effective I-T relationship pattern. The friction coefficient $\mu$ corresponding to the selected or presently effective I-T relationship pattern is determined as the estimated friction coefficient $\mu$ of the friction member 330, which is stored in the RAM.

Although the friction coefficient $\mu$ of the friction member 330 is preferably estimated for each of the four wheels, the estimation in the present embodiment is effected for each of the front and rear wheel pairs F, R, since the disc brakes 22 for the two front wheels FL, FR use the same friction members in the form of the brake pads 106a, 106b, while the drum brakes 32 for the two rear wheels RL, RR use the same friction members in the form of the brake linings 216a, 216b.

While the friction coefficient $\mu$ estimated in the present run of the vehicle is stored in the RAM, the I-T relationship pattern corresponding to this last estimated friction coefficient $\mu$ is selected to determine the electric current I on the basis of the determined desired braking torque T*. While the friction coefficient $\mu$ estimated in the present vehicle run is not stored in the RAM, the I-T relationship pattern corresponding to the friction coefficient $\mu$ which was estimated in the previous run of the vehicle and which is stored in the RAM is provisionally used to determine the electric current I, until the friction coefficient is estimated in the present vehicle run (until the estimation is updated). If the friction coefficient $\mu$ was not estimated in the previous vehicle run and is not stored in the RAM, the I-T relationship pattern corresponding to the predetermined standard value (stored in the ROM) of the friction coefficient $\mu$ is provisionally used to determine the electric current I, until the friction coefficient is estimated in the present vehicle run.

Then, the brake control routine of FIG. 5 and the friction coefficient estimating routine of FIG. 6 will be described in detail.

The brake control routine of FIG. 5 is executed while an ignition switch of the vehicle is on. The brake control routine is initiated with step S1 in which the operating force F acting on the brake pedal 40 is detected by the operation force sensor 402. Step S1 is followed by step S2 to determine whether the friction coefficient value $\mu$ estimated in the present run of the vehicle is stored in the RAM of the controller 50. If an affirmative decision (YES) is obtained in step S2, the control flow goes to step S3 in which the friction coefficient value $\mu$ estimated in the present vehicle run and stored in the RAM is selected as the effective friction coefficient value. If a negative decision (NO) is obtained in step S2, the control flow goes to step S4 to determine whether the friction coefficient value $\mu$ estimated in the previous vehicle run is stored in the RAM. If an affirmative decision (YES) is obtained in step S4, the control flow goes to step S5 in which the previously estimated friction coefficient value $\mu$ is selected as the effective value. If a negative decision (NO) is obtained in step S4, the control flow goes to step S6 in which the predetermined standard value of the friction coefficient $\mu$ is selected as the effective value.

Step S3, S5 and S6 are followed by step S7 in which one of the stored I-T relationship patterns which corresponds to the currently selected effective friction coefficient value $\mu$ is selected as the effective I-T relationship pattern. Then, step S8 is implemented to determine the desired braking torque value T* for each wheel, on the basis of the detected operating force F and according to the F-T relationship pattern. Step S8 is followed by step S9 in which a desired value I* of the electric current I for each wheel is determined on the basis of the desired braking torque value T* and according to the currently selected effective I-T relationship pattern. The control flow then goes to step S10 in which the electric current of the determined desired value I* is applied to the electric motor 20, 30 of each brake 22, 32. Thus, one cycle of execution of the brake control routine of FIG. 5 is terminated, and the control flow returns to step S1.

The friction coefficient estimating routine of FIG. 6 is also executed with a predetermined cycle time while the ignition switch is on. The routine is initiated with step S11 to effect initialization in which an ESTIMATION flag is reset to "0". When this flag is set at "0", it means that the friction coefficient $\mu$ has not been estimated during the present run of the vehicle. When the flag is set at "1", it means that the friction coefficient $\mu$ has been estimated once during the present run of the vehicle.

Step S11 is followed by steps S12–S18 to determine whether the predetermined conditions that should be satisfied to estimate the friction coefficient $\mu$ have been satisfied. Described in detail, step S12 is implemented to determine whether the ESTIMATION flag is set at "0". If an affirmative decision (YES) is obtained in step S12, the control flow goes to step S13 to determine whether the brake pedal operation detecting switch 304 is off, that is, to determine whether the brake pedal 40 is placed at its non-operated position. If an affirmative decision (YES) is obtained in step S13, the control flow goes to step S14 to determine whether the accelerator pedal operation detecting switch 306 is off, that is, to determine whether the accelerator pedal 42 is placed at its non-operated position. If an affirmative decision (YES) is obtained in step S14, the control flow goes to step S15 to determine whether the vehicle is turning, that is, to determine whether the rotation angle $\theta$ of the steering wheel 46 detected by the steering angle sensor 308 is larger than a threshold value which is close to zero. If a negative decision (NO) is obtained in step S15, the control flow goes to step S16 to determine whether the vehicle is running on a bad road surface. The determination in step S16 is effected by determining whether the frequency of change of the sign of the wheel deceleration value Gw is higher than a predetermined threshold value. The wheel deceleration value Gw is obtained by obtaining a time derivative of the wheel speed Vw detected by the wheel speed sensor 314. If a negative decision (NO) is obtained in step S16, the control flow goes to step S17 to determine whether the vehicle running speed V detected by the vehicle speed sensor 312 is lower than a predetermined threshold Vo. If a negative decision (NO) is obtained in step S17, the control flow goes to step S19 to determine whether the automatic transmission 12 is in the process of a shifting action. This determination in step S19 is effected based on a signal received from the automatic transmission 12. If the affirmative decision (YES) is obtained in steps S12–S14 while the negative decision (NO) is obtained in steps S15–S18, the control flow goes to step S19. In the other cases, the control flow goes back to step S12.

In step S19, a predetermined amount of electric current Io is applied to the electric motors 20 of the disc brakes 22 for the front left and right wheels FL, FR, for a predetermined time $\Delta t$. Step S19 is followed by step S20 in which the electric current I actually applied to the motors 20 is detected by the motor current sensor 316. Step S20 is followed by step S21 in which the deceleration value G of the vehicle during activation of the disc brakes 22 is detected by the vehicle deceleration sensor 310. Then, step S22 is implemented to estimate the friction coefficient $\mu$ of the brake pads 106a, 106b of the disc brakes 22, on the basis of the detected electric current I and vehicle deceleration value G. Described in detail, the actual braking torque value T of the front disc brakes 22 is calculated on the basis of the detected vehicle deceleration value G. One of the I-T relationship patterns which has a point located on or closest to a point indicative of a combination of the detected electric current I and the calculated actual braking torque value T is selected as the effective I-T relationship pattern. The friction coefficient value $\mu$ corresponding to the selected effective I-T relationship pattern is determined as the estimated value of the friction coefficient of the brake pads 106a, 106b. Then, steps S23 through S26 similar to the above-indicated steps S19-S22 are implemented for the rear drum brakes 32, to estimate the friction coefficient value $\mu$ of the brake linings 216a, 216b of the drum brakes 32. Step S26 is followed by step S27 in which the ESTIMATION flag is set to "1". Then, the control flow goes to step S12. However, since the ESTIMATION flag has been set to "1", the negative decision (NO) is subsequently obtained in step S12, and the estimation of the friction coefficient $\mu$ of the friction members 106a, 106b, 210a, 210b is not implemented, until the present vehicle run is terminated.

As described above, the present embodiment is adapted to effect the estimation of the friction coefficient $\mu$ of the friction members only once during each run of the vehicle. Once the estimation has been effected during the present vehicle run, the friction coefficient is not updated during the present vehicle run. However, the friction coefficient may be updated during the same vehicle run.

Figure 10:
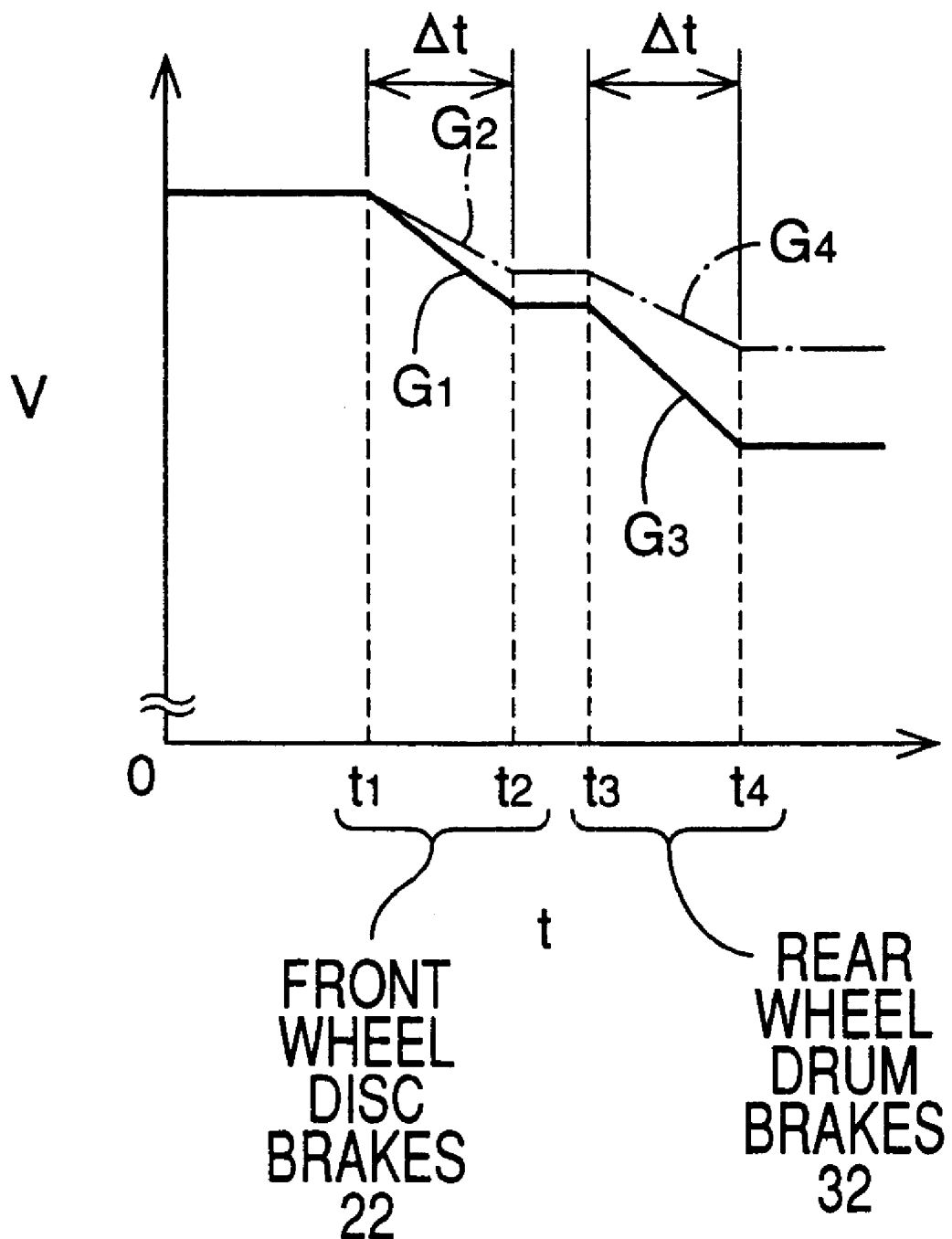
FIG. 10 is a view showing a change in vehicle speed V when the braking system of the first embodiment is operated without an operation of brake pedal.

The graph of FIG. 10 shows a gradual drop of the vehicle speed V as a result of the activation of the disc and drum brakes 22, 32 during the estimation of the friction coefficient $\mu$ of the friction members while the vehicle is coasting without the brake pedal 40 being depressed.

When the conditions for initiating the estimation of the friction coefficient $\mu$ have been satisfied at point of time t1, the predetermined amount Io of electric current I is applied to the electric motors 20 of the front disc brakes 22, so that the vehicle speed V is reduced. The rate of reduction of the vehicle speed V, that is, the deceleration value G of the vehicle depends upon the friction coefficient $\mu$ of the brake pads 106a, 106b of the disc brakes 22. Where the friction coefficient $\mu$ of the brake pads 106a, 106b is relatively high, the vehicle is decelerated with a relatively high deceleration value G1. Where the friction coefficient $\mu$ is relatively low, the vehicle is decelerated with a relatively low deceleration value G2. When the predetermined time $\Delta t$ has passed from the point of time t1, that is, at a point of time t2, the supply of the electric current to the electric motors 20 is terminated, and the motors 20 are restored to the non-operated state.

At a point of time t3 short time after the point of time t2, the predetermined amount Io of current is applied to the electric motors 30 of the rear drum brakes 32. As a result, the vehicle speed V is further reduced. The rate of reduction of the vehicle speed V or the deceleration value G of the vehicle at this time depends upon the friction coefficient m of the brake linings 216a, 216b. Where the friction coefficient is relatively high, the vehicle is decelerated with a relatively high deceleration value G3. Where the friction coefficient is relatively low, the vehicle is decelerated with a relatively low deceleration value G4. When the predetermined time $\Delta t$ has passed after the point of time t3, that is, at a point of time t4, the supply of the electric current to the electric motors 30 is terminated, and the motors 30 are restored to the non-operated state.

It will be understood from the above description of the present embodiment of this invention that portions of the controller 50 assigned to execute the brake control routine of FIG. 5 and the friction coefficient estimating routine of FIG. 6 constitute a relationship estimating and utilizing device for estimating a relationship between the electric current I to be supplied to the electric motors 20, 30 and the braking torque or force to be applied from the disc and drum brakes 22, 32 to the wheels, on the basis of the actual value of the electric current I supplied from the battery 320 to the electric motors 20, 30 and the actual values of the braking torque T of the disc and drum brakes 22, 32, which actual values are detected during operations of the brakes 22, 32 while the vehicle is running. The values of the braking torque to be applied to the wheels is changed with a change in the electric current to be applied to the electric motors. The relationship estimating and utilizing device is further adapted to utilize the estimated relationship for controlling the brakes 22, 32. It will also be understood that the portion of the controller 50 assigned to execute the brake control routine of FIG. 5 constitutes relationship utilizing means for utilizing the obtained relationship, while the portion of the controller 50 assigned to implement steps S13 and S19–S26 of the friction coefficient estimating routine of FIG. 16 constitutes means for estimating the relationship while the vehicle is running without an operation of the brake pedal 40. It will further be understood that the vehicle deceleration sensor 310 serves as means for detecting the vehicle deceleration G. It will also be understood that the portion of the controller 50 assigned to implement steps S15 and S17 of the routine of FIG. 6 constitutes first inhibiting means for inhibiting the relationship estimating and utilizing device from operating the disc and drum brakes 22, 32 to obtain the relationship, while the vehicle is running under a condition in which the operations of the drum and disc brakes 22, 32 by the relationship estimating and utilizing device are likely to be felt unusual or uncomfortable by the vehicle operator. It will further be understood that the portion of the controller 50 assigned to implement step S17 of the routine of FIG. 6 constitutes means for inhibiting the relationship estimating and utilizing device from operating the disc and drum brakes 22, 32 while the vehicle is running at a speed lower than a predetermined threshold value. It will also be understood that the portion of the controller 50 assigned to implement steps S14–S16 and S18 of the routine of FIG. 6 constitutes second inhibiting means for inhibiting the relationship estimating and utilizing device from estimating and/or utilizing the relationship while the vehicle is running under a condition in which the relationship is not likely to be accurately estimated. It will also be understood that the portion of the controller 50 assigned to implement steps S14 and S18 of the routine of FIG. 6 constitutes means for inhibiting the relationship estimating and utilizing device from at least utilizing the estimated relationship while a drive force for driving the vehicle is changing. It will further be understood that the portion of the controller 50 assigned to implement step S15 of the routine of FIG. 6 constitutes means for inhibiting the relationship estimating and utilizing device from at least utilizing the estimated relationship while the vehicle is turning.

Referring to FIGS. 11–22, there will be described other embodiments of the present invention. The same reference numerals as used in the first embodiment will be used to identify the same elements in these other embodiments, and only differences of these embodiments from the first embodiment will be described, to avoid redundant explanation.

A second embodiment of this invention is adapted to concurrently activate the disc and drum brakes 22, 32 for the four wheels while the vehicle is coasting without an operation of the brake pedal 40, and the vehicle deceleration value G is obtained during the activation of the brakes 22, 32 so that the actual braking torque values T of the brakes 22, 32 are obtained on the basis of the obtained deceleration value G. In this respect, the second embodiment is different from the first embodiment which is adapted to activate the front disc brakes 22 and the rear drum brakes 32 at different times in steps S19 and S23, respectively.

Figure 11:
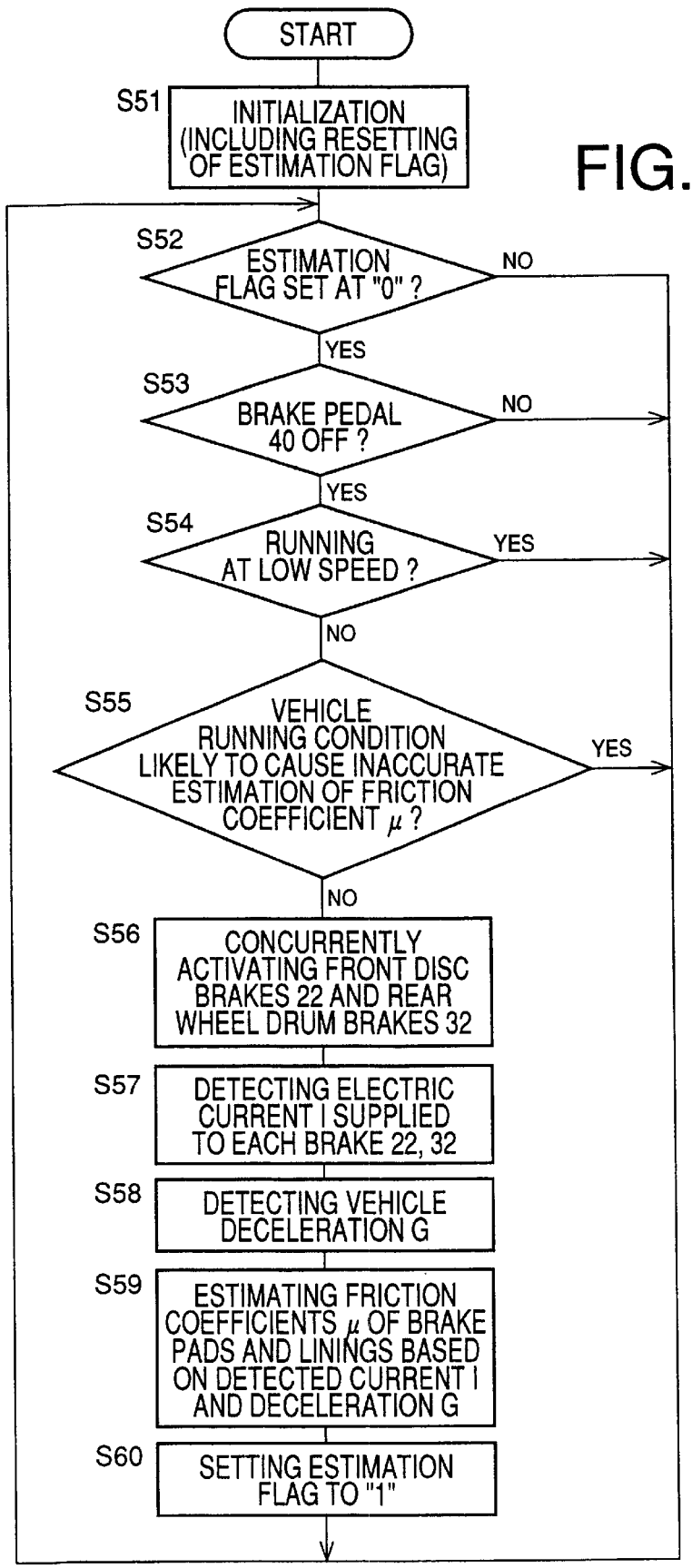
FIG. 11 is a flow chart illustrating a friction coefficient estimating routine executed according to a program stored in a ROM of a computer of an electrically operated braking system according to a second embodiment of this invention.

A friction coefficient estimating routine according to the second embodiment is illustrated in the flow chart of FIG. 11. In the following description of this routine, steps similar to those in the routine of FIG. 6 will be described only briefly.

The friction coefficient estimating routine of FIG. 11 is initiated with step S51 to effect initialization in which the ESTIMATION flag is reset to "0". Step S11 is followed by step S52 to determine whether the ESTIMATION flag is set at "0". If an affirmative decision (YES) is obtained in step S52, the control flow goes to step S53 to determine whether the brake pedal operation detecting switch 304 is off, that is, to determine whether the brake pedal 40 is placed at its non-operated position. If a negative decision (NO) is obtained in step S53, the control flow returns to step S52. If an affirmative decision (YES) is obtained in step S53, the control flow goes to step 554 to determine whether the vehicle running speed V detected by the vehicle speed sensor 312 is lower than a predetermined threshold Vo. If an affirmative decision decision (YES) is obtained in step S54, the control flow returns to step S52. If a negative decision (YES) is obtained in step S54, the control flow goes to step S55 to determine whether the vehicle is running under any conditions in which the friction coefficient values $\mu$ of the friction members are not likely to be accurately estimated. These conditions include: an operation of the accelerator pedal 42 to accelerate the vehicle; a turning of the vehicle; a running of the vehicle on a bad road surface; and a shifting action of the automatic transmission 12, as discussed above with respect to steps S14, S14, S16 and S18 of the routine of FIG. 6 of the first embodiment. If an affirmative decision (YES) is obtained in step S55, the control flow returns to step S52. If a negative decision (NO) is obtained in step S55, the control flow goes to step S56.

In step S56, the front disc brakes 22 for the front wheels and the rear drum brakes 32 for the rear wheels are substantially concurrently or simultaneously activated. Step S56 is followed by step S57 in which the electric current I actually applied to each of the motors 20, 30 is detected by the motor current sensor 316. Step S57 is followed by step S58 in which the deceleration value G of the vehicle during activation of the four brakes 22, 32 is detected by the vehicle deceleration sensor 310.

Then, step S59 is implemented to estimate the friction coefficient value $\mu$ of the brake pads 106a, 106b of the disc brakes 22 and the friction coefficient value $\mu$ of the brake linings 216a, 216b of the drum brakes 32, on the basis of the detected electric current values I and vehicle deceleration value G. Described in detail, the actual braking torque values T of the front disc brakes 22 and the actual braking torque values T of the rear drum brakes 32 are estimated on the basis of the detected vehicle deceleration value G, and depending upon a difference between the braking capacities of the disc and drum brakes 22, 32 and a difference between the load acting on the front wheels and the load acting on the rear wheels. A sum of the estimated braking torque values T of the front disc brakes 22 and a sum of the estimated braking torque values T of the rear drum brakes 32 are then calculated. A half of the former sum is determined as the actual braking torque T of each front disc brake 22, while a half of the latter sum is determined as the actual braking torque T of each rear drum brake 32. One of the I-T relationship patterns which has a point located on or closest to a point indicative of a combination of the detected electric current I and the calculated actual braking torque T of each front disc brake 22 is selected as the effective I-T relationship pattern. The friction coefficient value μ corresponding to the selected effective I-T relationship pattern is obtained as the estimated value of the friction coefficient of the brake pads 106a, 106b of each front disc brake 22. Similarly, the estimated friction coefficient value of the brake linings 216a, 216b of each rear drum brake 32 is obtained.

As described above, the second embodiment is adapted such that the actual braking torque value T of the front disc brakes 22 and the actual braking torque value T of the rear drum brakes 32 are obtained on the basis of the same vehicle deceleration value G which is obtained during concurrent operations of the four brakes 22, 32, and the friction coefficient value μ of the brake pads 106a, 106b of the front disc brakes 22 and the friction coefficient value μ of the brake linings 216a, 216b of the rear drum brakes 32 are estimated independently of each other on the basis of the obtained actual front and rear braking torque values T.

Step S59 is followed by step S60 to set the ESTIMATION flag to "1". Then, the control flow goes back to step S52.

A third embodiment of the invention is adapted to activate the four brakes 22, 32 one after another at different times, and detect the deceleration values G for the respective brakes 22, 32 and obtain the actual braking torque values T for the respective brakes independently of each other.

Figure 12:
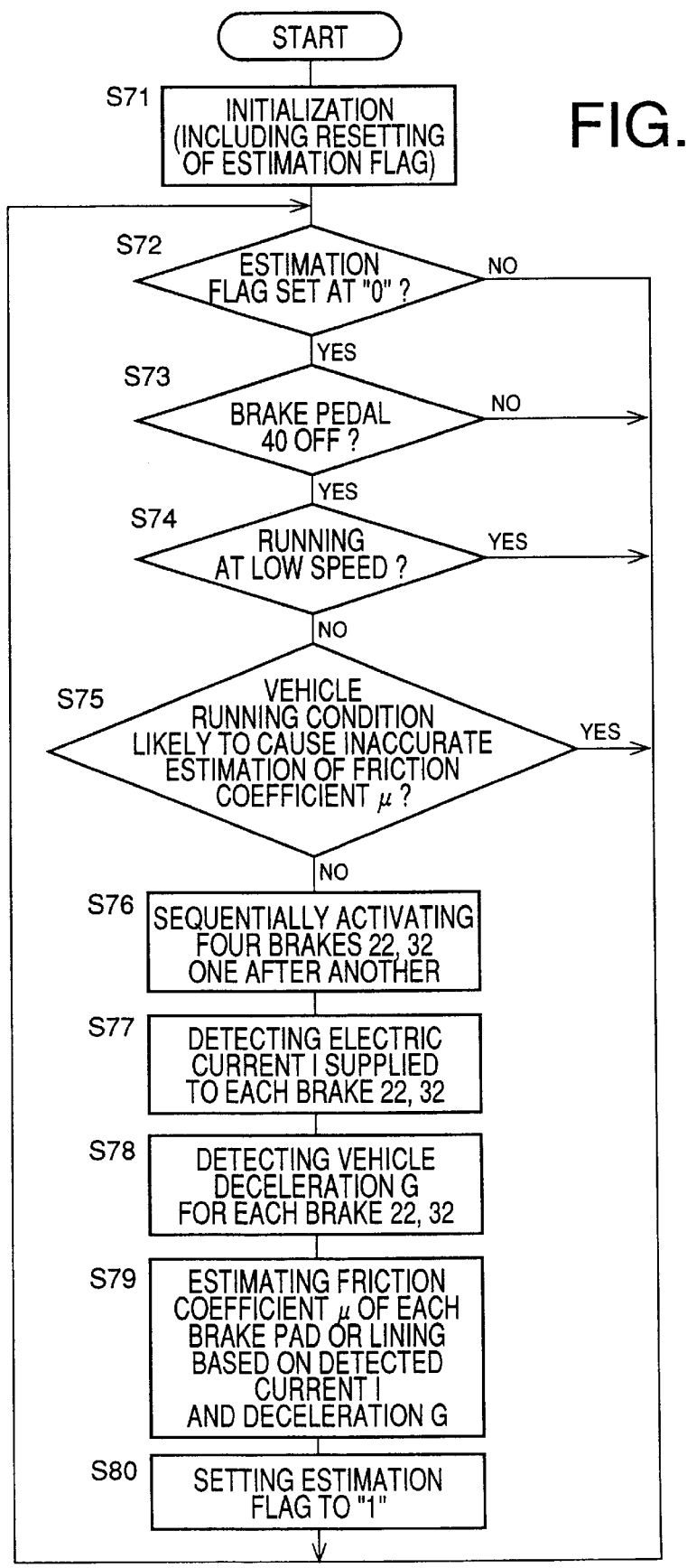
FIG. 12 is a flow chart illustrating a friction coefficient estimating routine executed according to a program stored in a ROM of a computer of an electrically operated braking system according to a third embodiment of this invention.

A friction coefficient estimating routine according to the third embodiment is illustrated in the flow chart of FIG. 12. In the following description of this routine, steps similar to those in the routine of FIG. 6 will be described only briefly.

The friction coefficient estimating routine of FIG. 12 is initiated with step S71 to effect initialization in which the ESTIMATION flag is reset to "0". Step S71 is followed by step S72 to determine whether the ESTIMATION flag is set at "0". If an affirmative decision (YES) is obtained in step S72, the control flow goes to step S73 to determine whether the brake pedal operation detecting switch 304 is off. If a negative decision (NO) is obtained in step S73, the control flow returns to step S72. If an affirmative decision (YES) is obtained in step S73, the control flow goes to step S74 to determine whether the vehicle running speed V is lower than a predetermined threshold Vo. If an affirmative decision (YES) is obtained in step S74, the control flow goes back to step S72. If a negative decision (NO) is obtained in step S54, the control flow goes to step S75 to determine whether the vehicle is running under any conditions in which the friction coefficient values μ of the friction members are not likely to be accurately estimated. These conditions include: an operation of the accelerator pedal 42 to accelerate the vehicle; a turning of the vehicle; a running of the vehicle on a bad road surface; and a shifting action of the automatic transmission 12, as discussed above with respect to steps S14, S15, S16 and S18 of the routine of FIG. 6 of the first embodiment. If an affirmative decision (YES) is obtained in step S75, the control flow returns to step S72. If a negative decision (NO) is obtained in step S75, the control flow goes to step S76.

In step S76, the two front disc brakes 22 and the two rear drum brakes 32 are sequentially activated one after another, for instance, in the order of the disc brake 22 for the front left wheel FL, the disc brake 22 for the front right wheel FR, the drum brake 32 for the rear left wheel RL, and the drum brake 32 for the rear right wheel RR. Step S76 is followed by step S77 in which the values of the electric current I actually supplied to the motors 20, 30 are detected during sequential activations of the four brakes 22, 32. Step S77 is followed by step S78 in which the deceleration values G are detected during the sequential activations of the four brakes 22, 32. It is noted that while steps S76–S78 are sequentially and repeatedly implemented for each of the four brakes 22, 32, although the flow chart of FIG. 12 does not explicitly show this arrangement. The thus detected vehicle acceleration values G accurately reflect the actual braking torque values T of the respective brakes 22, 32.

Then, step S79 is implemented to estimate the friction coefficient values μ of the brake pads 106a, 106b of the disc brakes 22 and the friction coefficient values μ of the brake linings 216a, 216b of the drum brakes 32, on the basis of the detected electric current values I and vehicle deceleration values G. Described in detail, the actual braking torque value T of each brake 22, 32 is estimated on the basis of the corresponding vehicle deceleration value G. Then, One of the I-T relationship patterns which has a point located on or closest to a point indicative of a combination of the detected electric current I and the calculated actual braking torque T of each brake 22, 32 is selected as the effective I-T relationship pattern. The friction coefficient value μ corresponding to the selected effective I-T relationship pattern is obtained as the estimated value of the friction coefficient of the brake pad or lining of each brake 22, 32. Step S79 is followed by step S80 to set the ESTIMATION flag to "1". Then, the control flow returns to step S72.

A fourth embodiment of this invention is adapted to inhibit the detection of the vehicle deceleration G to obtain the actual braking torque T where the gradient of the road surface on which the vehicle is running is higher than a predetermined threshold. In the first embodiment, the vehicle deceleration G is detected irrespective of the gradient of the road surface.

Figure 13:
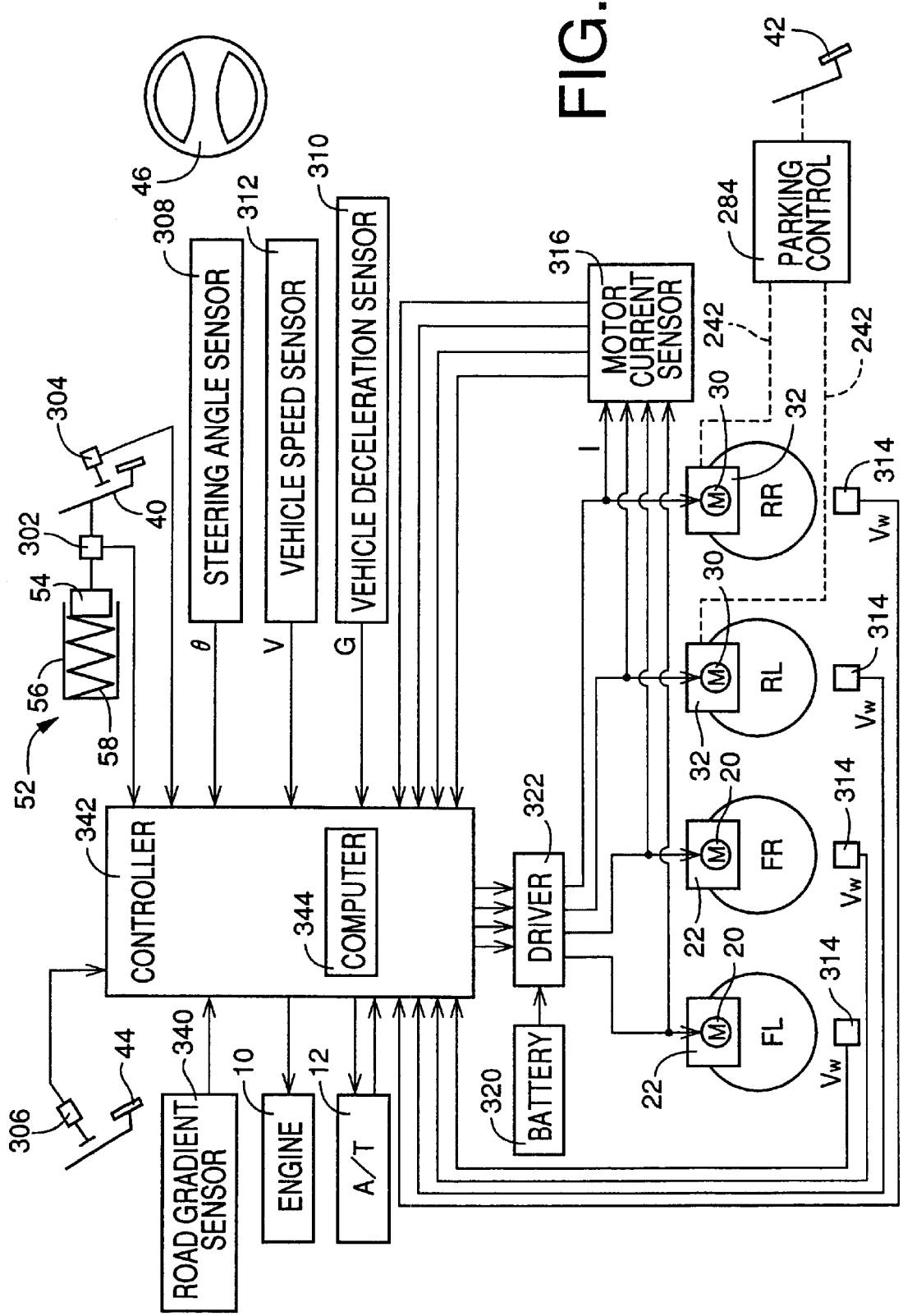
FIG. 13 is a schematic view showing an arrangement of an electrically operated braking system constructed according to a fourth embodiment of this invention.

Referring to FIG. 13, there is shown an arrangement of an electrically operated braking system according to the fourth embodiment, which includes a road gradient sensor 340 for detecting the gradient of the road surface.

Figure 14:
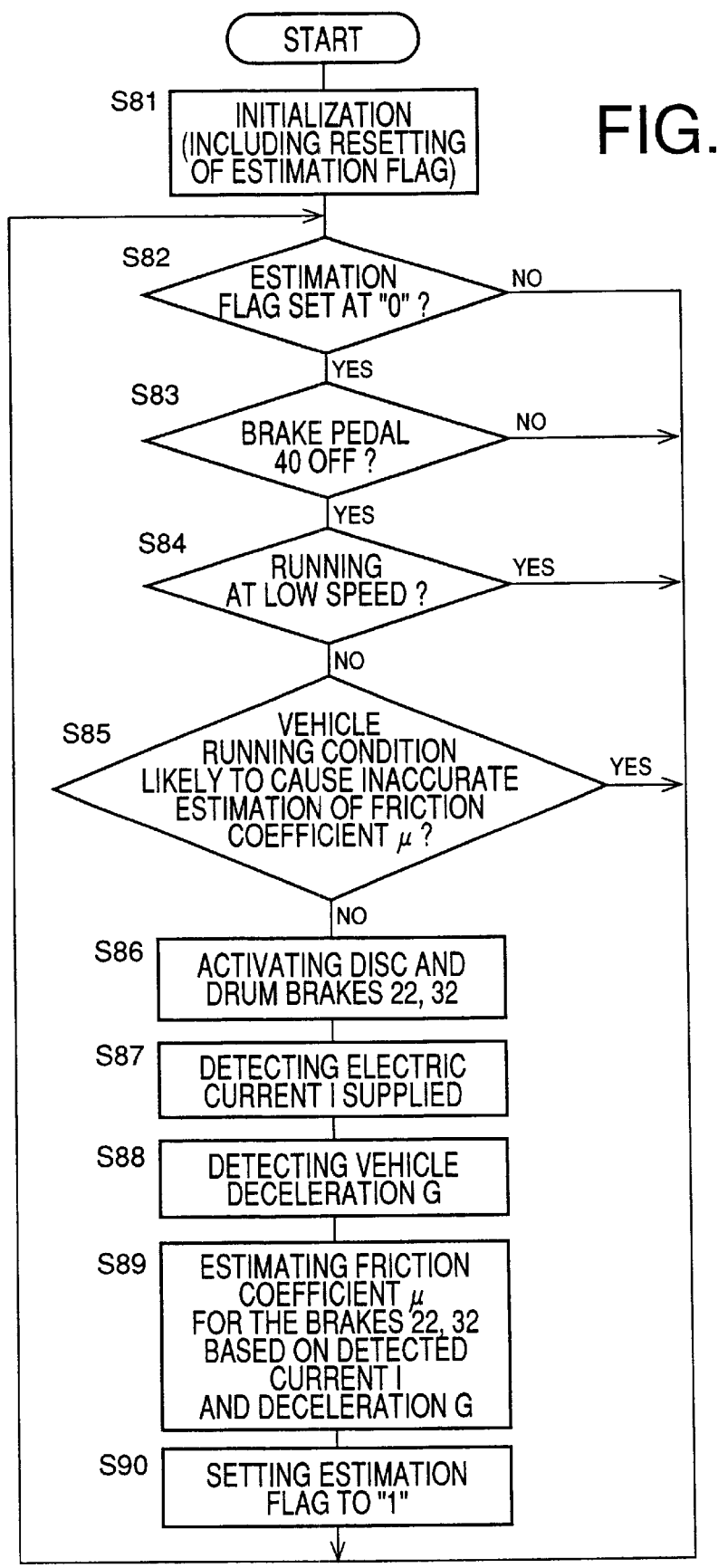
FIG. 14 is a flow chart illustrating a friction coefficient estimating routine executed according to a program stored in a ROM of a computer of the braking system of the fourth embodiment of FIG. 13.

A friction coefficient estimating routine executed according to a program stored in a ROM of a computer 344 of a controller 342 of the braking system of the present fourth embodiment is illustrated in the flow chart of FIG. 14. In the following description of the routine of FIG. 14, steps similar to those in the first embodiment will be described only briefly.

The friction coefficient estimating routine of FIG. 14 is initiated with step S81 to effect initialization in which the ESTIMATION flag is reset to "0". Step S81 is followed by step S82 to determine whether the ESTIMATION flag is set at "0". If an affirmative decision (YES) is obtained in step S82, the control flow goes to step S83 to determine whether the brake pedal operation detecting switch 304 is off. If a negative decision (NO) is obtained in step S83, the control flow returns to step S72. If an affirmative decision (YES) is obtained in step S83, the control flow goes to step S84 to determine whether the vehicle running speed V is lower than a predetermined threshold Vo. If an affirmative decision (YES) is obtained in step S84, the control flow goes back to step S82. If a negative decision (NO) is obtained in step S84, the control flow goes to step S85 to determine whether the vehicle is running under any conditions in which the friction coefficient values μ of the friction members are not likely to be accurately estimated. These conditions include: an operation of the accelerator pedal 42 to accelerate the vehicle; a turning of the vehicle; a running of the vehicle on a bad road surface; and a shifting action of the automatic transmission 12, as discussed above with respect to steps S14, S14, S16 and S18 of the routine of FIG. 6 of the first embodiment. In the present fourth embodiment, the conditions that inhibit the estimation of the friction coefficient μ also include a condition that the gradient of the road surface on which the vehicle is running is higher than the predetermined threshold value. If an affirmative decision (YES) is obtained in step S85, the control flow returns to step S82. If a negative decision (NO) is obtained in step S85, the control flow goes to step S86.

In step S86, the disc and drum brakes 22, 32 are activated in one of the following modes: (a) The four brakes 22, 32 are substantially concurrently activated, as in the second embodiment of FIG. 11; (b) the front disc brakes 22 are concurrently activated, and the rear drum brakes 32 are concurrently activated, but after or before the activation of the disc brakes 22, as in the first embodiment of FIG. 6; and (c) the four brakes 22, 32 are sequentially activated, as in the third embodiment of FIG. 12. Step S86 is followed by step S87 in which the electric current I supplied to each brake 22, 32 is detected. Step S87 is followed by step S88 in which the deceleration value or values G is/are detected during the activation of the four brakes 22, 32. Then, step S89 is implemented to estimate the friction coefficient values μ of the friction members of the brakes 22, 32, on the basis of the detected electric current values I and vehicle deceleration value or values G, in one of the manners described with steps S26, S59 and S79. Step S89 is followed by step S90 to set the ESTIMATION flag to "1". Then, the control flow returns to step S82.

A fifth embodiment of this invention is adapted to obtain the actual braking torque values T on the basis of deceleration values Gw of the wheels. In the preceding embodiments, the actual braking torque T is obtained on the basis of the detected vehicle deceleration G.

Figure 15:
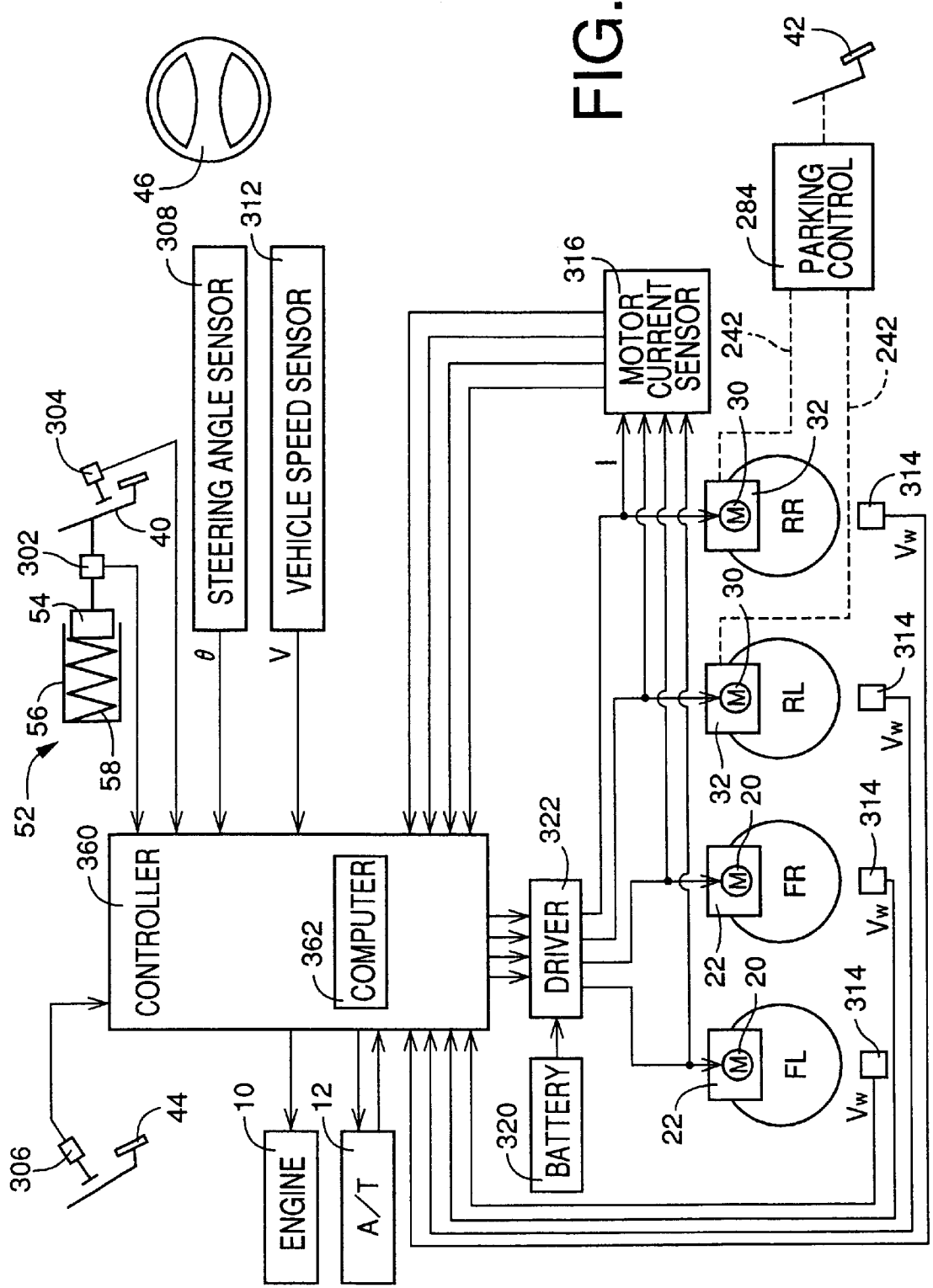
FIG. 15 is a schematic view showing an arrangement of an electrically operated braking system constructed according to a fifth embodiment of this invention.

Referring to FIG. 15, there is shown an arrangement of an electrically operated braking system according to the fifth embodiment, which does not include the vehicle deceleration sensor 310, since the vehicle deceleration G is not used to obtain the actual braking torque T in the present fifth embodiment.

Figure 16:
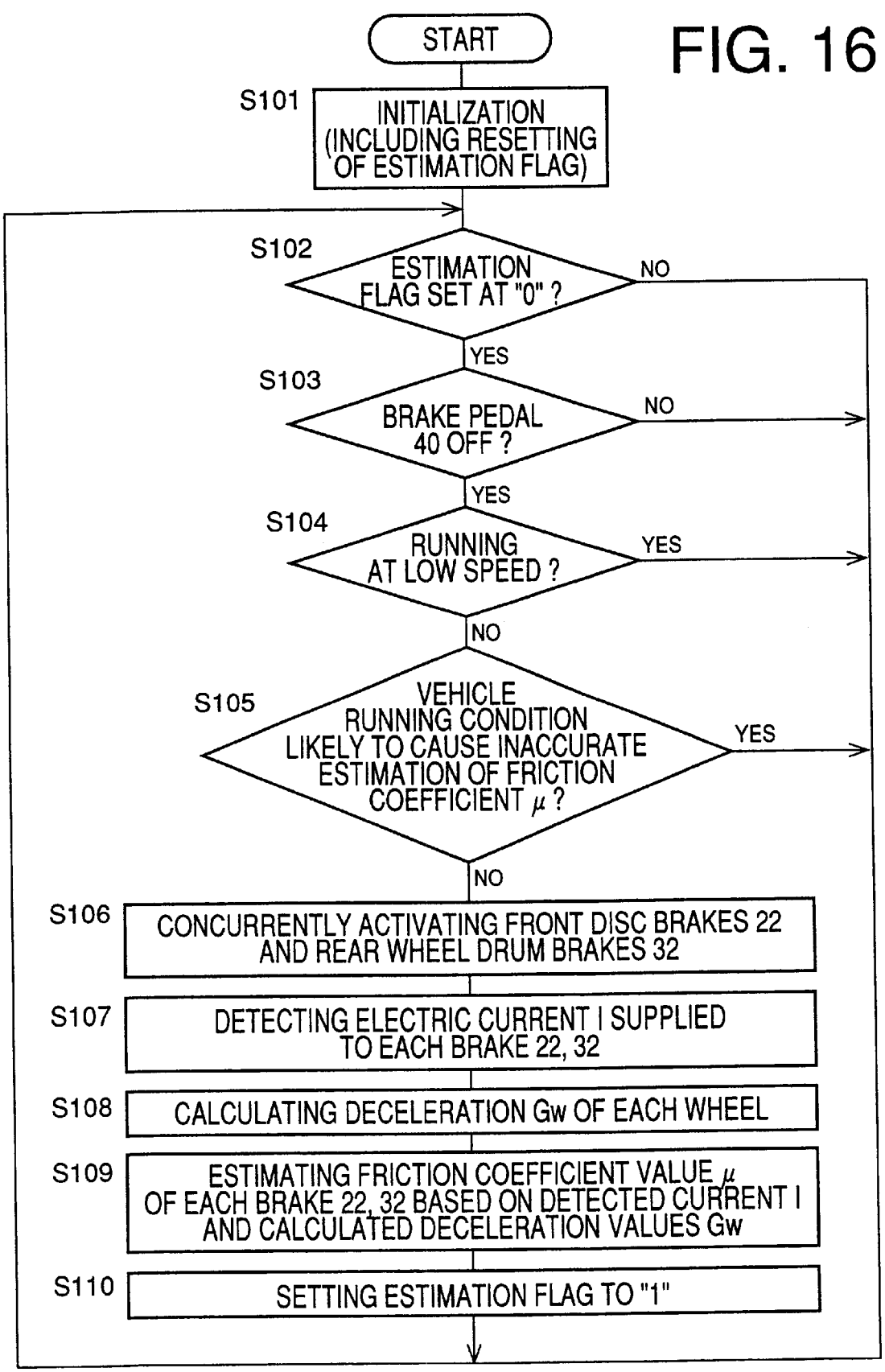
FIG. 16 is a flow chart illustrating a friction coefficient estimating routine executed according to a program stored in a ROM of a computer of the braking system of the fifth embodiment of FIG. 15.

A friction coefficient estimating routine executed according to a program stored in a ROM of a computer 362 of a controller 360 of the braking system of the present fifth embodiment is illustrated in the flow chart of FIG. 16. In the following description of the routine of FIG. 16, steps similar to those in the first embodiment will be described only briefly.

The friction coefficient estimating routine of FIG. 16 is initiated with step S101 to effect initialization in which the ESTIMATION flag is reset to "0". Step S101 is followed by step S102 to determine whether the ESTIMATION flag is set at "0". If an affirmative decision (YES) is obtained in step S102, the control flow goes to step S103 to determine whether the brake pedal operation detecting switch 304 is off. If a negative decision (NO) is obtained in step S103, the control flow returns to step S102. If an affirmative decision (YES) is obtained in step S103, the control flow goes to step S104 to determine whether the vehicle running speed V is lower than a predetermined threshold Vo. If an affirmative decision (YES) is obtained in step S104, the control flow goes back to step S102. If a negative decision (NO) is obtained in step S104, the control flow goes to step S105 to determine whether the vehicle is running under any conditions in which the friction coefficient values μ of the friction members are not likely to be accurately estimated. These conditions include: an operation of the accelerator pedal 42 to accelerate the vehicle; a turning of the vehicle; a running of the vehicle on a bad road surface; and a shifting action of the automatic transmission 12, as discussed above with respect to steps S14, S14, S16 and S18 of the routine of FIG. 6 of the first embodiment. If an affirmative decision (YES) is obtained in step S105, the control flow returns to step S102. If a negative decision (NO) is obtained in step S105, the control flow goes to step S106.

In step S106, the front disc brakes 22 for the front wheels and the rear drum brakes 32 for the rear wheels are substantially concurrently or simultaneously activated.

Step S106 is followed by step S107 in which the electric current I actually applied to each of the motors 20, 30 is detected by the motor current sensor 316. Step S107 is followed by step S108 in which the deceleration value Gw of each of the four wheels FL, FR, RL, RR is calculated. The deceleration value Gw of each wheel is calculated by obtaining a time derivative of the rotating speed Vw of that wheel detected by the wheel speed sensor 314.

Figure 17:
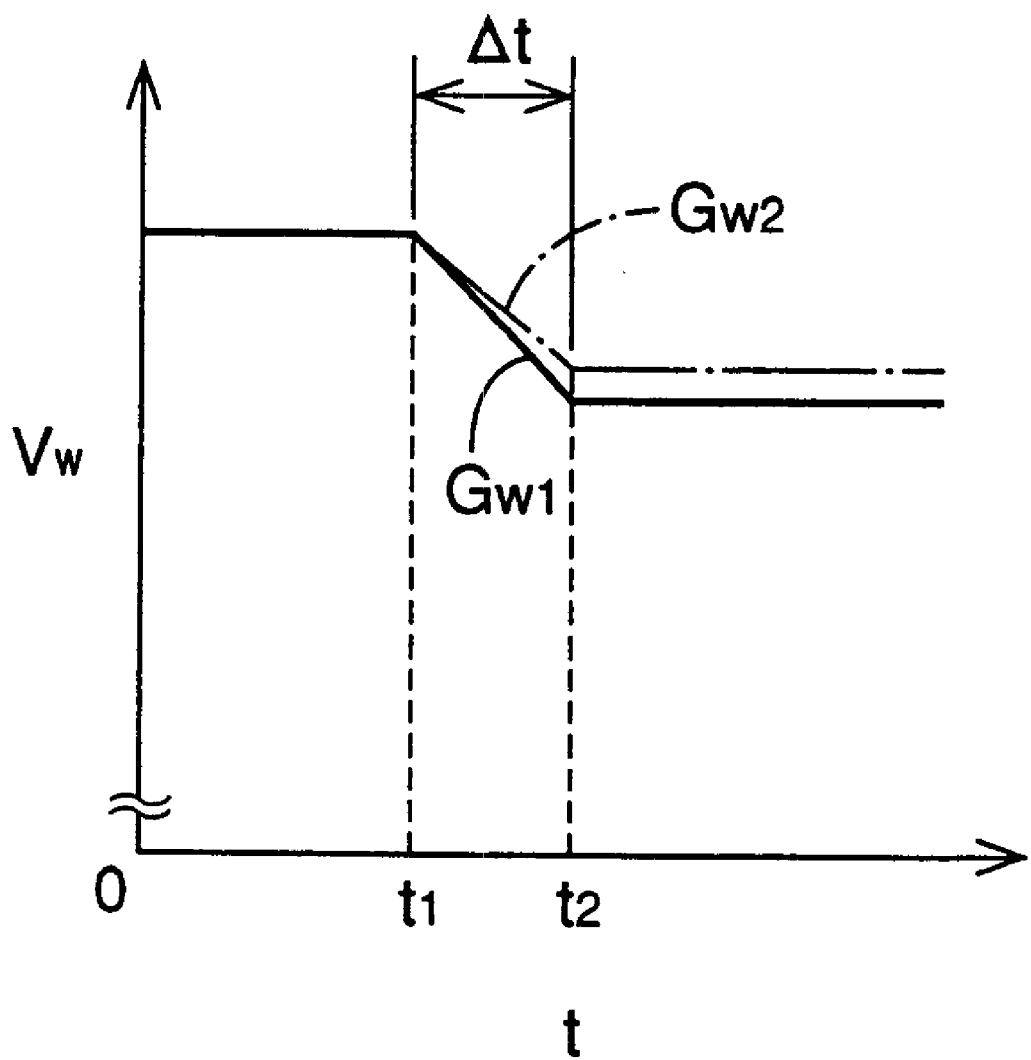
FIG. 17 is a view showing a change in vehicle speed Vw when the braking system of the fifth embodiment is operated with out an operation of brake pedal.

The graph of FIG. 17 shows a change in the wheel speed Vw during activation of the brakes 22, 32. When the friction coefficient μ of the friction members of the brake 22, 32 is relatively high, the rate of reduction of the wheel speed Vw, that is, the deceleration value Gw of the wheel is relatively high. When the friction coefficient is relatively low, the wheel deceleration value Gw is relatively low.

Then, step S109 is implemented to estimate the friction coefficient values μ of the friction members of the four brakes 22, 32, on the basis of the detected electric current values I and calculated wheel deceleration values Gw. Described in detail, the actual braking torque values T of the brakes 22, are estimated on the basis of the calculated wheel deceleration values Gw. One of the I-T relationship patterns which has a point located on or closest to a point indicative of a combination of the detected electric current I and the calculated actual braking torque T of each brake 22, 32 is selected as the effective I-T relationship pattern. The friction coefficient value μ corresponding to the selected effective I-T relationship pattern is obtained as the estimated value of the friction coefficient of each brake 22, 32. Then, step S110 is implemented to set the ESTIMATION flag to "1". The control flow then goes back to step S102.

Figure 18:
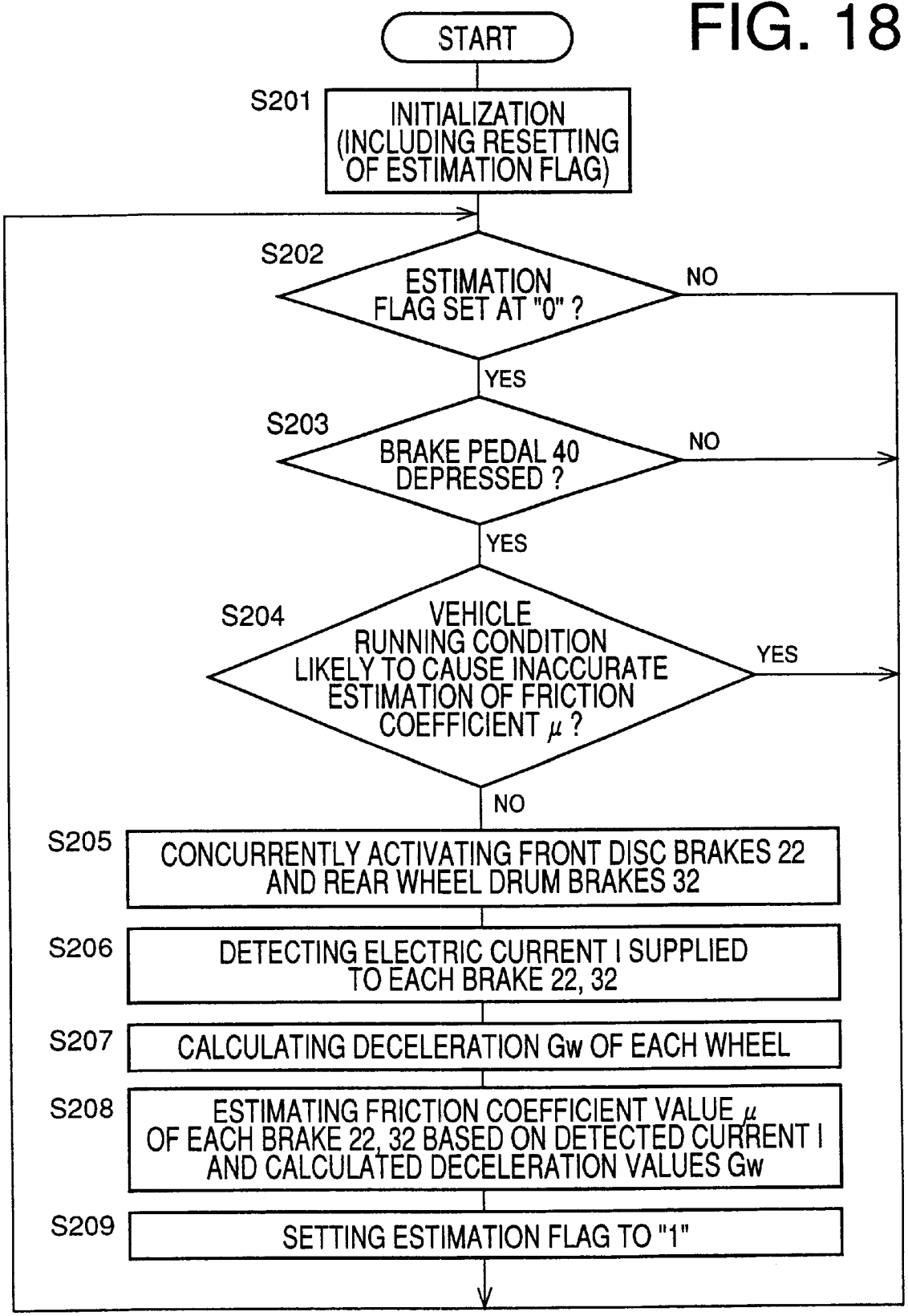
FIG. 18 is a flow chart illustrating a friction coefficient estimating routine executed according to a program stored in a ROM of a computer of an electrically operated braking system according to a sixth embodiment of the invention.

A sixth embodiment of the invention is different from the fifth embodiment, only in the friction coefficient estimating routine illustrated in the flow chart of FIG. 18.

In the friction coefficient estimating routine of FIG. 18 according to the sixth embodiment, the friction coefficient μ of the friction members of the brakes 22, 32 is effected while the brake pedal 40 is operated. The routine is initiated with step S201 to effect initialization in which the ESTIMATION flag is reset to "0". Step S201 is followed by step S202 to determine whether the ESTIMATION flag is set at "0". If an affirmative decision (YES) is obtained in step S202, the control flow goes to step S203 to determine whether the brake pedal operation detecting switch 304 is on, that is whether the brake pedal 40 is in operation. If a negative decision (NO) is obtained in step S203, the control flow returns to step S202. If an affirmative decision (YES) is obtained in step S203, the control flow goes to step S204 to determine whether the whether the vehicle is running under any conditions in which the friction coefficient values μ of the friction members are not likely to be accurately estimated. These conditions include: an operation of the accelerator pedal 42 to accelerate the vehicle; a turning of the vehicle; a running of the vehicle on a bad road surface; and a shifting action of the automatic transmission 12, as in the fifth embodiment. In this sixth embodiment, the conditions that inhibits the estimation of the friction coefficient μ include an operation of the braking system in an anti-lock fashion, and stopping of the vehicle. The anti-lock control of the disc and drum brakes 22, 32 is effected with the electric motors 20, 30 being controlled by the controller 50 on the basis of the output signals of the wheel speed sensors 314. The stopping of the vehicle is detected if the vehicle running speed V detected by the vehicle speed sensor 312 is lower than a predetermined lower limit. If an affirmative decision (YES) is obtained in step S204, the control flow returns to step S202. If a negative decision (NO) is obtained in step S205, the control flow goes to steps 5205–S209, which are similar to steps S106–S110 of the routine of FIG. 16 in the fifth embodiment.

A seventh embodiment of the present invention is different from the first embodiment, in that the actual braking torque values T of the brakes 22, 32 are detected by sensors exclusively provided for this purpose.

Figure 19:
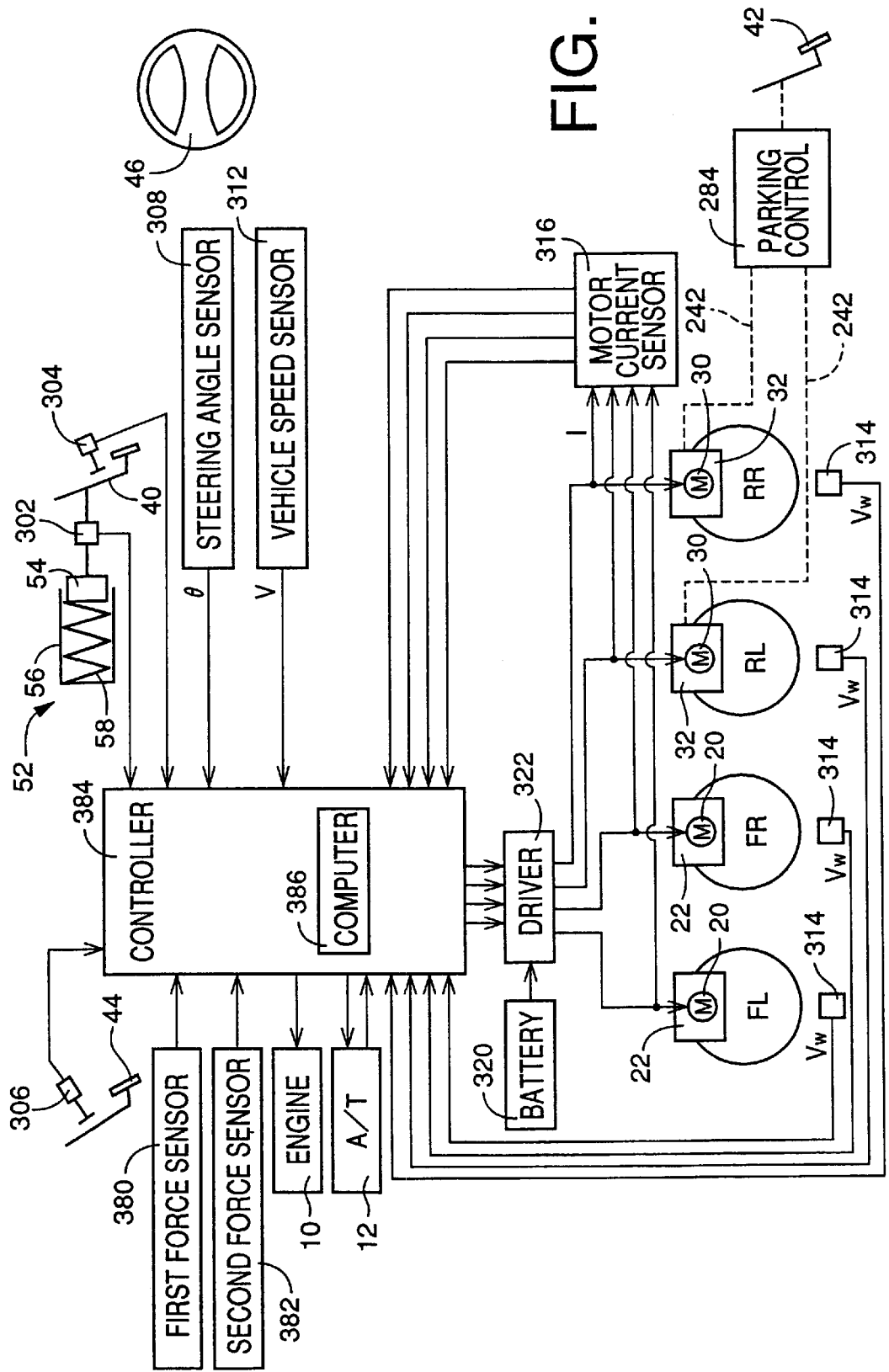
FIG. 19 is a schematic view showing anarrangement of an electrically operated braking system constructed according to a seventh embodiment of this invention.

The arrangement of an electrically operated braking system according to the seventh embodiment is schematically shown in FIG. 19. This braking system includes (a) a first force sensor 380 provided in each front disc brake 22, to detect the actual braking torque T, and (b) a second force sensor 382 provided in each rear drum brake 32, to detect the actual braking torque T. Unlike the braking system of the first embodiment, the present braking system does not include the vehicle deceleration sensor 310.

Figure 20:
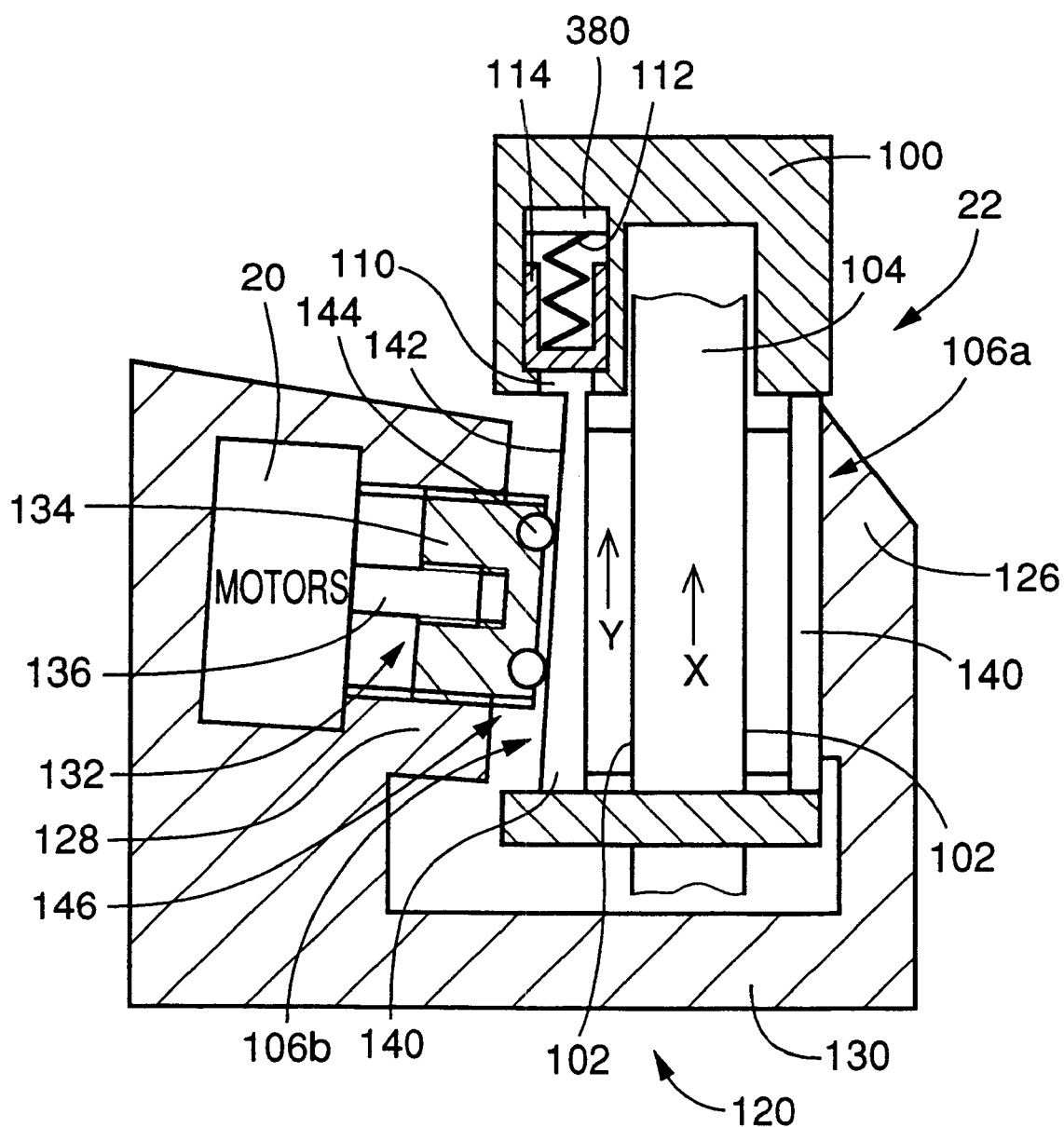
FIG. 20 is an enlarged plan view partly in cross section of an electrically operated disc brake used in the braking system of FIG. 19.
Figure 21:
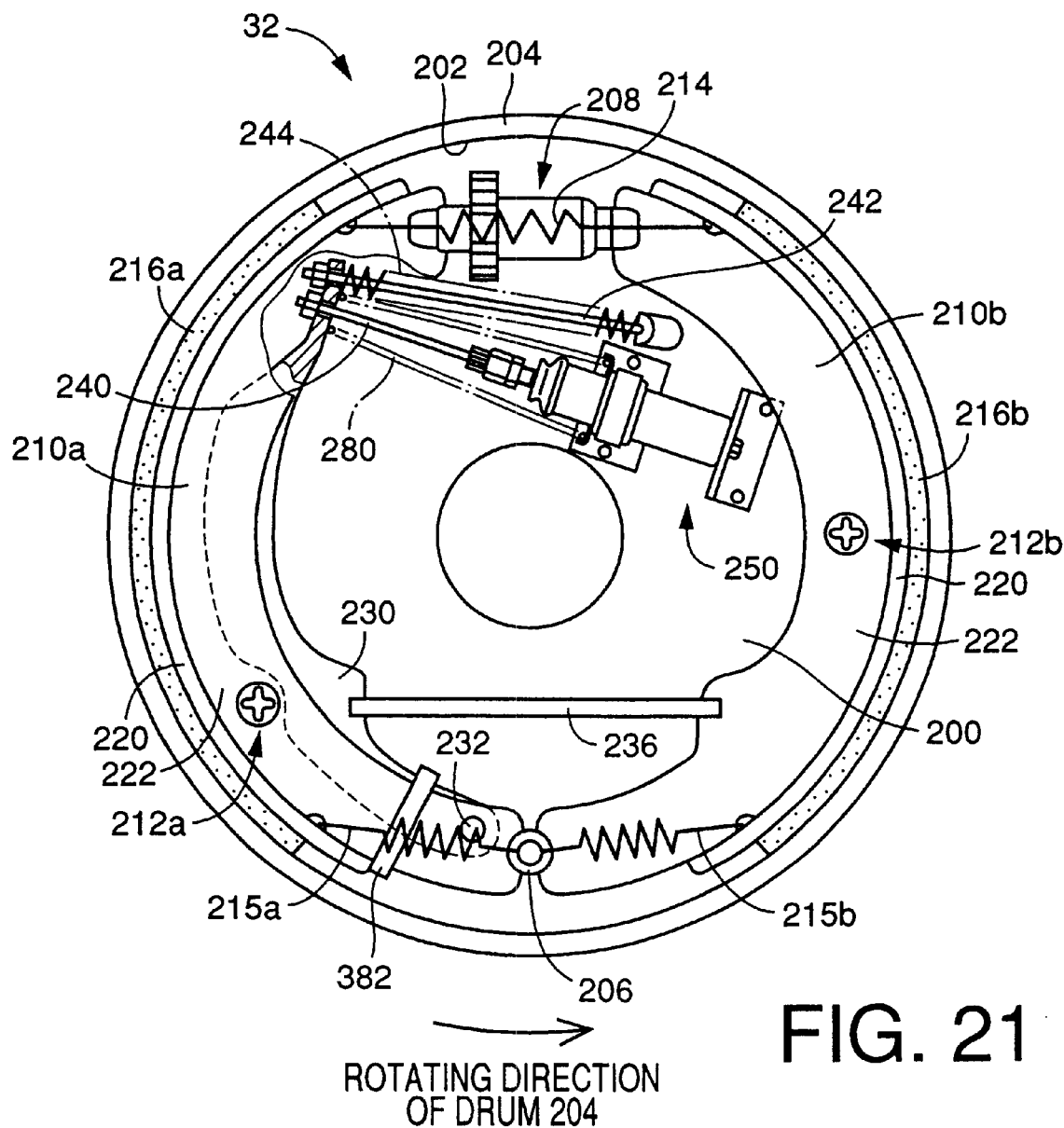
FIG. 21 is an enlarged front elevational view partly in cross section of an electrically operated drum brake used in the braking system of FIG. 19.

Referring to FIG. 20, there is shown the electrically operated disc brake 22 for each front wheel, wherein the first force sensor 380 is interposed between the spring 112 and the mounting bracket 100. Referring next to FIG. 21, there is shown the electrically operated drum brake 32 for each rear wheel, wherein the second force sensor 382 is disposed on one of the brake shoes 210a, 210b, that is, the secondary shoe 210a which will receive a larger load than the primary shoe 210b. The second force sensor 382 may be disposed on the anchor pin 206.

Figure 22:
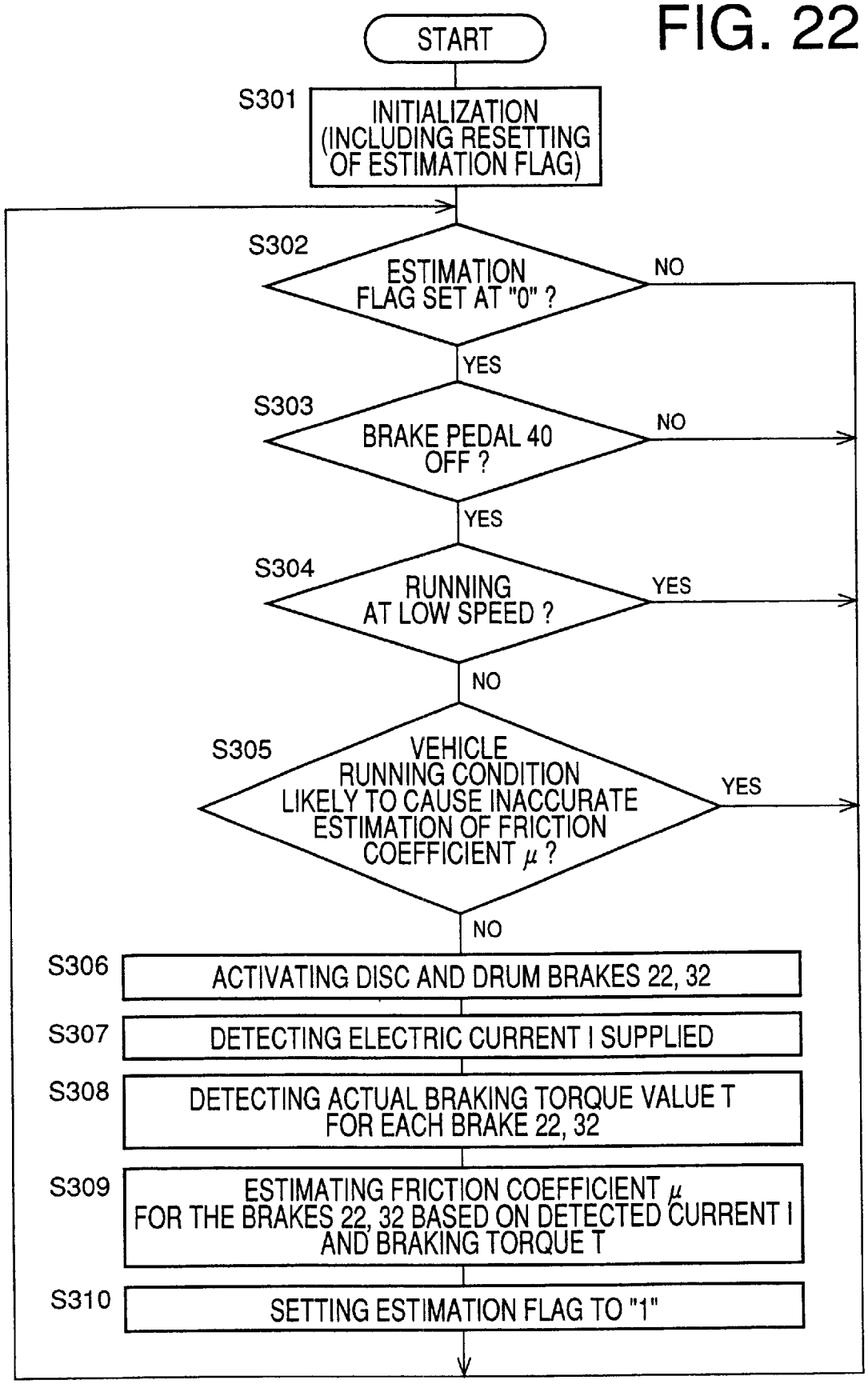
FIG. 22 is a flow chart illustrating a brake control routine executed according to a program stored in a ROM of a computer of the braking system of FIG. 19.

A friction coefficient estimating routine executed according to a program stored in a ROM of a computer 386 of a controller 384 of the present braking system is illustrated in the flow chart of FIG. 22. In the description of the routine of FIG. 22, steps similar to those in the first embodiment will be described only briefly.

The routine of FIG. 22 is initiated with step S301 to effect initialization in which an ESTIMATION flag is reset to "0". Step S301 is followed by step S302 to determine whether the whether the ESTIMATION flag is set at "0". If an affirmative decision (YES) is obtained in step S202, the control flow goes to step S303 to determine whether the brake pedal operation detecting switch 304 is off. If a negative decision (NO) is obtained in step S303, the control flow goes back to step S302. If an affirmative decision (YES) is obtained in step S303, the control flow goes to step S304 to determine whether the vehicle speed V is lower than a predetermined threshold Vo. If an affirmative decision (YES) is obtained in step S304, the control flow goes back to step S302. If a negative decision (NO) is obtained in step S304, the control flow goes to step S305 to determine whether the vehicle is running under any conditions in which the friction coefficient is not likely to be accurately estimated. These running conditions include: an operation of the accelerator pedal 42; a turning of the vehicle; a running of the vehicle on a bad road surface; and a shifting action of the automatic transmission 12, as described above with respect to the first embodiment. If an affirmative decision (YES) is obtained in step S305, the control flow goes back to step S302. If a negative decision (NO) is obtained in step S305, the control flow goes to step S306.

In step S306, the disc and drum brakes 22, 32 are activated in one of the following modes: (a) The four brakes 22, 32 are substantially concurrently activated, as in the second embodiment of FIG. 11; (b) the front disc brakes 22 are concurrently activated, and the rear drum brakes 32 are concurrently activated, but after or before the activation of the disc brakes 22, as in the first embodiment of FIG. 6; and (c) the four brakes 22, 32 are sequentially activated, as in the third embodiment of FIG. 12. Step S306 is followed by step S307 in which the electric current I supplied to each brake 22, 32 is detected. Step S307 is followed by step S308 in which the actual braking torque values T of the disc and drum brakes 22, 32 are detected by the first and second force sensors 380, 382, respectively, during the activation of the brakes 22, 32. Then, step S309 is implemented to estimate the friction coefficient values μ of the friction members of the brakes 22, 32, on the basis of the detected electric current values I and actual braking torque values T. One of the I-T relationship patterns which has a point located on or closest to a point indicative of a combination of the electric current I and the braking torque value T of each brake 22, 32 is selected as the effective I-T relationship pattern. The friction coefficient μ corresponding to the selected I-T relationship pattern is obtained as the estimated friction coefficient value for each brake. The control flow then goes to step S309 to the ESTIMATION flag to "1". Then, the control flow returns to step S310.

The embodiments which have been described are adapted to detect various physical parameters such as the electric current I supplied to each electric motor 20, 30, vehicle deceleration G, wheel deceleration Gw and actual braking torque T of the brakes 22, 32. Each of these physical parameters is detected for a predetermined time period. The peak value or an average of a plurality of values obtained in the detection period may be used as the detected value. Alternatively, an integral value of the values obtained in the detection period may be used as the detected value.

Referring to FIGS. 23–43, further embodiments of this invention will be described.

Figure 23:
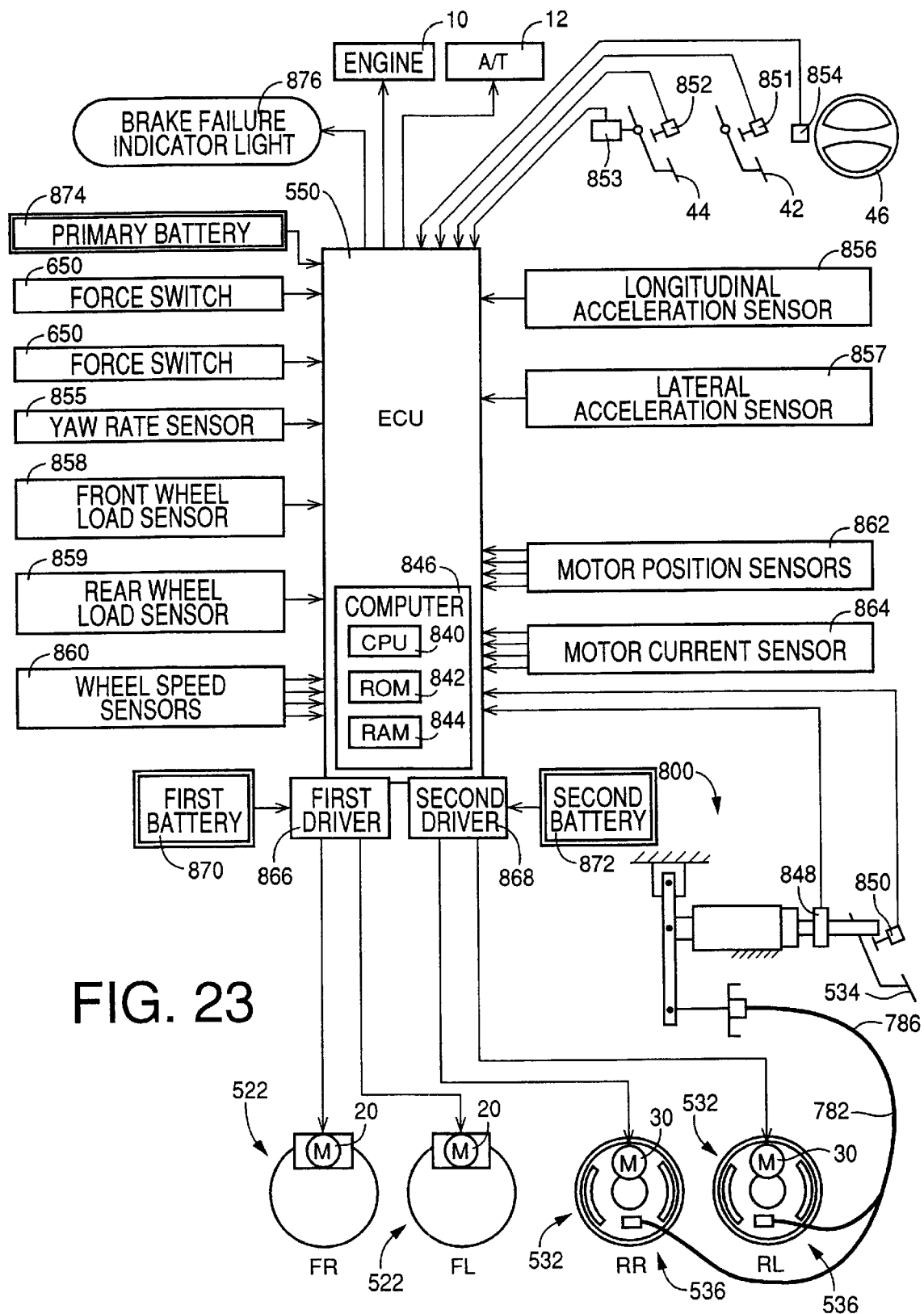
FIG. 23 is a schematic view showing an arrangement of an electrically operated braking system constructed according to an eighth embodiment of the present invention.

FIG. 23 shows an electrically operated braking system constructed according to an eighth embodiment of the invention, which includes electrically operated front disc brakes 522 each having the electric motor 20 described above, and electrically operated rear drum brakes 532 each having the electric motor 30 also described above. These disc and drum brakes 530, 532 do not use a hydraulic working fluid. Like the braking system of the first embodiment of FIG. 1, the braking system of FIG. 23 includes the engine 10, automatic transmission 12, parking brake pedal 43, accelerator pedal 44 and steering wheel 46.

Unlike the braking system of FIG. 1, the braking system of FIG. 23 further includes mechanically operated rear drum brakes 536 which are operated as emergency brakes, by a force produced as a result of an operation of a brake operating member in the form of a brake pedal 534. This drum brake 536 does not use a hydraulic working fluid, either. Thus, each of the rear left and right wheels RL, RR is provided with both the electrically operated drum brake 532 and the mechanically operated drum brake 536. These drum brakes 532, 536 commonly use the same drum 204 and the same brake shoes 210a, 210b (brake linings 216a, 216b).

Upon operation of the brake pedal 534, the vehicle is braked by at least one of the three pairs of brakes 522, 532, 536. That is, there are the following four cases:

(a) Where the electrically operated disc brakes 522 and drum brakes 532 are both normal, the vehicle is braked by these brakes 522, 532;

(b) Where the electrically operated disc brakes 522 are not normal while the electrically operated drum brakes 532 are normal, the vehicle is braked by only the drum brakes 532;

(c) Where the electrically operated disc brakes 522 are normal while the electrically operated drum brakes 532 are not normal, the vehicle is braked by both the disc brakes 522 and the mechanically operated drum brakes 536;

(d) Where the electrically operated disc and drum brakes 522, 532 are both abnormal due to abnormality of an electric power source (primary battery 874) or an electronic control unit (ECU) 550, the vehicle is braked by only the mechanically operated drum brakes 536.

In the present braking system, parking brake is applied to the front left and right wheels FL, FR by the disc brakes 522 upon operation of the parking brake pedal 42. The parking brake is applied by holding the electric motors 20 (ultrasonic motors) of the disc brakes 522 stationary with a holding torque while the parking brake pedal 42 is kept operated.

Figure 24:
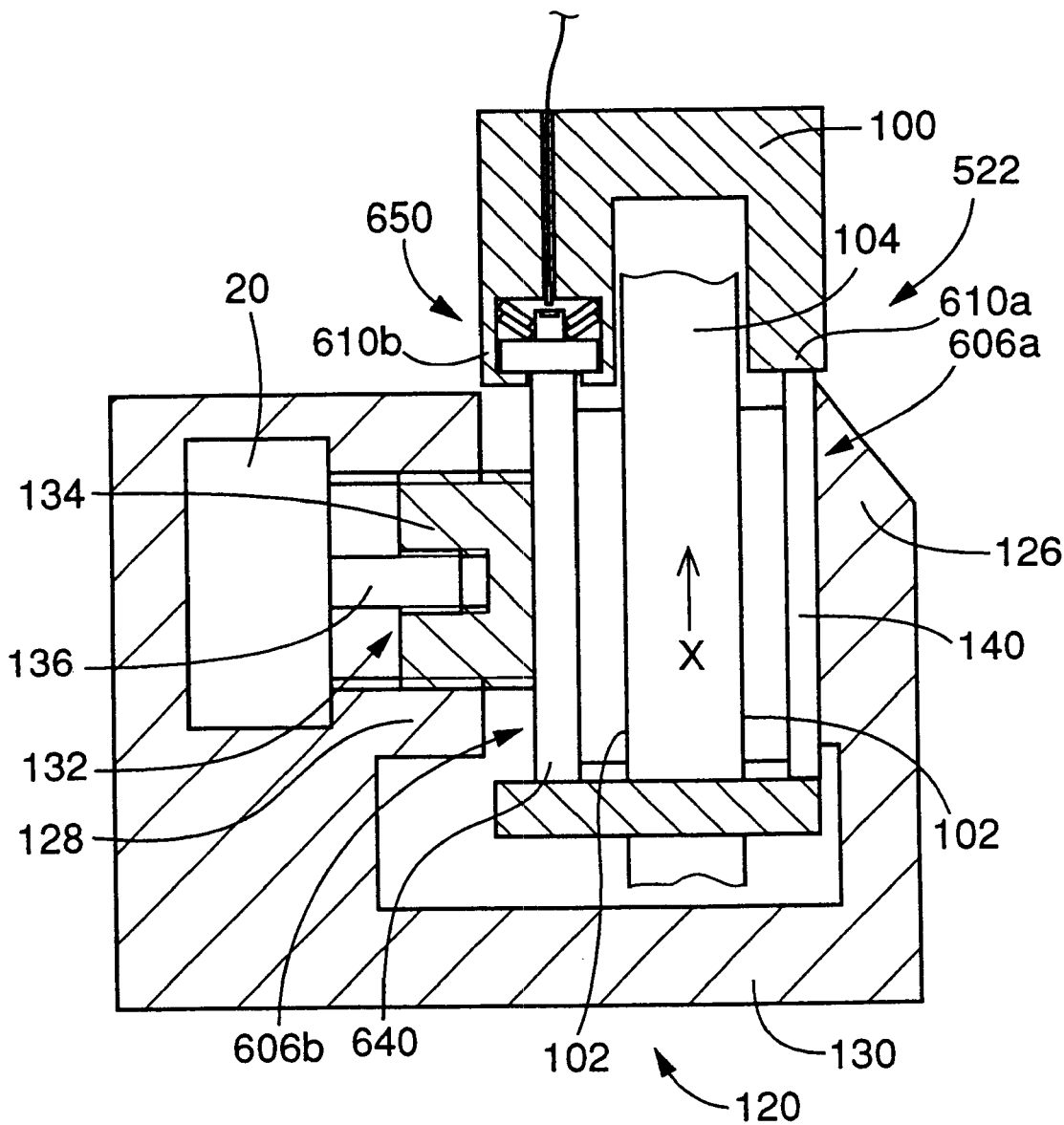
FIG. 24 is a plan view partly in cross section of an electrically operated disc brake used in the braking system of FIG. 23.

The disc brake 522 for the front right wheel FR is shown in detail in FIG. 24. The disc brake 533 for the front left wheel FL has the same construction as shown in FIG. 24. The disc brake 522 of FIG. 24 is identical with the disc brake 22 of FIG. 2 of the first embodiment, except for the configuration of brake pads 606 (more specifically, inner brake pad 606*b*) and the provision of a force switch 650 provided in a stationary member in the form of the mounting bracket 100. Unlike the inner brake pad 110*b* of the disc brake 22 of FIG. 2, the inner brake pad 606*b* of the disc brake 522 has a backing plate 640 which has a constant thickness. When the outer and inner pads 606*a*, 606*b* are forced onto the friction surfaces 102 of the disc rotor 102, the pads 606*a*, 606*b* are "dragged" or rotated with the disc rotor 102 in the direction X. However, the amounts of rotation of the pads 606*a*, 606*b* are limited by respective torque receiving portions 610*a*, 610*b* of the mounting bracket 100. Namely, the amount of rotation of the outer pad 606*a* is limited by abutting contact of its end face with the outer torque receiving portion 610*a*, while the amount of rotation of the inner pad 606*b* is limited by abutting contact of the force switch 650 with the inner torque receiving portion 610*b*, as described below by reference to FIG. 25. The torque receiving portions 610*a*, 610*b* function as support members for supporting the friction members so as to prevent rotation of the friction members in the form of the brake pads 606*a*, 606*b* with the rotor 104 when the friction members are held in frictional contact with the rotor 104.

The presser portion 134 moved by the electric motor 20 through the ballscrew mechanism 136 is not provided at its front end with such a thrust bearing as provided in the disc brake 22 of FIG. 22. The presser portion 134 cooperates with the ballscrew mechanism 132 to constitute a pressing device for forcing the brake pads 606*a*, 606*b* onto the rotor 104.

Figure 25:
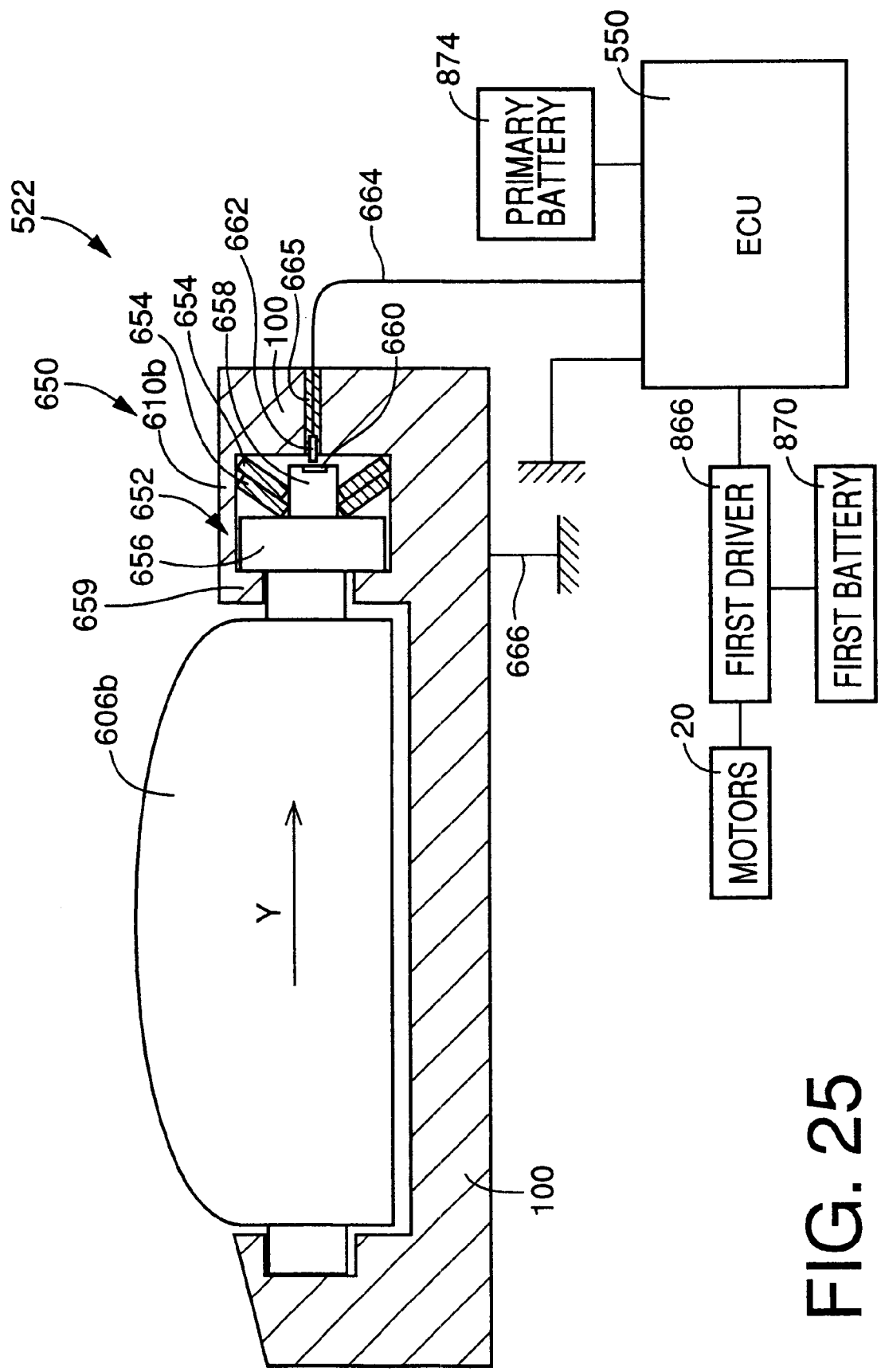
FIG. 25 is a cross sectional view of the disc brake of FIG. 24 taken along in a surface of inner brake pad 606b.

The force switch 650 is provided in the inner torque receiving portion 610*b* which is adapted to receive a torque from the inner brake pad 606*b*. As shown in enlargement in FIG. 25, the force switch 650 consists of a movable member 652 and an elastic member in the form of a coned disc spring 654. The movable member 652 is a stepped cylindrical member including a large-diameter portion 656 and a small-diameter portion 658 which both have a circular cross sectional shape and are coaxial with each other. The large-diameter portion 656 is received axially movably within the inner torque receiving portion 610*b*, while the small-diameter portion 658 extends through a center opening of the coned disc spring 654. The coned disc spring 654 biases the movable member 652 toward the inner brake pad 606*b*. Normally, the movable member 652 is held in abutting contact with a stop portion 659 formed with the mounting bracket 100. In other words, the stop portion 659 determines the fully retracted position of the movable member 652. When the inner brake pad 606*b* is rotated with the disc rotor 104 in the direction Y as indicated in FIG. 25, the movable member 652 is moved away from the fully retracted position against the biasing force of the spring 654.

The small-diameter portion 658 has a movable contact 660 fixed to its end face. The inner torque receiving portion 610*b* has a stationary contact 662 which is an elastic member. The movable contact 660 comes into contact with the stationary contact 662 when the movable member 652 is moved to its fully advanced position by the inner brake pad 606*b* against the biasing action of the coned disc spring 654. The fully advanced position of the movable member 652 is determined by abutting contact of the end face of the small-diameter portion 658 with the surface of the inner torque receiving portion 610*b*. In this arrangement, a force generated by friction contact of the inner brake pad 606*b* with the rotor 104 is transmitted to the inner torque receiving portion 610*b* through the movable member 652.

The stationary contact 662 is electrically connected through a wire 664 to the electronic control unit 550. The wire 664 extends through the mounting bracket 100. The stationary contact 662 and the wire 664 are electrically insulated from the mounting bracket 100 by an insulator 665. On the other hand, the movable contact 660 is grounded through the electrically conductive movable member 652 and mounting bracket 100 and through a wire 666 connected to the mounting bracket 100.

The movable contact 660 is normally held away from the stationary contact 662 with the movable member 652 held in its fully retracted position under the biasing force of the coned disc spring 654. Thus, the force switch 650 is normally held in its off state. When the force which the movable member 652 receives from the inner brake pad 606*b* exceeds a predetermined value (a pre-load given to the coned disc spring 654), the movable member 652 starts moving with the inner brake pad 606*b* against the biasing force of the spring 654, from the fully retracted position toward the fully advanced position in which the movable contact 660 contacts the stationary contact 662, whereby the force switch 650 is turned on.

It will be understood that the force switch 650 may be provided in the outer torque receiving portion 610*a* of the mounting bracket 100.

Figure 26:
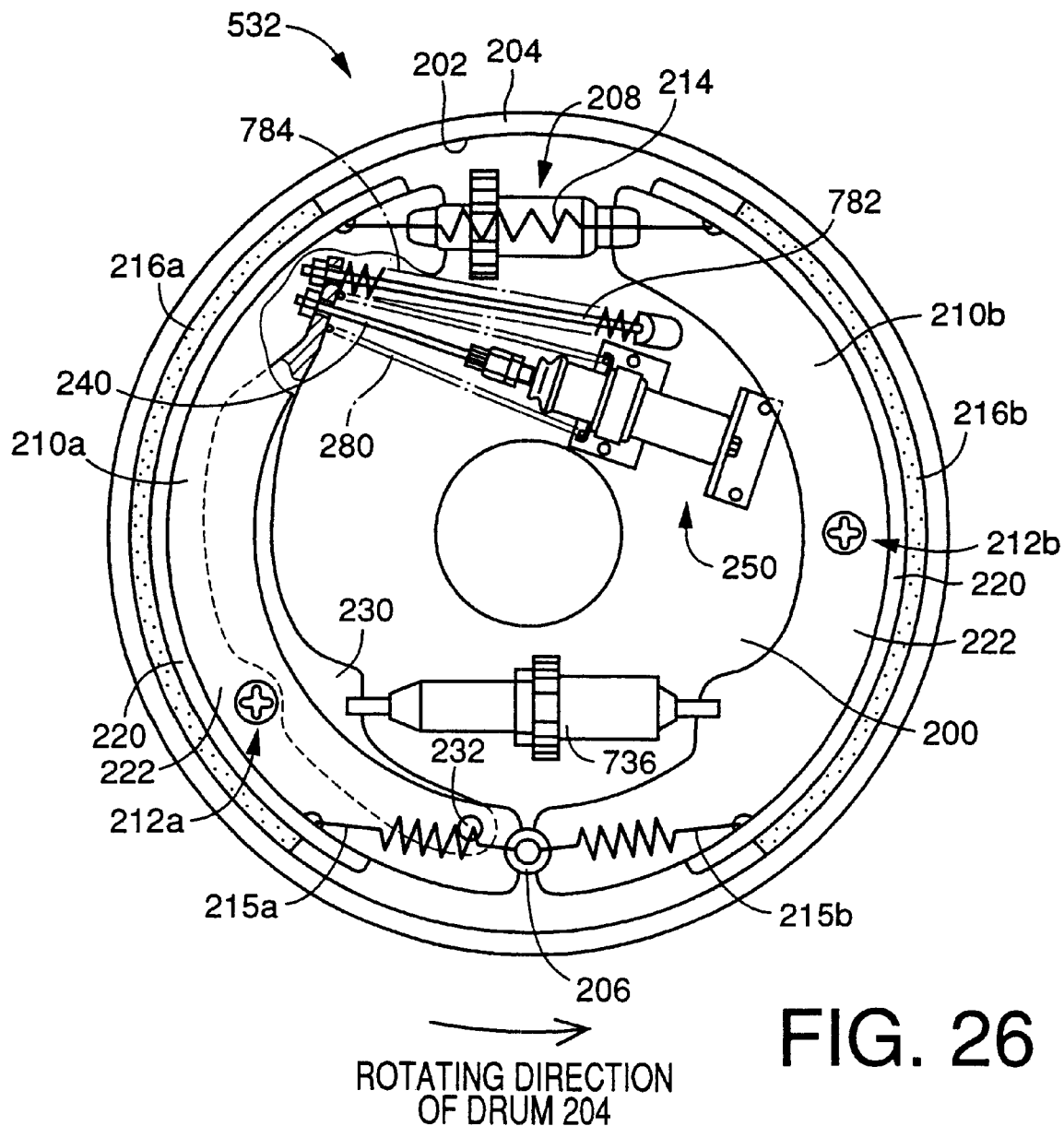
FIG. 26 is a front elevational view partly in cross section of an electrically operated drum brake used for each of rear left and right wheels in the braking system of FIG. 23.

Referring to FIG. 26, there is shown the electrically operated drum brake 532 for the rear right wheel RR. The drum brake 532 for the rear left wheel RL has the same construction as shown in FIG. 26.

The drum brake 532 is identical with the drum brake 32 of FIG. 3 of the first embodiment, except for a strut 736 provided in place of the strut 236. This strut 736 incorporates a length adjusting mechanism including a screw device, which is manipulated to adjust a clearance or gap between the brake shoes 210*a*, 10*b* and the drum 204.

The mechanically operated drum brake 536 for each rear wheel will be described.

All the elements of the electrically operated drum brake 532 except the primary brake cable 240, shoe expanding actuator 250 and return spring 280 are also used for the mechanically operated drum brake 536. This drum brake 536 uses an emergency brake cable 782 and a return spring 784, which are similar to the parking brake cable 242 and the return spring 244 provided in the drum brake 32 of FIG. 3. The emergency brake cable 782 is connected at one end thereof to the end of the lever 230 to which the primary brake cable 240 of the electrically operated drum brake 532 is connected. When the mechanically operated drum brake 536 is activated, the lever 230 is pivoted to force the brake linings 216*a*, 216*b* onto the drum 204, for thereby braking the rear right wheel RR. The emergency brake cable 782 is guided through an outer tubing 786, as indicated in FIG. 23.

The emergency brake cable 782 connected at its one end to the mechanically operated drum brake 536 for each rear wheel is operatively connected at the other end to the brake pedal 534 through a manual brake control device 800, as shown in FIG. 23.

Figure 27:
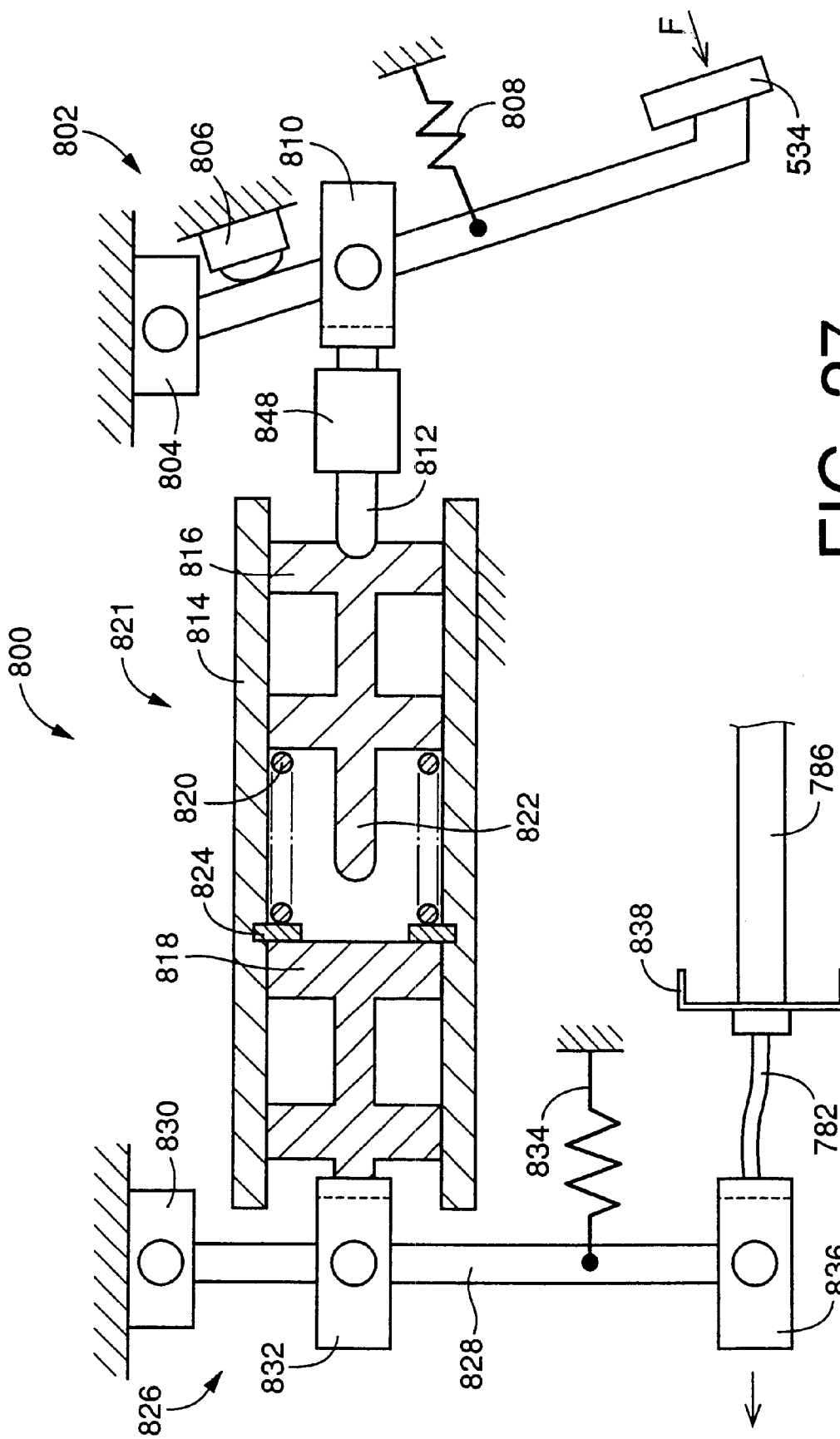
FIG. 27 is an enlarged side elevational view of a manual brake control device in the braking system of FIG. 23.

The manual brake control device 800 is shown in enlargement in FIG. 27, together with a brake pedal device 802. The brake pedal device 802 includes a pedal bracket 804 fixed to the vehicle body. The brake pedal 534 is supported at a proximal end thereof by the pedal bracket 804 such that the brake pedal 534 is pivotable at its proximal end about an axis which extends in the lateral or transverse direction of the vehicle. Normally, the brake pedal 534 is held in its non-operated position, which is determined by abutting contact of the brake pedal 534 with a stop 806 under a biasing action of a return spring 808. The brake pedal 534 is pivotally connected to the rear end of a push rod 312 through a clevis 810, which serves as a pivotal link mechanism. In this arrangement, the push rod 312 is movable in the longitudinal or running direction of the vehicle. A pivotal motion of the brake pedal 534 is converted into a linear motion of the push rod 312.

The manual brake control device 800 includes a housing 814 fixed to the vehicle body. Within a bore formed in the housing 814, there are slidably received a first piston 816 and a second piston 818 which are disposed coaxially with each other such that the pistons 816, 818 are movable relative to each other in the longitudinal direction of the vehicle. The push rod 812 engages at its front end with the rear end of the first piston 816. An operating force f acting on the brake pedal 534 is transmitted in the forward direction to the first piston 816 through the push rod 812. Thus, the brake pedal 534 is mechanically connected to the first piston 816. Between the first piston 816 and the housing 814, there is disposed an elastic member in the form of a spring 820, which biases the first piston 816 toward the push rod 812, so as to hold the brake pedal 534 in its non-operated position. Upon operation of the brake pedal 534 when the electrically operated drum brake 532 is normal, the brake pedal 534 is moved by a distance corresponding to the operating force f acting on the brake pedal 534. Thus, the manual brake control device 800 gives the vehicle operator an operating feel of the brake pedal 534 as obtained with a brake pedal in a hydraulically operated braking system. In the present eighth embodiment, the first piston 816 and the spring 320 cooperate to constitute a pedal stroke simulator generally indicated at 812 in FIG. 27.

Figure 28:
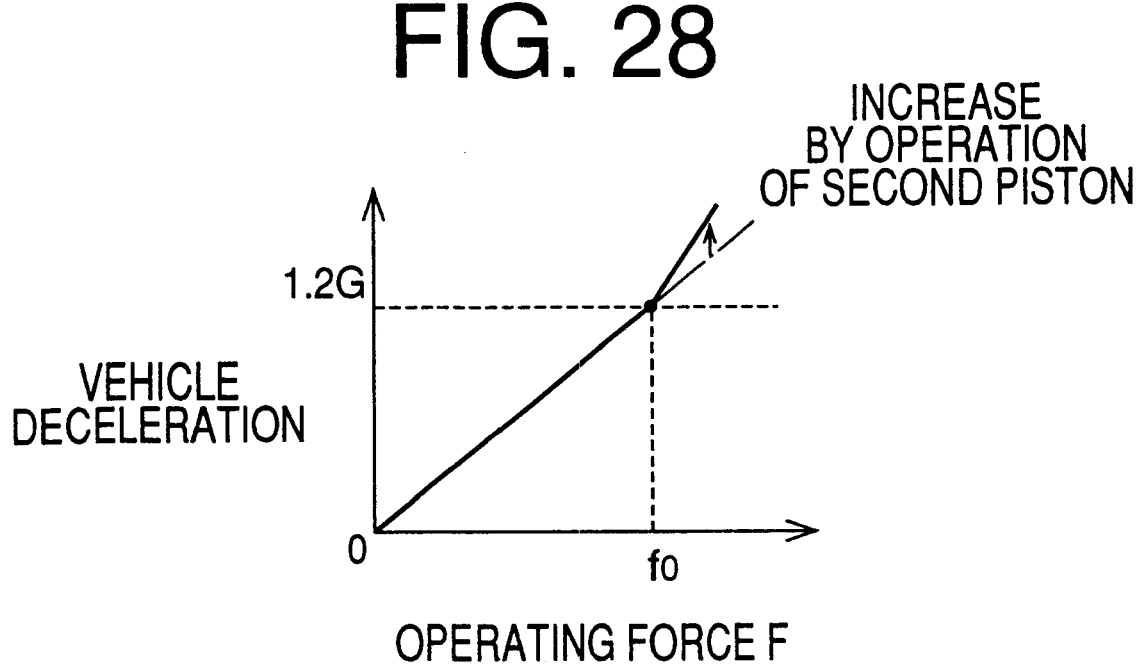
FIG. 28 is a graph for explaining a relationship between brake pedal operating force f and vehicle deceleration value G during initial period of movement of second piston provided in the manual brake control device of FIG. 27.

The first piston 816 has an engaging portion in the form of a projection 822 which extends toward the second piston 818 such that the projection 822 is coaxial with the pistons 816, 818. The second piston 818 has a fully retracted position determined by a stop 824. The retracted position of the second piston 818 or the position of the stop 824, which determines an initial distance between the two pistons 816, 818, is determined so that the projection 822 is spaced apart from the second piston 818 when the brake pedal 534 is placed in its non-operated position of FIG. 27, but is brought into abutting contact with the second piston 818 when the operating force f acting on the brake pedal 534 has reached a reference value $f_0$. This reference value $f_0$ is determined such that the operating force f equal to the reference value $f_0$ produces a relatively high deceleration value G (e.g., 1.2 G) of the vehicle which is not usually obtained when the electrically operated disc and drum brakes 522, 532 are both normal. If and after the operating force f exceeds the thus determined reference value $f_0$ when the disc and drum brakes 522, 532 are both normal, the second piston 818 is moved forward from the fully retracted position, and the mechanically operated drum brake 536 is also activated simultaneously, the rate of increase of the vehicle deceleration value G with an increase in the operating force f is raised, as indicated in the graph of FIG. 28.

The second piston 818 is connected through a lever device 826 to the rear end of the emergency brake cable 782 of the mechanically operated drum brake 536 for each rear wheel, as shown in FIG. 27.

The lever device 826 includes a lever 828 and a lever bracket 830 fixed to the vehicle body. The lever 828 is supported at a proximal end thereof by the lever bracket 830 such that the lever 828 is pivotable about the proximal end in a plane which includes the axis of the second piston 818. The lever 828 is connected at an intermediate portion thereof to the front end of the second piston 818 through a clevis 832, and is held in its fully retracted position under a biasing action of a return spring 834 such that the clevis 832 is held in abutting contact with the front end of the second piston 818. The lever 828 is connected at a free end thereof to the end of the emergency brake cable 782 of each drum brake 536 through a clevis 836. In this arrangement, a forward movement of the second piston 818 (in the left direction as seen in FIG. 27) will cause the lever 828 to be pivoted in the clockwise direction (as seen in FIG. 27), pulling the emergency brake cable 782 in the left direction as seen in FIG. 27, out of the outer tubing 786, whereby the movement of the second piston 818 is boosted into the movement of the emergency brake cable 782. Reference numeral 838 in FIG. 27 denotes a bracket fixed to the vehicle body for fixing the outer tubing 786 for the emergency brake cable 782.

When the brake pedal 534 is operated while the electrically operated drum brakes 532 are normal, the electric motors 30 of the actuators 250 are operated to pull the primary brake cables 240 to force the brake shoes 210*a*, 210*b* onto the drum 204. At this time, the flexible emergency brake cables 782 are contracted, so that the actions of the brake shoes 210*a*, 210*b* by operation of the electrically operated drum brakes 532 are not disturbed by the manual brake control device 800.

When the brake pedal 534 is operated while the electrically operated drum brakes 532 are not normal, the emergency brake cables 782 are pulled by the brake pedal 534, and the lever 230 is pivoted to force the brake shoes 210*a*, 210*b* onto the drum 204. At this time, the flexible primary brake cables 240 are contracted, so that the actions of the brake shoes 210*a*, 210*b* by operation of the mechanically operated drum brakes 536 are not disturbed by the electrically operated drum brakes 532.

Thus, the primary brake cables 240 and the emergency brake cables 782 which are both flexible and connected to the same lever 230 are not disturbed by the emergency brake cables 782 and the primary brake cables 240, respectively, when the electrically and mechanically operated drum brakes 532, 536 are operated at different times.

Referring back to FIG. 23, there will be described a control system of the braking system according to the eighth embodiment of the invention. The control system includes the electronic control unit (ECU) 350, which is principally constituted by a computer 836 incorporating a read-only memory (ROM) 842 and a random-access memory (RAM) 844. To the ECU 850, there are connected various sensors and switches including: the above-indicated force switches 650 of the disc brakes 522 for the front left and right wheels FL, FR; a brake pedal switch 850; an operation force sensor 848; a parking pedal switch 851; an accelerator pedal switch 852; an accelerator operation amount sensor 853; a steering angle sensor 854; a yaw rate sensor 855; a longitudinal acceleration sensor 856; a lateral acceleration sensor 857; a front wheel load sensor 858; a rear wheel load sensor 859; four wheel speed sensors 860; four motor position sensors 862 and four motor current sensors 864.

The operation force sensor 848 generates an output signal indicative of the operating force f acting on the brake pedal 534. The brake pedal switch 850, which is a primary brake operation sensor, generates an output signal indicative of whether the brake pedal 34 is in operation. That is, the brake pedal switch 850 is placed in an off state when the brake pedal 534 is not in operation, and in an on state when the brake pedal 534 is in operation. The parking pedal switch 851, which is a parking brake operation sensor, generates an output signal indicative of whether the parking brake pedal 42 is in operation. That is, the parking brake pedal switch 851 is placed in an off state when the parking brake pedal 42 is not in operation, and in an on state when the parking brake pedal 42 is in operation. The accelerator pedal switch 852, which is an accelerator operation sensor, generates an output signal indicative of whether the accelerator pedal 44 is in operation. That is, the accelerator pedal switch 852 is placed in an off state when the accelerator pedal 44 is not in operation, and in an on state when the accelerator pedal 44 is in operation. The accelerator pedal operation amount sensor 853 generates an output signal indicative of an operating amount of the accelerator pedal 44. The steering angle sensor 354, which is a sensor for detecting an angle of turn of the vehicle, generates an output signal indicative of the angle of rotation of the steering wheel 46. The yaw rate sensor 855 generates an output signal indicative of a yaw rate $\gamma$ of the vehicle. The longitudinal acceleration sensor 856 generates an output signal indicative of a deceleration value $G_{FR}$ of the vehicle in the longitudinal direction of the vehicle. The lateral acceleration sensor 857 generates an output signal indicative of a lateral acceleration value $G_{FR}$ of the vehicle in the lateral direction of the vehicle. The front wheel load sensor 858 generates an output signal indicative of a load $W_F$ acting on the front axle in the vertical direction, while the rear wheel load sensor 859 generates an output signal indicative of a load $W_R$ acting on the rear axle in the vertical direction. Each of the four wheel speed sensors 860 generates an output signal indicative of the rotating speed Vw of the corresponding wheel. Each of the motor position sensors 860 generates an output signal indicative of the angular position of the corresponding electric motor 20, 30. Each of the motor current sensors 864 generates an output signal indicative of an electric current supplied to the coil of the corresponding motor 20, 30.

The ECU 550 is also connected to a first driver 866 and a second driver 868. The first driver 866 is connected between an electric power source in the form of a first battery 870 and the electric motor 20 of each electrically operated disc brake 522. On the other hand, the second driver 868 is connected between an electric power source in the form of a second battery 872 and the electric motor 30 of each electrically operated drum brake 532. Upon operation of the brake pedal 534, the ECU 550 applies control commands to the first and second drivers 866, 868, so that the amounts of the electric current to be supplied from the first and second batteries 870, 872 to the respective electric motors 20, 30 are controlled according to the control commands, which are determined by the operating force f acting on the brake pedal 534.

The braking system also includes a primary battery 874 independent of the first and second batteries 870, 872. This primary battery 874 is used for operating all electrical components of the vehicle, except the electric motors 20, 30 of the brakes 522, 532. The ECU 550 is powered by the primary battery 874, rather than the first and second batteries 870, 872.

The ECU 550 is further connected to an engine output control device (throttle control unit, a fuel supply control unit, ignition timing control unit, etc.) for controlling the engine 10, and a shift control device (solenoid-operated valves, etc.) for controlling the automatic transmission 12. The ECU 550 applies control commands to these engine output control device and shift control device to effect a traction control of the vehicle, namely, to control the running vehicle so as to avoid excessive spinning or slipping of the drive wheels.

The ECU 550 is also connected to a brake failure indicator light 876 which is turned on in the event of an electrical or other failure or defect of the electrically operated disc and drum brakes 522, 532.

The ROM 842 of the computer 846 stores various control programs including programs for executing various routines such as a brake control routine and a friction coefficient calculating routine.

The brake control routine is formulated to control the brakes 522, 532 in various modes such as a basic control mode, an anti-lock control mode, a traction control mode and vehicle stability control (VSC) mode. In the basic control mode, the electric motors 20, 30 of the disc and drum brakes 522, 532 are controlled so as to achieve the vehicle deceleration corresponding to the operating force f acting on the brake pedal 534, on the basis of the output signals of the operation force sensor 848, brake pedal switch 850, front and rear wheel load sensors 858, 859, motor position sensors 862 and motor current sensors 864, while monitoring the detected angular positions of the motors 20, 30 and the detected amounts of electric current supplied to the motors 20, 30, such that the braking force is suitably distributed to the front wheels FL, FR and the rear wheels RL, RR. In the anti-lock control mode, the electric motors 20, 30 are controlled to control the braking torque values of the wheels, so as to avoid an excessive locking tendency of each wheel, on the basis of the output signals of the brake pedal switch 850, wheel speed sensors 860, motor position sensors 862 and motor current sensors 864. In the traction control mode, the electric motors 20, 30 are controlled to control the driving torque values of the drive wheels, so as to avoid an excessive spinning or slipping tendency of each drive wheel, on the basis of the output signals of the accelerator pedal switch 852, accelerator operation amount sensor 853, wheel speed sensors 860, motor position sensors 862 and motor current sensors 864. In the VSC mode, the electric motors 20, 30 are controlled to control a yaw movement of the vehicle, by controlling a difference between the braking forces of the left and right wheels, so as to avoid an excessive drift-out or spinning tendency of the vehicle, on the basis of the steering angle sensor 854, yaw rate sensor 855, lateral acceleration sensor 858, wheel speed sensors 860, motor position sensors 862 and motor current sensors 864.

Figure 29:
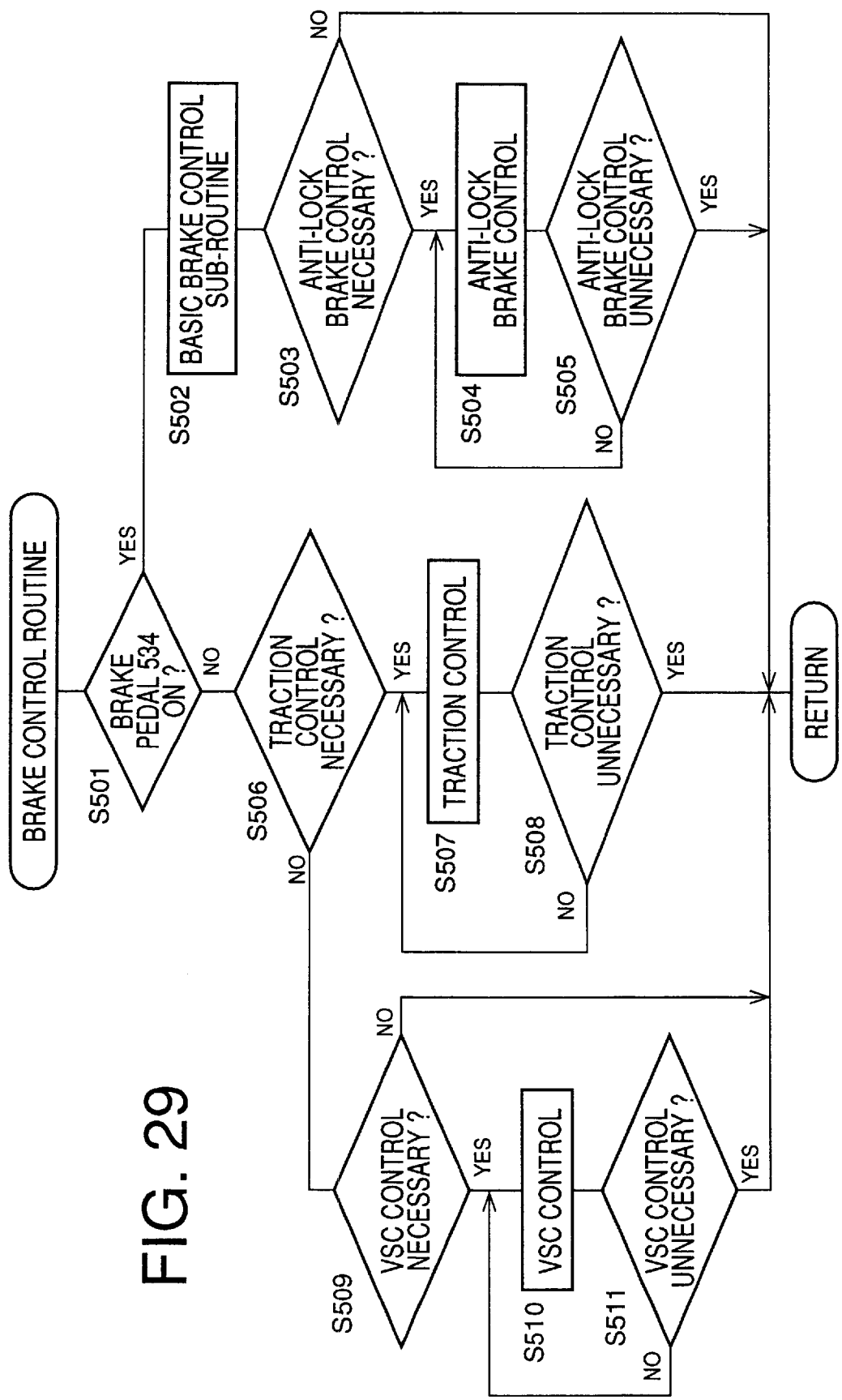
FIG. 29 is a flow chart illustrating a brake control routine executed according to a program stored in a ROM of a computer of an electronic control unit used in the braking system of FIG. 23.

The brake control routine is illustrated in the flow chart of FIG. 29. This routine is repeatedly executed while the ignition switch of the vehicle is held on. The routine is initiated with step S501 to determine whether the brake pedal 534 is in operation, that is, whether the brake pedal switch 530 is in the on state. If an affirmative decision (YES) is obtained, the control flow goes to step S2. in which the braking system is controlled in the basic control mode according to a basic control mode sub-routine illustrated in the flow chart of FIG. 30, which will be described.

Figure 30:
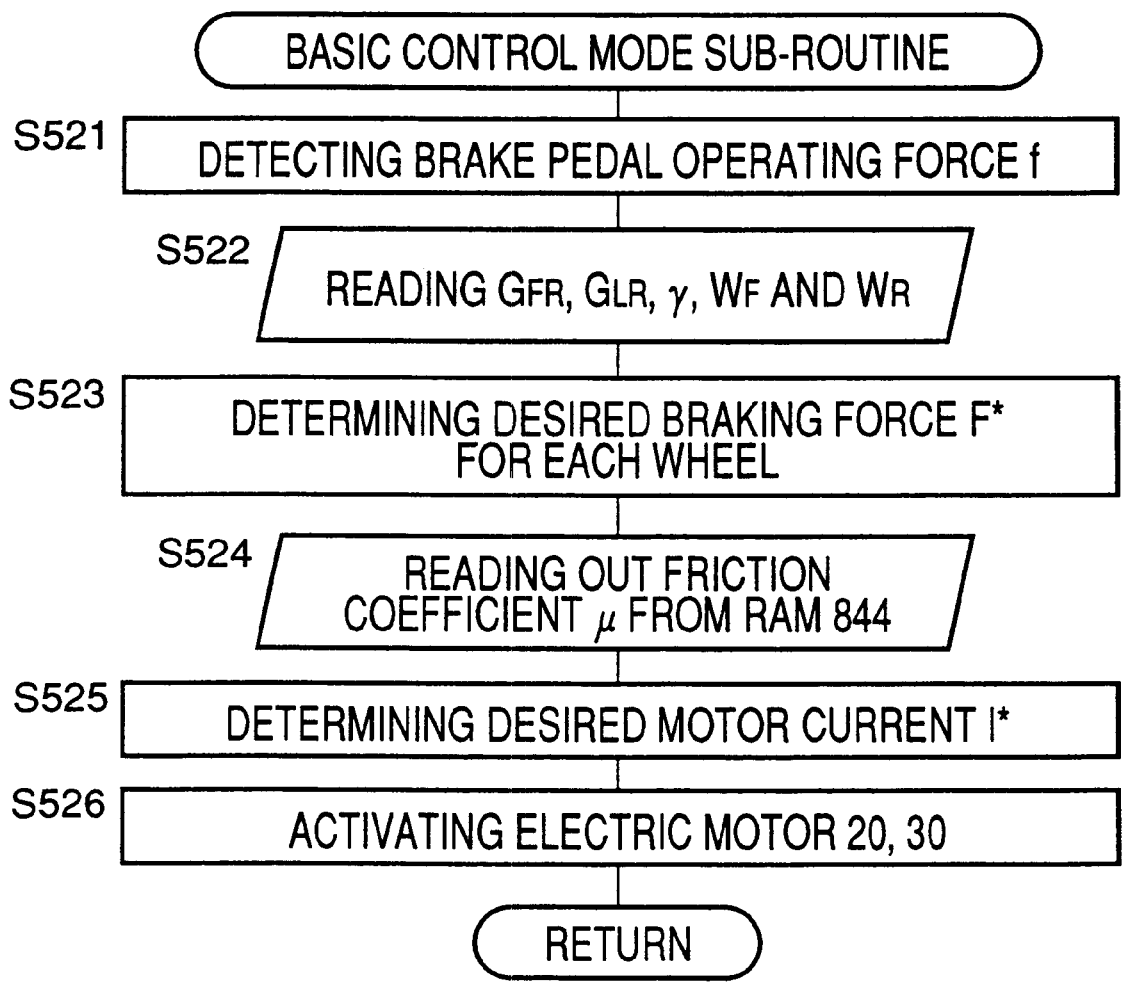
FIG. 30 is a flow chart illustrating a basic brake control sub-routine executed in step S2 of the routine of FIG. 29.

The sub-routine of FIG. 30 is initiated with step S521 in which the operating force f acting on the brake pedal 534 is detected on the basis of the output signal of the operation force sensor 848. Then, step S522 is implemented to read the longitudinal acceleration value $G_{FR}$, lateral acceleration value $G_{LR}$, front wheel load $W_F$, rear wheel load $W_R$ and yaw rate γ, which are represented by the output signals of the appropriate sensors. The control flow then goes to step S523 in which a desired braking torque or force F* for each wheel is determined on the basis of the detected values $G_{FR}$, $F_{LR}$, $W_F$, $W_R$, γ, so as to achieve an optimum or ideal front-rear distribution of the braking force depending upon the vehicle weight and deceleration values G, and so as to avoid yawing and/or lateral slipping tendency of the vehicle due to a large difference between the braking force of the left wheels and the braking force of the right wheels.

Step S523 is followed by step S524 to read the friction coefficient μ of the inner brake pad 606b of each front disc brake 522, which is stored in the RAM 844. Upon power application to the computer 846, the standard value of the friction coefficient μ is stored in the RAM 844, and is provisionally used before the friction coefficient μ is calculated according to a friction coefficient calculating routine (which will be described) and stored in the RAM 844. Each time the friction coefficient calculating routine is executed, the friction coefficient value μ stored in the RAM 844 is updated.

Then, the control flow goes to step S525 to determine a desired value I* of the electric current I to be supplied to the motor 20, 30 of each brake 522, 532. The desired electric current value I* for the motor 30 of each rear drum brake 532 is determined on the basis of the determined desired braking force F* and according to a predetermined relationship between the desired braking force F* and the desired electric current I*. This relationship is stored in the ROM 842. The desired electric current value I* for the motor 30 of each front disc brake 522 is determined according to the following equation, based on a fact that the desired electric current I* corresponds to a force N by which the brake pads 606a, 606b are forced onto the disc rotor 104.

$$I^*=F^*/(\mu \cdot K)$$

In the above equation, K represents a constant.

Then, the control flow goes to step S526 in which each motor 20, 30 is activated with the determined desired electric current I* supplied thereto. Thus, one cycle of execution of the basic control mode sub-routine of FIG. 30 is terminated in step S502 of the brake control routine of FIG. 29.

Step S502 of the routine of FIG. 29 is followed by step S503 to determine whether it is necessary to control the brakes 522, 532 in the anti-lock control mode, that is, whether the vehicle wheels have an excessive locking tendency. If a negative decision (NO) is obtained in step S503, one cycle of execution of the routine of FIG. 29 is terminated. If an affirmative decision (YES) is obtained in step S503, the control flow goes to step S504 in which the braking system is controlled in the anti-lock control mode. Step S504 is followed by step S505 to determine whether the anti-lock brake control becomes unnecessary. If a negative decision (NO) is obtained, the control flow goes back to step S504, and step S504 is repeatedly implemented until an affirmative decision (YES) is obtained in step S505, that is, until the excessive locking tendency of the wheels has been removed. If the affirmative decision (YES) is obtained in step S505, one cycle of execution of the routine is terminated.

If a negative decision (NO) is obtained in step S501, the control flow goes to step S506 to determine whether it is necessary to control the brakes 522, 532 in the traction control mode, that is, whether the drive wheels have an excessive spinning or slipping tendency. If an affirmative decision (YES) is obtained in step S506, the control flow goes to step S507 in which the braking system is controlled in the traction control mode. Step S507 is followed by step S508 to determine whether the traction control becomes unnecessary. If a negative decision (NO) is obtained in step S507, the control flow goes to step S507, and step S507 is repeatedly implemented until an affirmative decision (YES) is obtained in step S508, that is, until the excessive slipping tendency of the drive wheels has been removed. If the affirmative decision (YES) is obtained in step S508, one cycle of execution of the routine is terminated.

If the brake pedal switch 850 is off and if the traction control is not necessary, that is, if a negative decision (NO) is obtained in steps S501 and S506, the control flow goes to step S509 to determine whether the VSC control (vehicle stability control) is necessary, that is, whether the vehicle has an excessive drift-out or spinning tendency. If an affirmative decision (YES) is obtained in step S509, the control flow goes to step S510 in which the braking system is controlled in the VSC control mode. Step S510 is followed by step S511 to determine whether the VSC control becomes unnecessary. If a negative decision (NO) is obtained in step S511, the control flow goes back to step S510, and step S510 is repeatedly implemented until an affirmative decision (YES) is obtained in step S510, that is, until the VSC control becomes unnecessary. If the affirmative decision (YES) is obtained in step S511, one cycle of execution of the routine is terminated.

Figure 31:
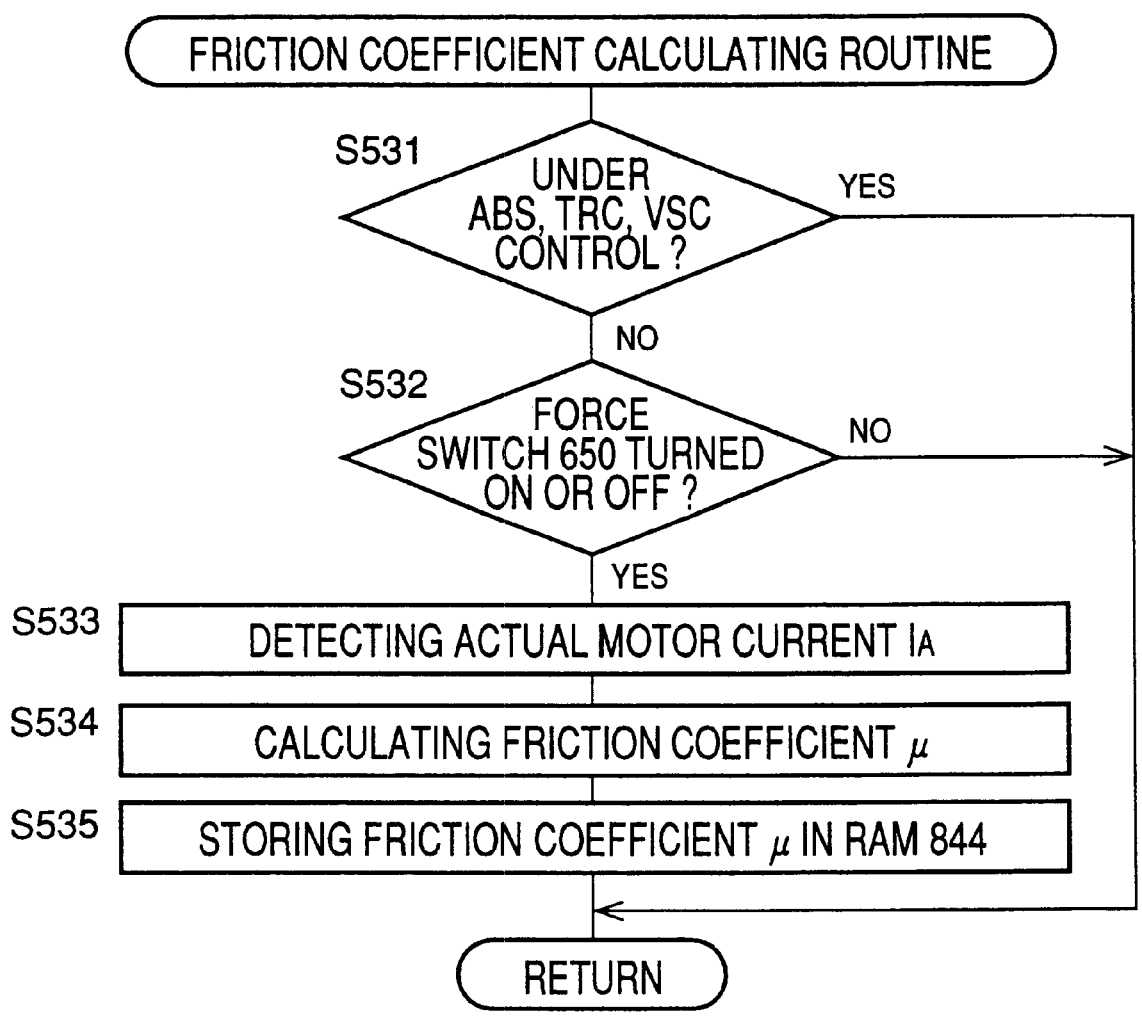
FIG. 31 is a flow chart illustrating a friction coefficient calculating routine executed according to a program stored in the ROM of the braking system of FIG. 23.

The friction coefficient calculating routine indicated above is illustrated in the flow chart of FIG. 31.

The friction coefficient calculating routine is also repeatedly executed while the ignition switch of the vehicle is held on. The routine is executed alternately for the disc brakes 522 for the front left and right wheels FL, FR. The routine is initiated with step S531 to determine whether the disc brake 522 in question is controlled in any of the anti-lock, traction and VSC control modes. If an affirmative decision (YES) is obtained in step S531, one cycle of execution of the routine is terminated. If a negative decision (NO) is obtained in step S531, that is, if none of the anti-lock, traction and VSC controls is currently effected, the control flow goes to step S532.

Step S532 is provided to determine whether the force switch 650 is turned on or off, that is, whether the state of the force switch 650 is changed from the off state to the on state or vice versa. If the force switch 650 is turned on, it means that the force transmitted from the inner brake pad 606b to the force switch 650 has increased to the predetermined value. If the force switch 650 is turned off, it means that the force transmitted from the inner brake pad 606b has decreased to the predetermined value. If a negative decision (NO) is obtained in step S532, one cycle of execution of the routine is terminated. If an affirmative decision (YES) is obtained in step S532, the control flow goes to step S533.

In step S533, the actual value of the electric current $I_A$ supplied to the electric motor 20 is detected on the basis of the output signal of the appropriate motor current sensor 864. Then, step S534 is implemented to calculate the friction coefficient $\mu$ of the brake pads 606 of the disc brake 522 in question, on the basis of the calculated motor current $I_A$ and an optimum braking force $F_O$ which should act on the inner brake pad 606b when the force switch 650 is turned from the off state to the on state or vice versa. Namely, the friction coefficient $\mu$ is calculated according to the following equation:

$$\mu = F_O/(K \cdot I_A)$$

Then, the control flow goes to step S535 in which the calculated friction coefficient $\mu$ of the brake pads 606 is stored in the RAM 844. Thus, one cycle of execution of the routine of FIG. 31 is terminated.

It will be understood from the above description of the eighth embodiment of the invention that the motor current sensors 864 serve as a force-related quantity sensor for detecting a quantity relating to the braking force generated by the disc brake 522, and a pressing-force-related quantity sensor for detecting a physical quantity relating to the pressing force by which the friction member 606b is forced onto the rotor 104 by the pressing device. It will also be understood that a portion of the ECU 550 assigned to implement steps S531–S534 constitutes a friction coefficient estimating device for estimating the friction coefficient of the friction members 606 of the disc brakes 522. This friction coefficient estimating device may be considered to be a relationship estimating means for estimating the relationship between the electric current I to be applied to the electric motor 20 and the braking force or torque F to be generated by the brake and applied to the wheel. It will also be understood that a portion of the ECU 550 assigned to execute the routine of FIG. 30 constitutes relationship utilizing means for utilizing the estimated relationship, for controlling the disc brake 522.

There will next be described a ninth embodiment of this invention, in which the same reference numerals as used in the eighth embodiment will be used to identify the same elements.

Figure 32:
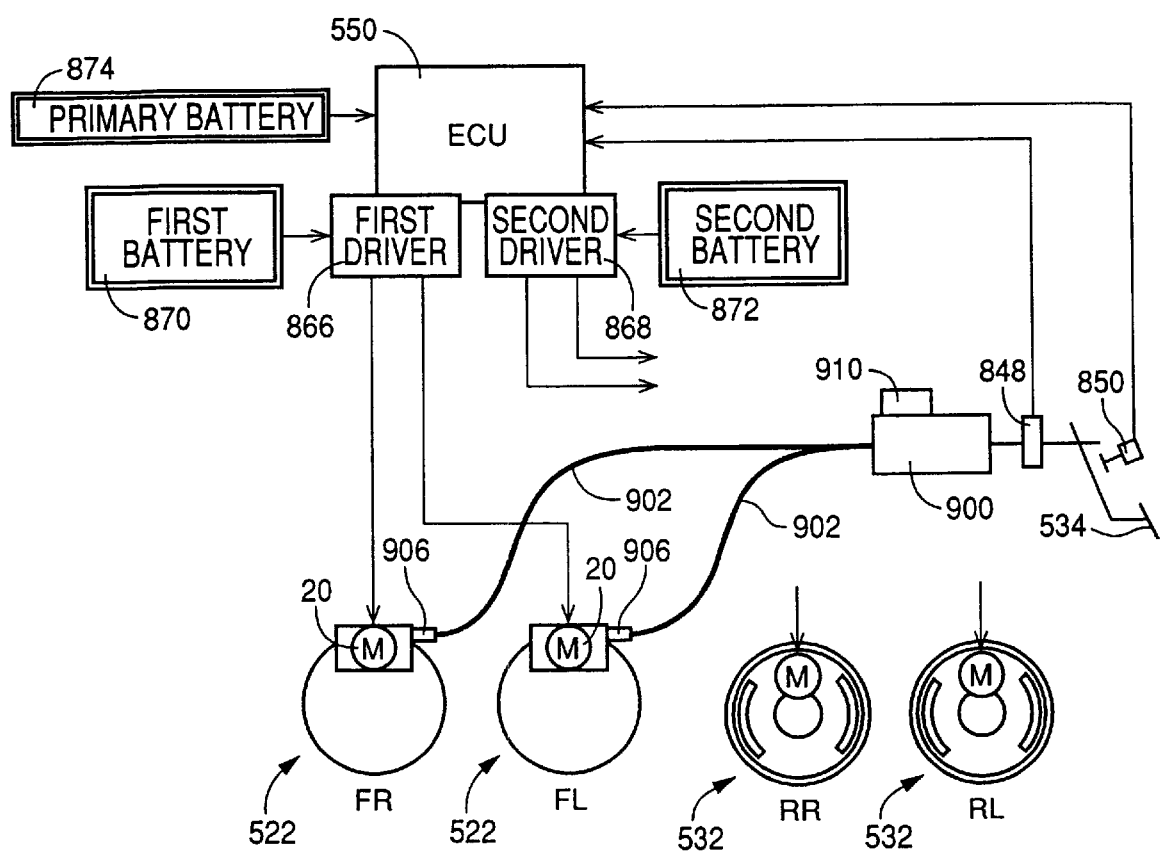
FIG. 32 is a schematic view showing an arrangement of an electrically operated braking system according to a ninth embodiment of this invention.

In the eighth embodiment, the manual brake control device 600 and the mechanically operated drum brakes 536 serving as the emergency brakes are provided for the rear left and right wheels RL, RR. In the present ninth embodiment, the manual brake control device 600 and the mechanically operated drum brakes 536 are provided for the front left and right wheels FL, FR. As shown in FIG. 32, the brake pedal 534 is operatively connected to the brake pads 606a, 606b of the electrically operated disc brakes 522 for the front left and right wheels FL, FR, through a manual brake control device 900, emergency brake cables 902 and mechanically operated brakes 906. The mechanically operated brakes 906 may be in operation when a friction coefficient calculating routine is executed for the disc brakes 522. The operation of the mechanically operated brakes 906 during execution of the friction coefficient calculating routine may lower the accuracy of calculation of the friction coefficient $\mu$. In view of this, the execution of the friction coefficient calculating routine is inhibited while the mechanically operated brakes 906 are in operation. In the present ninth embodiment, a switch 910 is provided to detect an operation of the mechanically operated brakes 906. The switch 910 is turned on when a second piston (similar to the second piston 818 of the manual brake control device 900 of the eighth embodiment) is moved from the fully retracted position. The switch 910 is held off when the second piston is placed in the fully retracted position.

Figure 33:
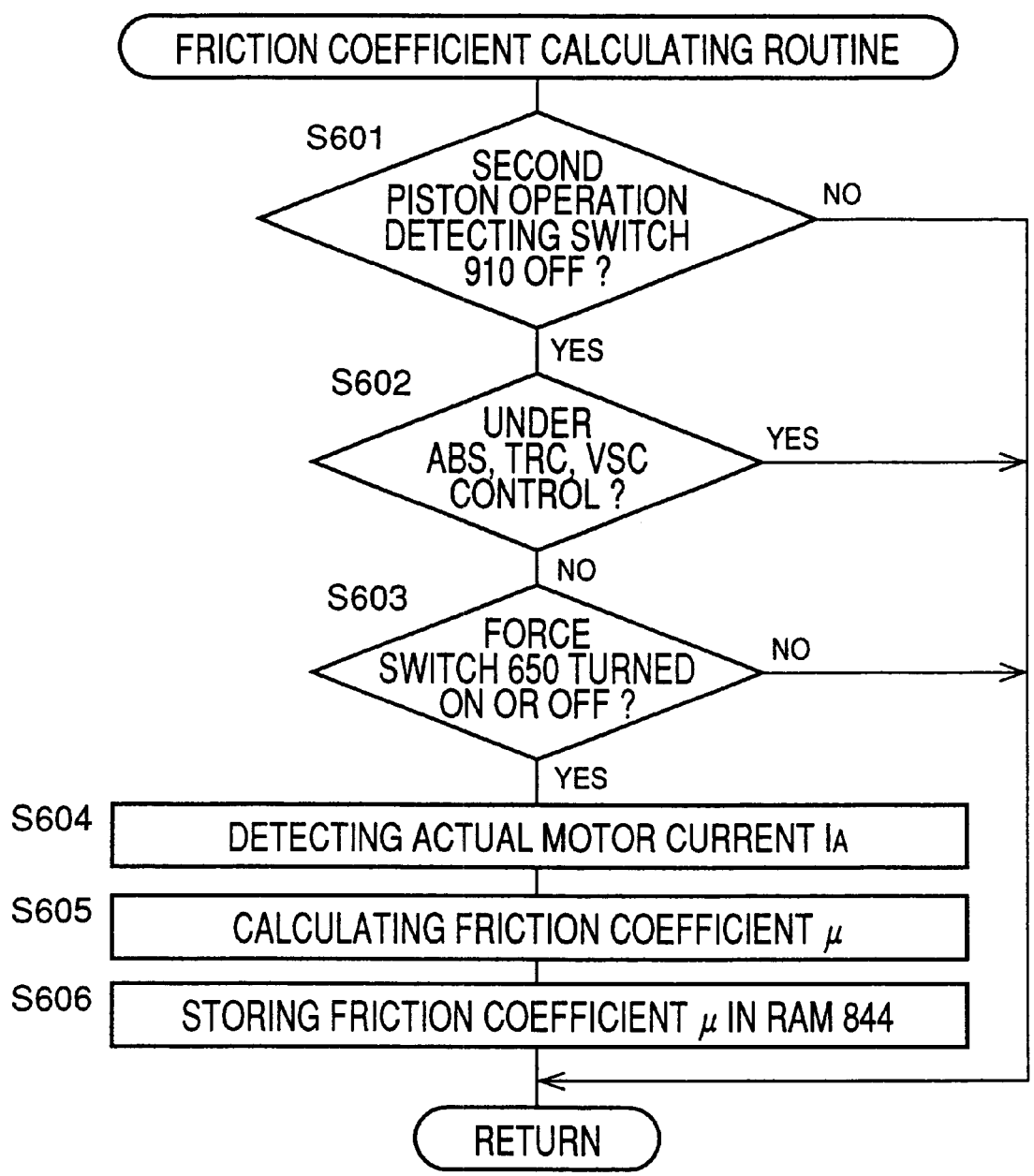
FIG. 33 is a flow chart illustrating a friction coefficient calculating routine executed according to a pogram stored in a ROM of a computer of an electronic control unit used in the braking system of FIG. 32.

In the present ninth embodiment, the ROM 842 stores a program for executing the friction coefficient calculating routine illustrated in the flow chart of FIG. 33.

The routine of FIG. 33 is initiated with step S601 to determine whether the switch 910 is off, namely, whether the second piston of the manual brake control device 910 is held in its fully retracted position. If a negative decision (NO) is obtained in step S601, one cycle of execution of the routine is terminated. If an affirmative decision (YES) is obtained in step S601, the control flow goes to step S602–606 identical with steps S531–S535 of the routine of FIG. 31.

A tenth embodiment of the invention will be described. This embodiment is a modification of the eighth embodiment.

The tenth embodiment is adapted to execute a brake pad fade detecting routine as well as the brake control routine of FIG. 29 and the friction coefficient calculating routine of FIG. 31. The brake pad fade detecting routine is illustrated in the flow chart of FIG. 34.

Figure 34:
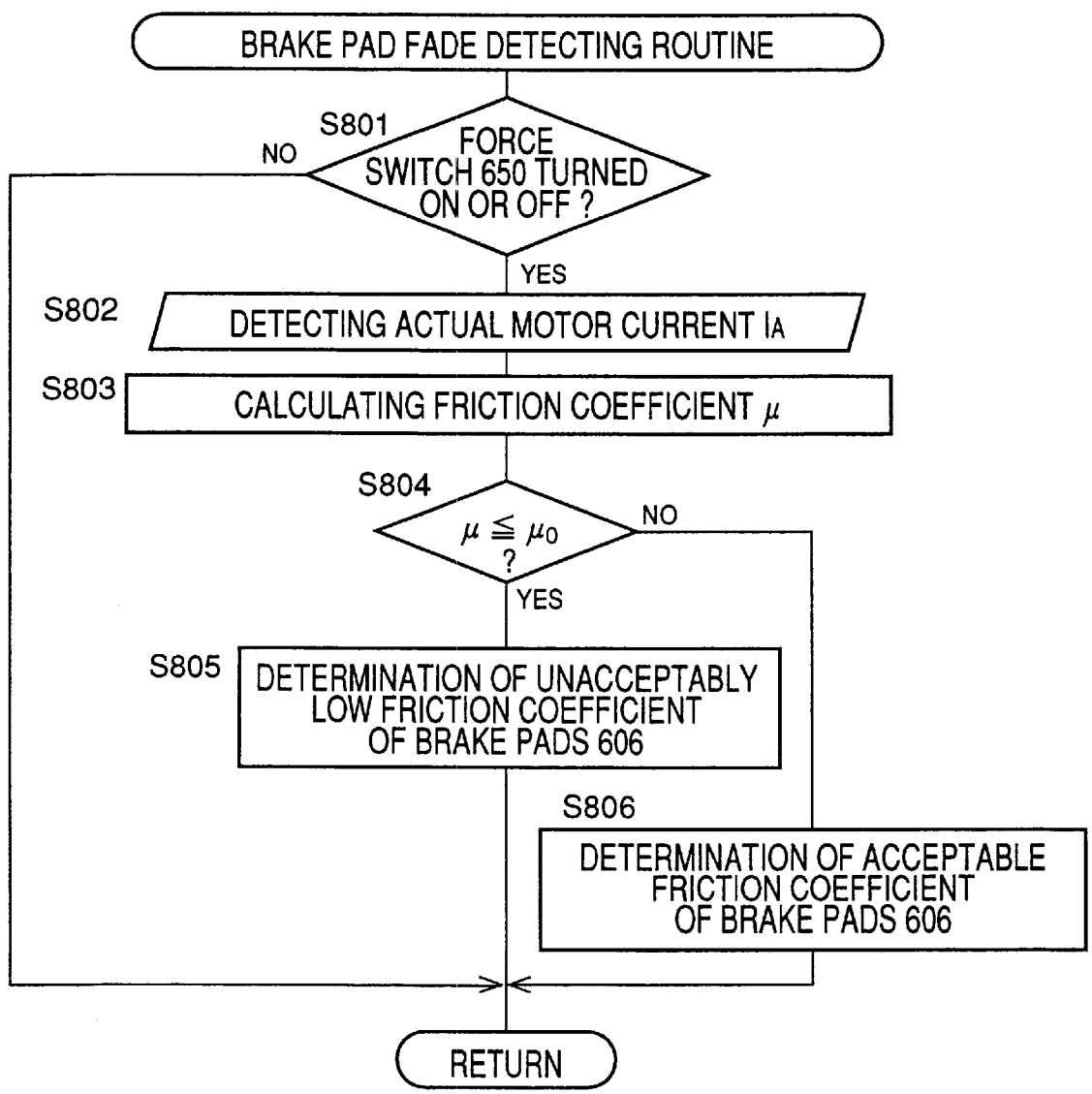
FIG. 34 is a flow chart illustrating a brake pad fade detecting routine executed according a program stored in a ROM of a computer used in a braking system of a tenth embodiment of this invention.

The brake pad fade detecting routine is executed alternately for the front left and right wheels FL, FR. The routine is initiated with step S801 to determine whether the force switch 650 is turned on or off. If a negative decision (NO) is obtained in step S801, one cycle of execution of the routine is terminated. If an affirmative decision (YES) is obtained in step S801, the control flow goes to step S802 to detect the motor current $I_A$ based on the output signal of the motor current sensor 864. Then, step S803 is implemented to calculate the friction coefficient $\mu$ of the brake pad 606, in the same manner as described above with respect to step S534 of the eighth embodiment. Step S803 is followed by step S804 to determine whether the calculated friction coefficient $\mu$ is equal to or smaller than a predetermined threshold $\mu$. If an affirmative decision (YES) is obtained in step S804, the control flow goes to step S805 to determine that the friction coefficient $\mu$ of the brake pad 606 is unacceptably low due to fading of the brake pad. In this case, the brake failure indicator light 876 is turned on to inform the vehicle operator of some failure or defect of the disc brake 522 in question. If a negative decision (NO) is obtained in step S804, the control flow goes to step S806 to determine that the friction coefficient $\mu$ is acceptably high. One cycle of execution of the routine of FIG. 34 is terminated with step S805 or S806.

An eleventh embodiment of the invention will be described. This embodiment is another modification of the eighth embodiment.

The eleventh embodiment is adapted to execute a brake failure detecting routine as well as the brake control routine of FIG. 29 and the friction coefficient calculating routine of FIG. 31. The brake failure detecting routine is illustrated in the flow chart of FIG. 34.

The brake failure detecting routine is also executed alternately for the front left and right wheels FL, FR. The routine is initiated with step S901 to detect the operating force f based on the operating force sensor 848. Then, step S902 is implemented to determine whether the detected operating force f is larger than the predetermined reference value $f_0$. If an affirmative decision (YES) is obtained in step S902, the control flow goes to step S903 to determine whether the force switch 650 is in the on state. The reference value $f_0$ is determined such that the force switch 650 is in the on state when the operating force f is larger than the reference value $f_0$, as long as the disc brake 522 is normal. In other words, if the force switch 650 is in the off state when the operating force f is larger than the reference value $f_0$, it means that the disc brake 522 is abnormal. Therefore, if a negative decision (NO) is obtained in step S903, the control flow goes to step S906 to determine that the disc brake 522 is abnormal. In this case, the brake failure indicator light 876 is turned on. Thus, one cycle of execution of the routine is terminated.

If an affirmative decision (YES) is obtained in step S903, the control flow goes to step S904 to determine whether the operating force f is smaller than a predetermined reference value $f_1$. If an affirmative decision (YES) is obtained in step S904, the control flow goes to step S905 to determine whether the force switch 650 is placed in the off state. The reference value $f_1$ is determined such that the force switch 650 is in the off state when the operating force f is smaller than the reference value $f_1$, as long as the disc brake 522 is normal. In other words, if the force switch 650 is in the on state when the operating force f is smaller than the reference value $f_1$, it means that the disc brake 522 is abnormal. Therefore, if a negative decision (NO) is obtained in step S905, the control flow goes to step S906 to determine that the disc brake 522 is abnormal. In this case, too, the brake failure indicator light 876 is turned on. Thus, one cycle of execution of the routine is terminated.

Figure 35:
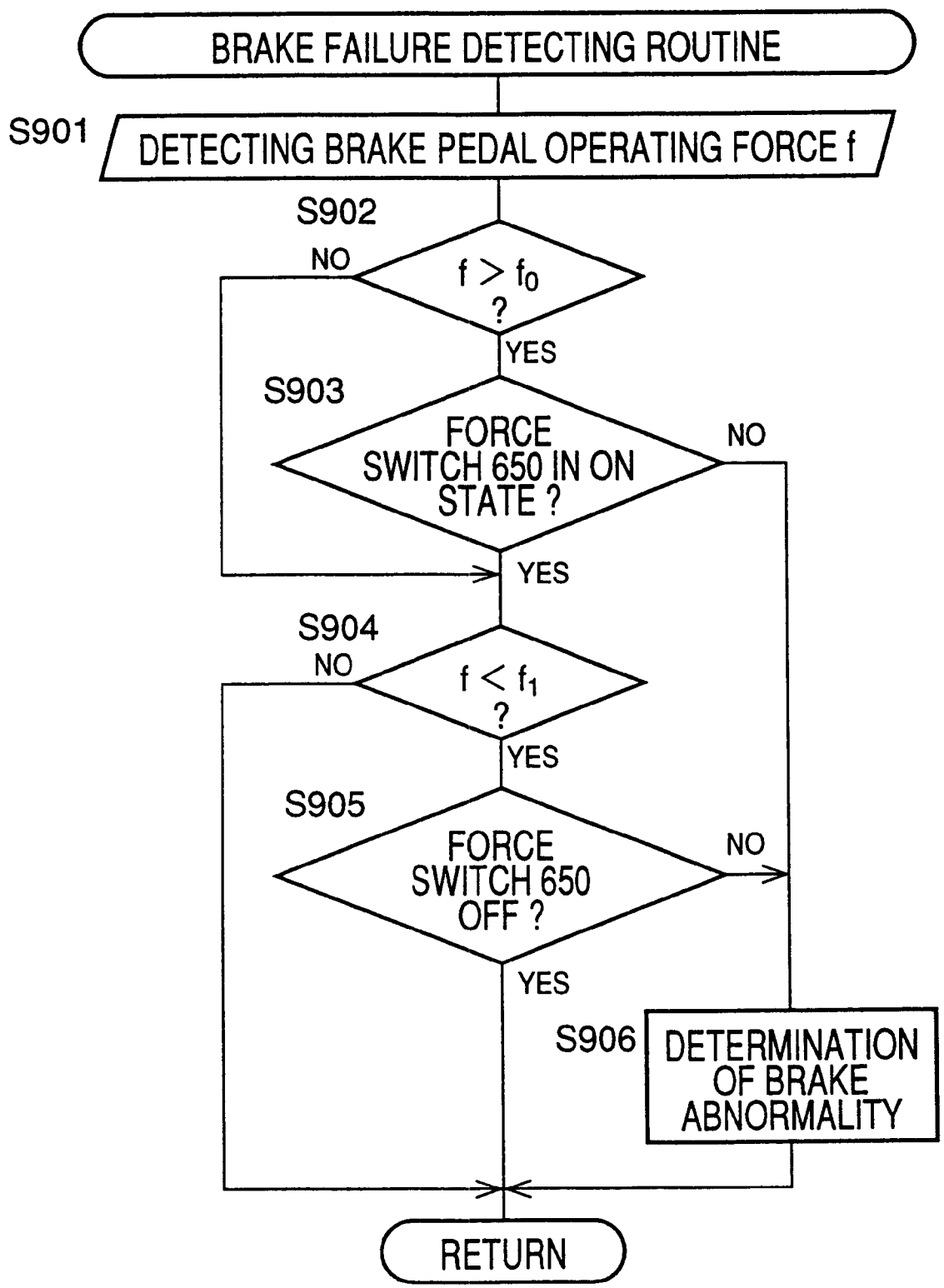
FIG. 35 is a flow chart illustrating a brake failure detecting routine executed according to a program stored in a ROM of a computer used in a braking system of an eleventh embodiment of the invention.
Figure 36:
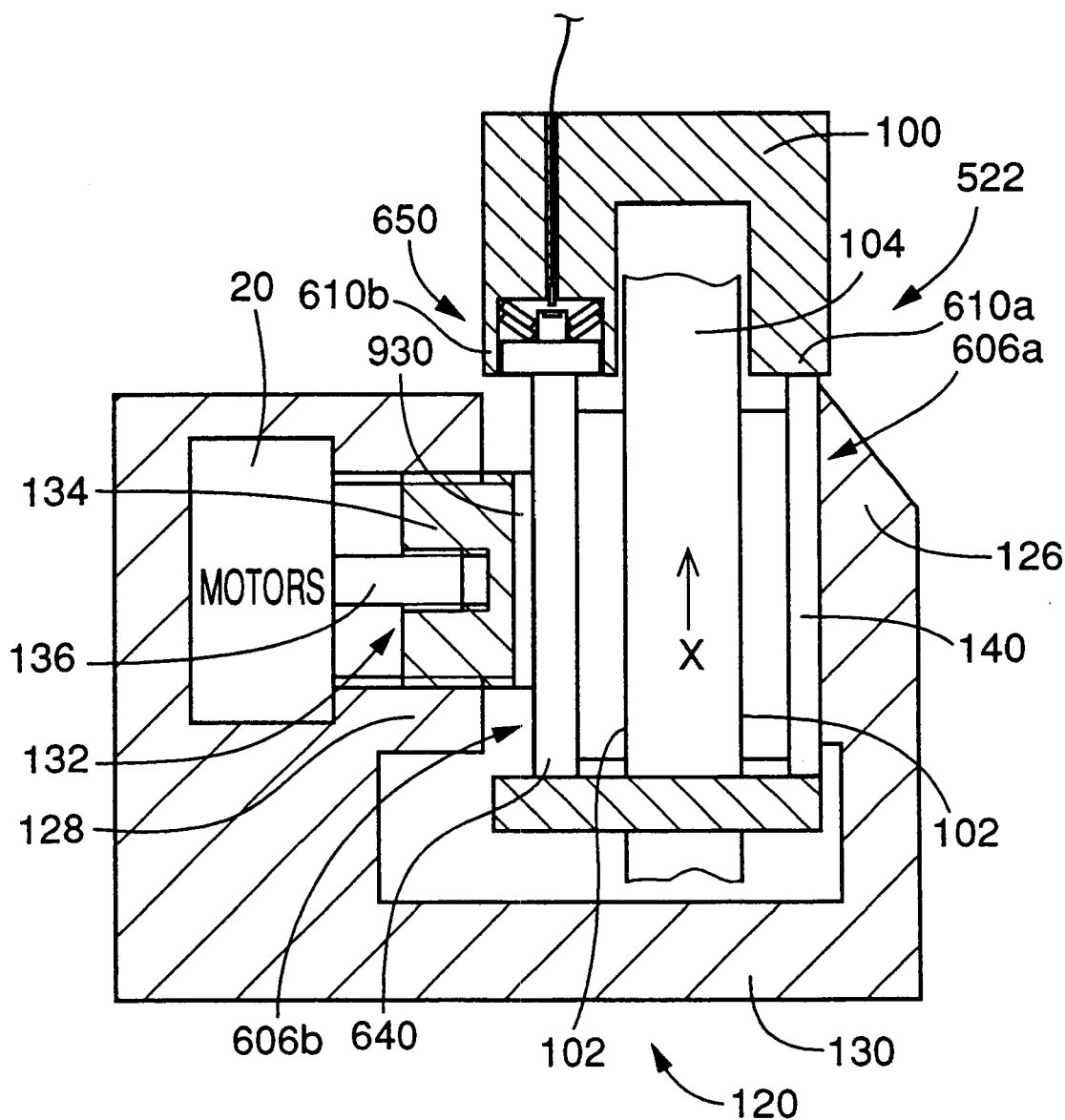
FIG. 36 is a plan view partly in cross section of an electrically operated disc brake used for each of front left and right wheels in a braking system according to a twelfth embodiment of the present invention.

If a negative decision (NO) is obtained in step S902, the control flow goes to step S904. If a negative decision (NO) is obtained in step S904, one cycle of execution of the routine of FIG. 35 is terminated.

It is noted that the reference value $f_0$ is larger than the reference value $f_1$, so that the affirmative decision (YES) is not obtained in step S904 when the affirmative decision (YES) is obtained in step S902.

There will be described a twelfth embodiment of this invention, in which the same reference numerals as used in the eighth embodiment will be used to identify the same elements.

The braking system according to this twelfth embodiment includes a pressing force sensor 930 provided on the presser member 134 of each front disc brake 522. This pressing force sensor 930 is adapted to continuously detect a force by which the presser member 134 forces the inner brake pad 606b the onto the friction surface 102 of the disc rotor 104. The pressing force sensor 930 functions as a force-related quantity sensor for detecting a quantity relating to a quantity relating to the braking force generated by the disc brake 522 or the pressing force by which the friction member 606b is forced onto the rotor 104.

Figure 37:
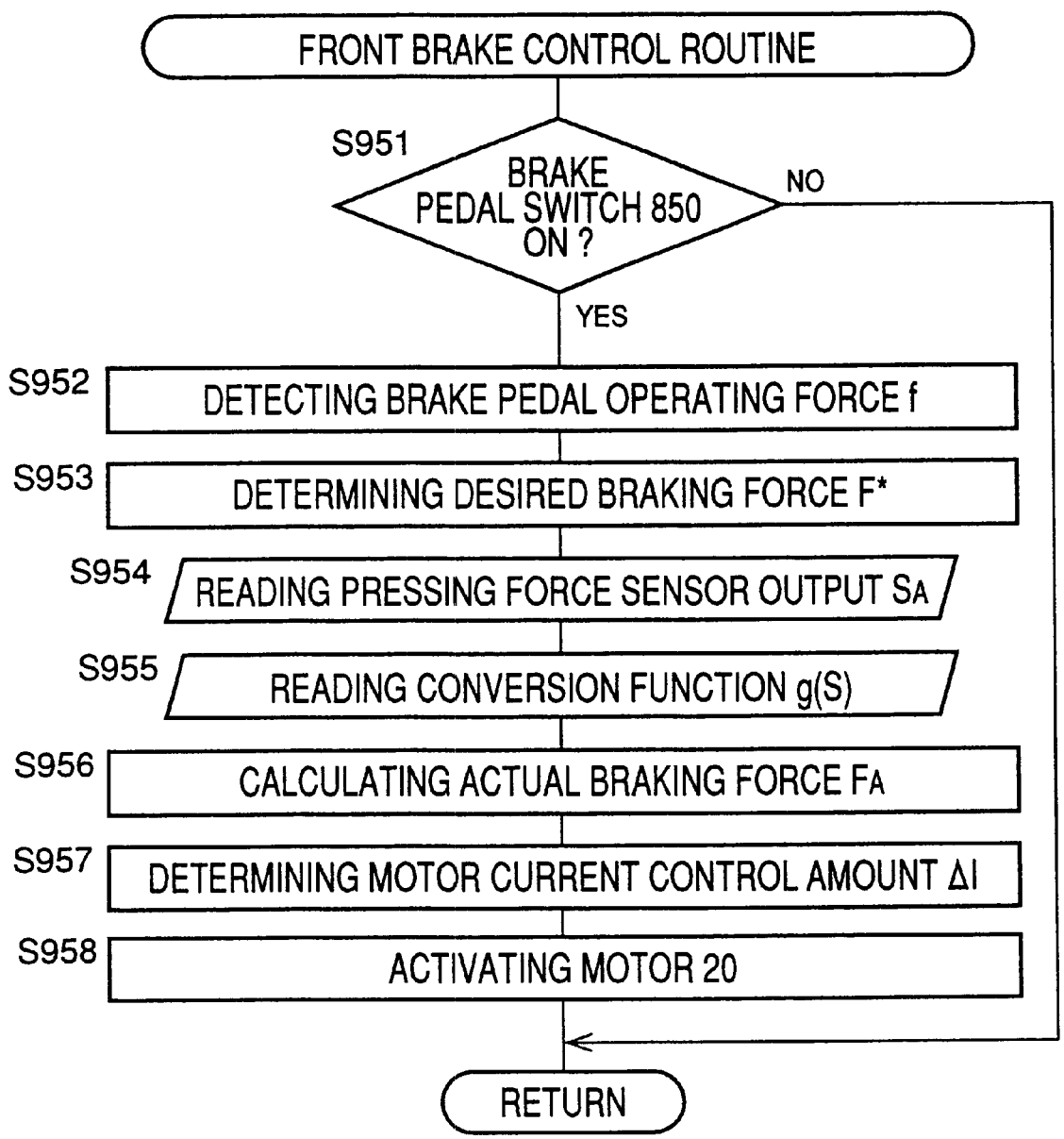
FIG. 37 is a flow chart illustrating a front brake control routine executed according to a program stored in a ROM of a computer used in the braking system of FIG. 36.

In the present twelfth embodiment, the ROM 842 stores a program for executing a front brake control routine illustrated in the flow chart of FIG. 37.

The front brake control routine of FIG. 37 is executed alternately for the front left and right wheels FL, FR. The routine is initiated with step S951 to determine whether the brake pedal switch 850 is on. If a negative decision (NO) is obtained in step S951, one cycle of execution of the routine is terminated. If an affirmative decision (YES) is obtained in step S951, the control flow goes to step S952 to detect the operating force f on the basis of the operating force sensor 848. Then, step S953 is implemented to determine the desired braking force F* on the basis of the detected operating force f. Step S953 is similar to step S523 of the eighth embodiment of FIG. 30. Then, the control flow goes to step S954 to read an output $S_A$ of the pressing force sensor 930. Step S954 is followed by step S955 to read a conversion function g(S) stored in the RAM 844. The conversion function g(S) is used to convert the output $S_A$ into an actual braking force $F_A$. Upon power application to the computer 846, a standard conversion function g(S)* is stored in the RAM 844, and is provisionally used before the conversion function g(S) is obtained according to a conversion function compensating routine (which will be described) and stored in the RAM 844. Each time the conversion function compensating routine is executed, the conversion function g(S) stored in the RAM 844 is updated.

Then, the control flow goes to step S956 to calculate the actual braking force $F_A$ according to the conversion function g(S). Then, step S957 is implemented to determine a control amount ΔI of the electric current I to be supplied to the electric motor 20. This determination is effected on the basis of the calculated actual braking force $F_A$ and the determined desired braking force F*, more precisely, on the basis of a difference between the actual and desired braking force values $P_A$ and F*. The control amount ΔI permits the actual braking force $F_A$ to coincide with the desired value F*. Step S957 is followed by step S958 in which the electric motor 20 is activated according to the control amount ΔI.

Figure 38:
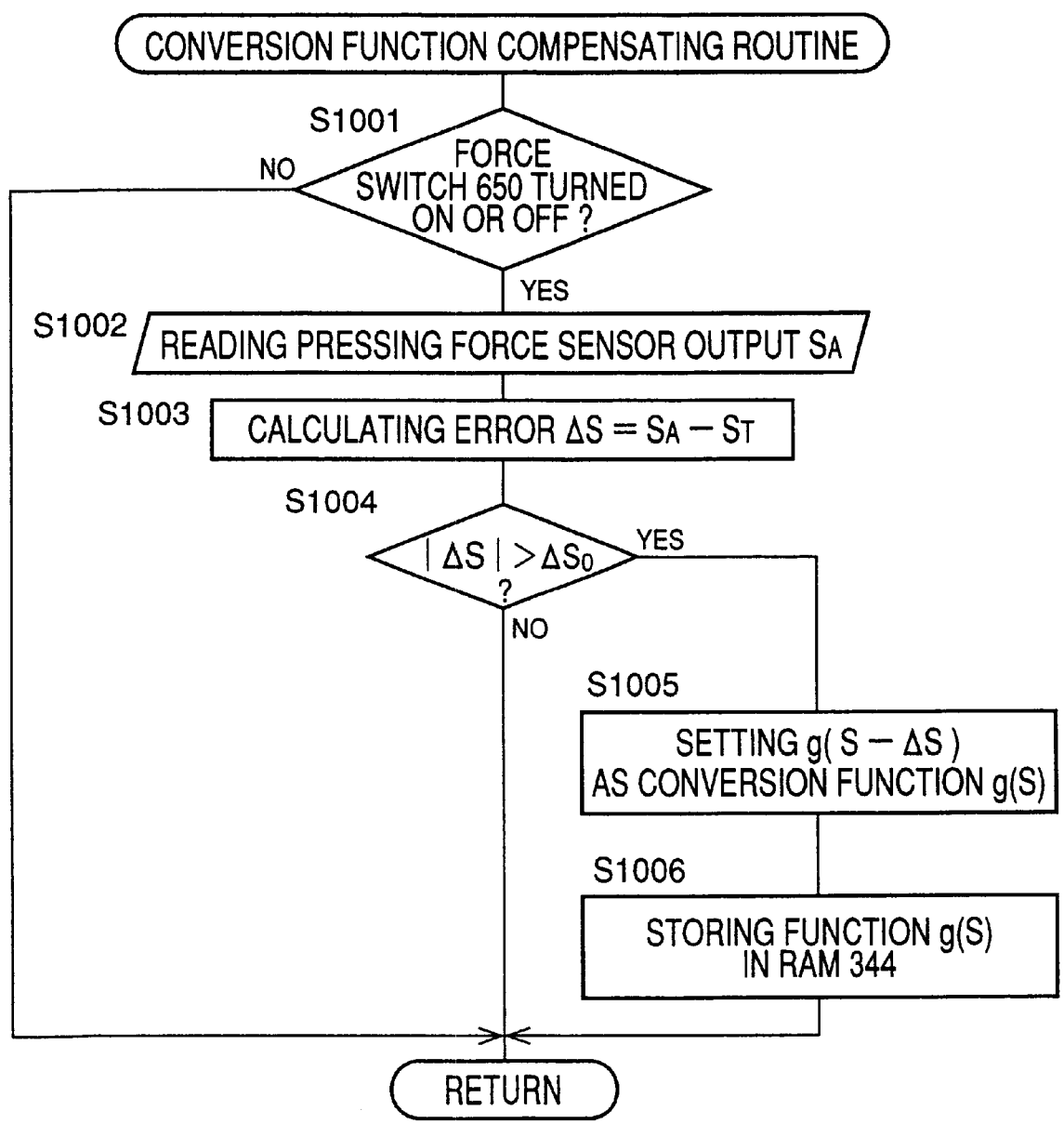
FIG. 38 is a flow chart illustrating a conversion function compensating routine executed according to a program stored in the ROM of the braking system of FIG. 36.

The conversion function compensating routine indicated above is illustrated in the flow chart of FIG. 38.

Figure 39:
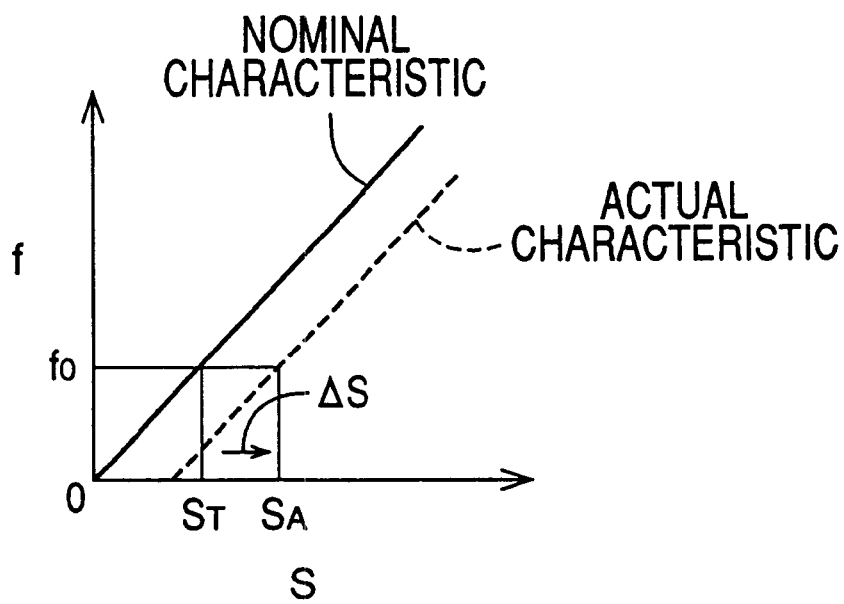
FIG. 39 is a graph for explaining the conversion function compensating routine of FIG. 38.
Figure 40:
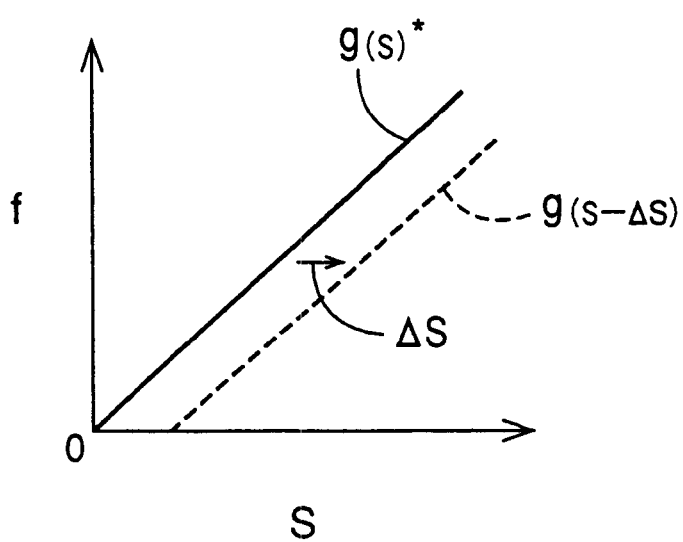
FIG. 40 is also a graph for explaining the routine of FIG. 38.

This routine of FIG. 38 is also executed alternately for the front left and right wheels FL, FR. The routine is initiated with step S1001 to determine whether the force switch 650 is turned on or off. If a negative decision (NO) is obtained in step S951, one cycle of execution of the routine is terminated. If an affirmative decision (YES) is obtained in step S1001, the control flow goes to step S1002 to read the output $S_A$ of the pressing force sensor 930. Step S1003 is then implemented to calculate an error ΔS between the output $S_A$ and a nominal value $S_T$ of the output $S_A$. The error $ΔS = S_A - S_T$ corresponds to a difference of an actual characteristic of the pressing force sensor 930 from a nominal or designed characteristic, as indicated in the graph of FIG. 39. The characteristic is represented by a relationship between the pressing force f and the output S of the pressing force sensor 930. The nominal characteristic is represented by the standard conversion function g(S)* while the actual characteristic is represented by the conversion function g(S−ΔS), as indicated in the graph of FIG. 40.

Then, the control flow goes to step S1004 to determine whether the absolute value |ΔS| of the error ΔS is larger than a predetermined threshold $ΔS_0$. If an affirmative decision (YES) is obtained in step S1004, the control flow goes to step S1005 to compensate the conversion function g(S)* or g(S) stored in the RAM 844. Namely, the conversion function g(S−ΔS) is set as the conversion function g(S), so that the actual braking force $F_A$ is calculated according to the conversion function g(S−ΔS) in step S956 upon next execution of the front brake control routine of FIG. 37. In other words, the f-S relationship which is used in the routine of FIG. 37 is shifted to the right by an amount equal to the error ΔS, as indicated in the graph of FIG. 40. Then, the control flow goes to step S1006 to store the compensated conversion function g(S) in the RAM 844, that is, store the conversion function g(S−ΔS) as the compensated or updated conversion function g(S). If a negative decision (NO) is obtained in step S1004, one cycle of execution of the conversion function compensating routine of FIG. 38 is terminated.

It will be understood from the above description of the twelfth embodiment that the conversion function g(S) represents a relationship between the output $S_A$ of the pressing force sensor 930 and the actual braking force $F_A$ when the force sensor 650 is turned on. Since the output $S_A$ reflects the amount of electric current I supplied to the electric motor 20, the conversion function g(S) is considered to represent a relationship between the electric current I to be supplied to the electric motor 20 and the braking force F to be applied to the front wheel. Therefore, a portion of the ECU assigned to execute the conversion function compensating routine of FIG. 38 is considered to constitute a relationship estimating device for estimating the relationship between the electric current I to be applied to the electric motor 20 and the braking force F to be applied to the front wheel. It will be understood that a portion of the ECU 550 assigned to execute the front brake control routine of FIG. 37 constitutes relationship utilizing means for utilizing the estimated relationship for controlling the front disc brake 522. It will also be understood that a portion of the ECU 550 assigned to implement steps S954–S956 and S1001–S1005 constitutes a wheel braking force estimating device for estimating the braking force F to be applied to the front wheel. It will further be understood that a portion of the ECU 550 assigned to implement steps S1003 and S1005 constitutes relationship compensating means for compensating the above-indicated relationship.

There will be described a thirteenth embodiment of this invention, which is a modification of the twelfth embodiment. The same reference numerals as used in the twelfth embodiment will be used in the thirteenth embodiment, to identify the same elements.

Figure 41:
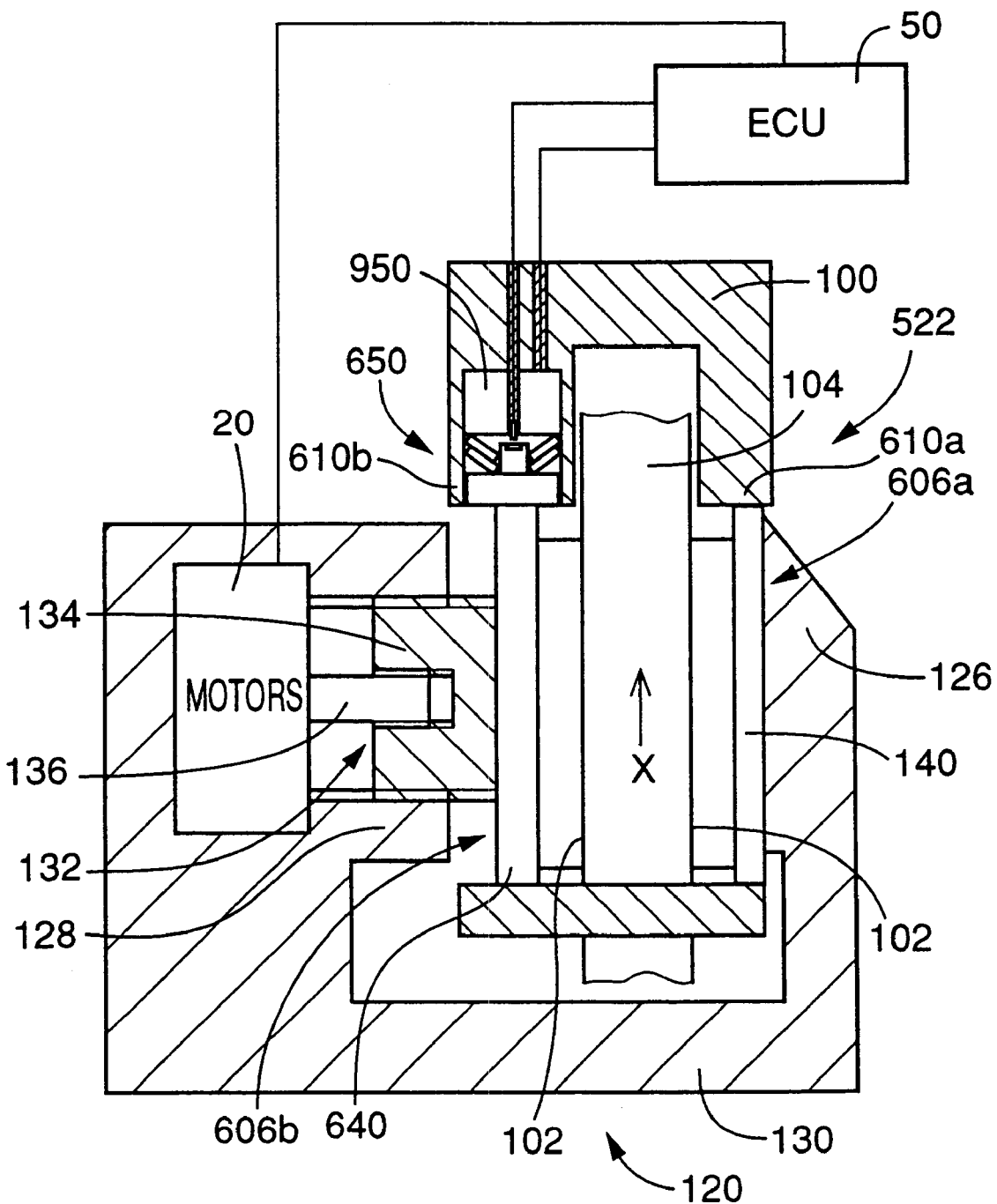
FIG. 41 is a plan view partly in cross section of an electrically operated disc brake used for each of front left and right wheels in a braking system according to a thirteenth embodiment of this invention.

In the braking system according to the thirteenth embodiment, a braking force sensor 950 is used in place of the pressing force sensor 930, as shown in FIG. 41. The braking force sensor 950 is capable of continuously detecting a force received from the inner brake pad 606$b$ during activation of the front disc brake 522. The braking force sensor 950 is interposed between the force switch 650 and the inner torque receiving portion 610$b$ of the mounting bracket 100, such that the coned disc spring of the force switch 650 is held in contact with the braking force sensor 950. The braking force sensor 950 may be a strain gage or a piezoelectric element, or consists principally of a rubber material whose electrical conductivity changes with a pressure applied thereto. The braking force sensor 950 functions as a force-related quantity sensor or a braking-force-related quantity sensor for detecting a quantity relating to the braking force generated by the pressing device 20, 134, 136.

Figure 42:
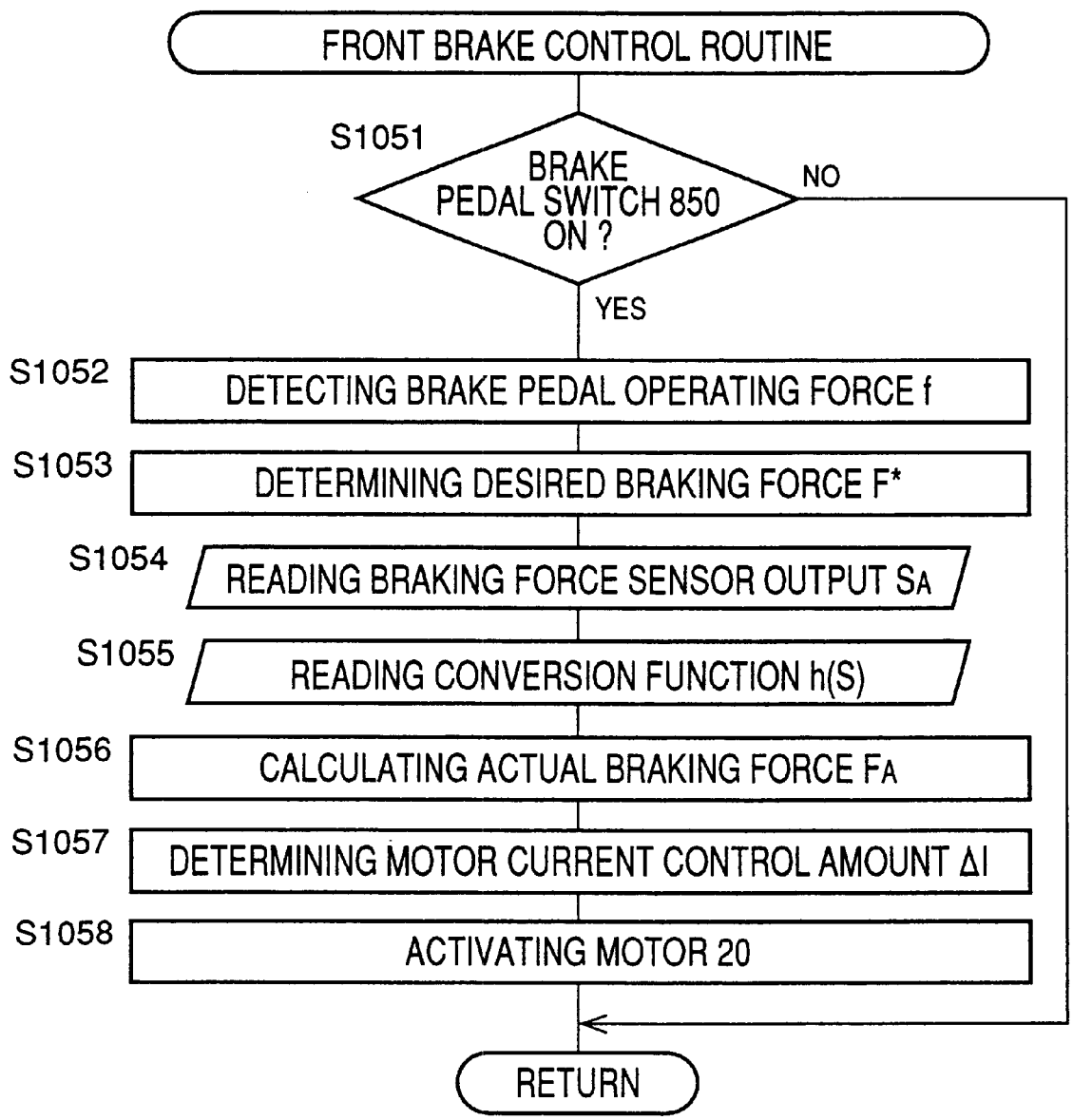
FIG. 42 is a flow chart illustrating a front brake control routine executed according to a program stored in a ROM of a computer used in the braking system of FIG. 41.

The ROM 842 of the present braking system stores a program for executing a front brake control routine illustrated in the flow chart of FIG. 42.

The front brake control routine of FIG. 42 is executed alternately for the front left and right wheels FL, FR. The routine is initiated with step S1051 to determine whether the brake pedal switch 850 is on. If a negative decision (NO) is obtained in step S951, one cycle of execution of the routine is terminated. If an affirmative decision (YES) is obtained in step S1051, the control flow goes to step S1052 to detect the operating force f on the basis of the operating force sensor 848. Then, step S1053 is implemented to determine the desired braking force F* on the basis of the detected operating force f. Step S1053 is similar to step S523 of the eighth embodiment of FIG. 30. Then, the control flow goes to step S1054 to read an output $S_A$ of the braking force sensor 950. Step S1054 is followed by step S1055 to read a conversion function h(S) stored in the RAM 844. The conversion function h(S) is used to convert the output $S_A$ into an actual braking force $F_A$. Upon power application to the computer 846, a standard conversion function h(S)* is stored in the RAM 844, and is provisionally used before the conversion function h(S) is obtained according to a conversion function compensating routine (which will be described) and stored in the RAM 844. Each time the conversion function compensating routine is executed, the conversion function h(S) stored in the RAM 844 is updated.

Then, the control flow goes to step S1056 to calculate the actual braking force $F_A$ according to the conversion function h(S). Then, step S1057 is implemented to determine a control amount $\Delta I$ of the electric current I to be supplied to the electric motor 20. This determination is effected on the basis of the calculated actual braking force $F_A$ and the determined desired braking force F*, more precisely, on the basis of a difference between the actual and desired braking force values $F_A$ and F*. The control amount $\Delta I$ permits the actual braking force $F_A$ to coincide with the desired value F*. Step S1057 is followed by step S1058 in which the electric motor 20 is activated according to the control amount $\Delta I$.

Figure 43:
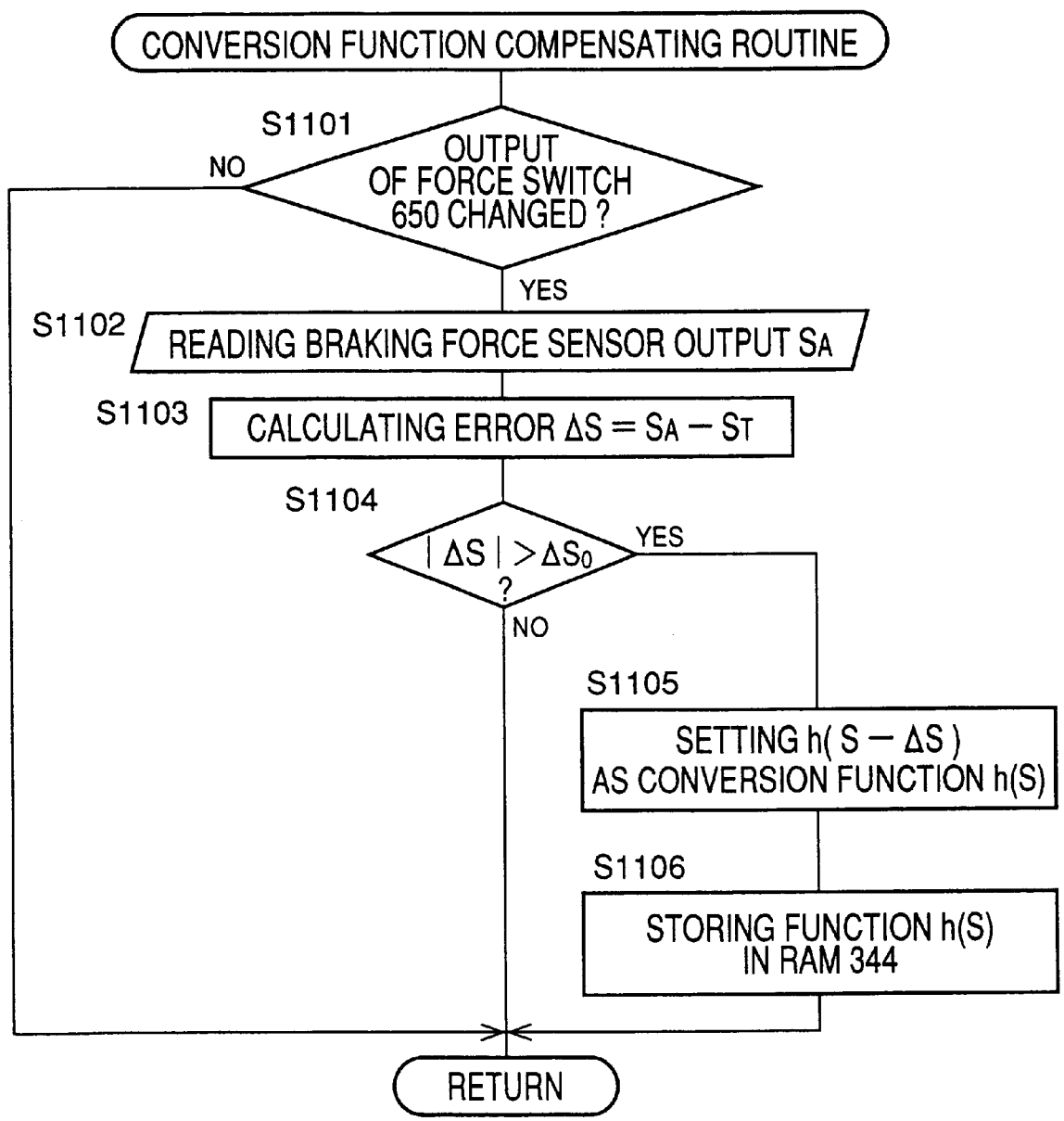
FIG. 43 is a flow chart illustrating a conversion function compensating routine executed according to a program stored in the ROM of the braking system of FIG. 41.

The conversion function compensating routine indicated above is illustrated in the flow chart of FIG. 43.

This routine of FIG. 43 is also executed alternately for the front left and right wheels FL, FR. The routine is initiated with step S1101 to determine whether the force switch 650 is turned on or off. If a negative decision (NO) is obtained in step S1101, one cycle of execution of the routine is terminated. If an affirmative decision (YES) is obtained in step S1101, the control flow goes to step S1102 to read the output $S_A$ of the braking force sensor 950. Step S1103 is then implemented to calculate an error $\Delta S$ between the output $S_A$ and a nominal value $S_T$ of the output $S_A$. The significance of this error $\Delta S=S_A-S_T$ has been described with respect to the routine of FIG. 38.

Then, the control flow goes to step S1104 to determine whether the absolute value $|\Delta S|$ of the error $\Delta S$ is larger than the predetermined threshold $\Delta S_0$. If an affirmative decision (YES) is obtained in step S1104, the control flow goes to step S1105 to compensate the conversion function h(S)* or h(S) stored in the RAM 844. Namely, the conversion function h(S–$\Delta S$) is set as the conversion function h(S), so that the actual braking force $F_A$ is calculated according to the conversion function g(S–$\Delta S$) in step S1056 upon next execution of the front brake control routine of FIG. 42. Step S1105 is similar to step S1005 of the routine of FIG. 38. Then, the control flow goes to step S1106 to store the compensated conversion function h(S) in the RAM 844, that is, store the conversion function h(S–$\Delta S$) as the compensated or updated conversion function h(S). If a negative decision (NO) is obtained in step S1104, one cycle of execution of the conversion function compensating routine of FIG. 43 is terminated.

It will be understood from the above description of the thirteen embodiment that the conversion function h(S) represents a relationship between the output $S_A$ of the braking force sensor 950 and the actual braking force $F_A$ when the force sensor 650 is turned on. Since the output $S_A$ reflects the amount of electric current I supplied to the electric motor 20, the conversion function h(S) is considered to represent a relationship between the electric current I to be supplied to the electric motor 20 and the braking force F to be applied to the front wheel. Therefore, a portion of the ECU assigned to execute the conversion function compensating routine of FIG. 43 is considered to constitute a relationship estimating device for estimating the relationship between the electric current I to be applied to the electric motor 20 and the braking force F to be applied to the front wheel. It will be understood that a portion of the ECU 550 assigned to execute the front brake control routine of FIG. 42 constitutes relationship utilizing means for utilizing the estimated relationship for controlling the front disc brake 522. It will also be understood that a portion of the ECU 550 assigned to implement steps S1054–S1056 and S1101–S1105 constitutes a wheel braking force estimating device for estimating the braking force F to be applied to the front wheel. It will further be understood that a portion of the ECU 550 assigned to implement steps S1103 and S1105 constitutes relationship compensating means for compensating the above-indicated relationship.

While the presently preferred embodiments of the present invention have been described above in detail by reference to the accompanying drawings, it is to be understood that the present invention may be embodied with various changes, modifications and improvements, which may occur to those skilled in the art, without departing from the spirit and scope of the invention defined in the following claims:

What is claimed is:

1. A braking system for a motor vehicle having a wheel comprising:
    a rotor rotating with said wheel;
    a friction member movable to be forced onto said rotor, for braking said wheel;
    a support member for supporting said friction member in frictional contact with said rotor so as to prevent said friction member from being rotated with said rotor;
    a pressing device for forcing said friction member into frictional contact with said rotor;
    a force sensor for detecting a force which is generated in a rotating direction of said rotor, due to a frictional contact of said friction member with said rotor;
    a pressing-force-related quantity sensor whose output varies continuously with a quantity relating to a pressing force by which said friction member is forced onto said rotor by said pressing device; and
    a friction coefficient estimating device for estimating a friction coefficient of said friction member, on the basis of a relationship between said output of said pressing-force-related quantity sensor and an output of said force sensor.

2. A braking system according to claim 1, wherein said rotor is a disc having a friction surface, and said friction member is a brake pad which is movable into frictional contact with said friction surface, said force sensor being disposed in a position at which a spacing between said brake pad and said support member decreases with an increase in an amount of rotation of said brake pad with said disc.

3. A braking system according to claim 2, wherein said force sensor is a force switch interposed between said friction member and said support member, so as to receive said force, said force switch being selectively placed in one of two states, depending upon whether said force is larger than a predetermined threshold which is not zero.

4. A braking system according to claim 3, wherein said friction coefficient estimating device is operated when said force switch is switched from one of said two states to the other, said friction coefficient estimating device estimating said friction coefficient of said friction member on the basis of the relationship between said output of said pressing-force-related quantity sensor and said predetermined threshold of said force.

5. A braking system according to claim 2, further comprising:
    a force-related quantity sensor whose output varies continuously with a quantity relating to one of a braking force generated by the braking system and applied to said wheel and a pressing force generated by said pressing device to force said friction member onto said rotor;
    a wheel braking force estimating device for estimating said braking force to be applied to said wheel, on the basis of said output of said force-related quantity sensor and according to a predetermined relationship between said output and said braking force, said wheel braking force estimating device compensating said predetermined relationship on the basis of said output when said force switch is switched from one of said two states to the other.

6. A braking system according to claim 5, wherein said wheel braking force estimating device includes relationship compensating means for compensating said predetermined relationship, on the basis of a difference between an actual value of said output and a nominal value of said output when said force sensor is switched from one of said states to the other.

7. A braking system according to claim 1, wherein said friction member, said support member and said force sensor cooperate with each other to provide force-transmitting means for transmitting said force from said friction member to said support member through said force sensor while said force is not larger than a predetermined threshold, and for transmitting said force from said friction member directly to said support member after said force has exceeded said predetermined threshold.

8. A braking system according to claim 7, wherein said force-transmitting means comprises an elastic member through which said force is transmitted from said friction member to said support member while said force is not larger than said predetermined threshold.

9. A braking system according to claim 7, wherein said force-transmifting means comprises an elastic member through which said force is transmitted from said friction member to said force sensor and said support member while said force is not larger than said predetermined threshold.

* * * * *